(12) United States Patent
Lee

(10) Patent No.: US 12,437,833 B2
(45) Date of Patent: Oct. 7, 2025

(54) STACKED INTEGRATED CIRCUIT

(71) Applicant: SK hynix Inc., Icheon-si (KR)

(72) Inventor: Dong Uk Lee, Icheon-si (KR)

(73) Assignee: SK hynix Inc., Icheon-si (KR)

( * ) Notice: Subject to any disclaimer, the term of this patent is extended or adjusted under 35 U.S.C. 154(b) by 196 days.

(21) Appl. No.: 18/331,012

(22) Filed: Jun. 7, 2023

(65) Prior Publication Data

US 2023/0377679 A1 Nov. 23, 2023

Related U.S. Application Data

(63) Continuation-in-part of application No. 17/893,806, filed on Aug. 23, 2022.

(30) Foreign Application Priority Data

May 23, 2022 (KR) .......................... 10-2022-0062933

(51) Int. Cl.
*G11C 29/00* (2006.01)
(52) U.S. Cl.
CPC ............ *G11C 29/785* (2013.01); *G11C 29/76* (2013.01)
(58) Field of Classification Search
CPC ...... G11C 29/785; G11C 29/76; G11C 29/025
See application file for complete search history.

(56) References Cited

U.S. PATENT DOCUMENTS

| 5,268,868 | A | * | 12/1993 | Kajigaya ............. G11C 11/4096 327/170 |
| 7,548,444 | B2 | | 6/2009 | Matsui et al. |
| 11,367,732 | B2 | | 6/2022 | Lee |
| 2008/0111582 | A1 | | 5/2008 | Matsui et al. |
| 2014/0233292 | A1 | | 8/2014 | Kang et al. |
| 2018/0005995 | A1 | | 1/2018 | Shibata |
| 2019/0385984 | A1 | | 12/2019 | Koyanagi |
| 2020/0098730 | A1 | | 3/2020 | Keeth |
| 2021/0193242 | A1 | | 6/2021 | Nishioka |
| 2021/0200625 | A1 | * | 7/2021 | Park .................... G06F 11/0751 |
| 2021/0233849 | A1 | | 7/2021 | Greco et al. |

FOREIGN PATENT DOCUMENTS

| KR | 1020120058156 A | 6/2012 |
| KR | 101547389 B1 | 8/2015 |

* cited by examiner

*Primary Examiner* — Sultana Begum
(74) *Attorney, Agent, or Firm* — WILLIAM PARK AND ASSOCIATES LTD.

(57) ABSTRACT

The present disclosure provides a chip including an even area including an even through via through which an even address is received and an even redundancy through via through which an even redundancy address is received, and an odd area including an odd through via through which an odd address is received and an odd redundancy through via through which an odd redundancy address is received. In the present disclosure, the even area may include an even address selection circuit configured to, based on a chip information signal, generate a selection even address and a selection even redundancy address from the even address, the even redundancy address, the odd address, and the odd redundancy address, and an even internal address generation circuit configured to, based on an even repair signal, generate an internal even address from the selection even address and the selection even redundancy address.

19 Claims, 37 Drawing Sheets

STACKED INTEGRATED CIRCUIT

CROSS-REFERENCE TO RELATED APPLICATION

This application is a continuation-in-part of U.S. patent application Ser. No. 17/893,806, filed on Aug. 23, 2022, which claims the priority under 35 U.S.C. § 119(a) to Korean application number 10-2022-0062933, filed in the Korean Intellectual Property Office on May 23, 2022, the entire disclosure of which is incorporated herein by reference.

BACKGROUND

A stacked integrated circuit is recently formed by stacking a plurality of chips bonded together in order to improve a degree of integration. The plurality of chips included in the stacked integrated circuit may transmit data to one another in addition to control signals including commands and addresses through vias.

SUMMARY

In an embodiment, a chip may include an even area including an even through via through which an even address is received and an even redundancy through via through which an even redundancy address is received, and an odd area including an odd through via through which an odd address is received and an odd redundancy through via through which an odd redundancy address is received. In the present disclosure, the even area may include an even address selection circuit configured to, based on a chip information signal, generate a selection even address and a selection even redundancy address from the even address, the even redundancy address, the odd address, and the odd redundancy address, and an even internal address generation circuit configured to, based on an even repair signal, generate an internal even address from the selection even address and the selection even redundancy address.

In an embodiment, a stacked integrated circuit may include a lower chip including a lower even area and a lower odd area, and an upper chip including an upper odd area and an upper even area. In the present disclosure, the upper chip may be stacked on the lower chip. The lower even area may include a lower even address selection circuit configured to generate a lower selection even address and a lower selection even redundancy address from an even address and an even redundancy address, and a lower even internal address generation circuit configured to, based on a lower even repair signal, generate a lower internal even address from the lower selection even address and the lower selection even redundancy address.

DETAILED DESCRIPTION

In the descriptions of the following embodiments, the term "preset" indicates that the numerical value of a parameter is previously decided, when the parameter is used in a process or algorithm. According to an embodiment, the numerical value of the parameter may be set when the process or algorithm is started or while the process or algorithm is performed.

Terms such as "first" and "second," which are used to distinguish among various components, are not limited by the components. For example, a first component may be referred to as a second component, and vice versa.

When one component is referred to as being "coupled" or "connected" to another component, it should be understood that the components may be directly coupled or connected to each other or coupled or connected to each other through another component interposed therebetween. On the other hand, when one component is referred to as being "directly coupled" or "directly connected" to another component, it should be understood that the components are directly coupled or connected to each other without another component interposed therebetween.

A "logic high level" and a "logic low level" are used to describe the logic levels of signals. A signal having "logic high level" is distinguished from a signal having "logic low level." For example, when a signal having a first voltage corresponds to a signal having a "logic high level," a signal having a second voltage may correspond to a signal having a "logic low level." According to an embodiment, a "logic high level" may be set to a voltage higher than a "logic low level." According to an embodiment, the logic levels of signals may be set to different logic levels or opposite logic levels. For example, a signal having a logic high level may be set to have a logic low level according to an embodiment, and a signal having a logic low level may be set to have a logic high level according to an embodiment.

A "logic bit set" may mean a combination of logic levels of bits included in a signal. When a logic level of each of the bits included in the signal is changed, a logic bit set of the signal may be differently set. For example, if two bits are included in a signal, a logic bit set of the signal may be set as a first logic bit set when logic levels of the two bits included in the signal are a "logic low level" and a "logic low level," respectively, and may be set as a second logic bit set when logic levels of the two bits included in the signal are a "logic low level" and a "logic high level," respectively.

Hereafter, the teachings of the present disclosure will be described in more detail through embodiments. The embodiments are only used to exemplify the teachings of the present disclosure, and the scope of the present disclosure is not limited by the embodiments.

Figure 1:
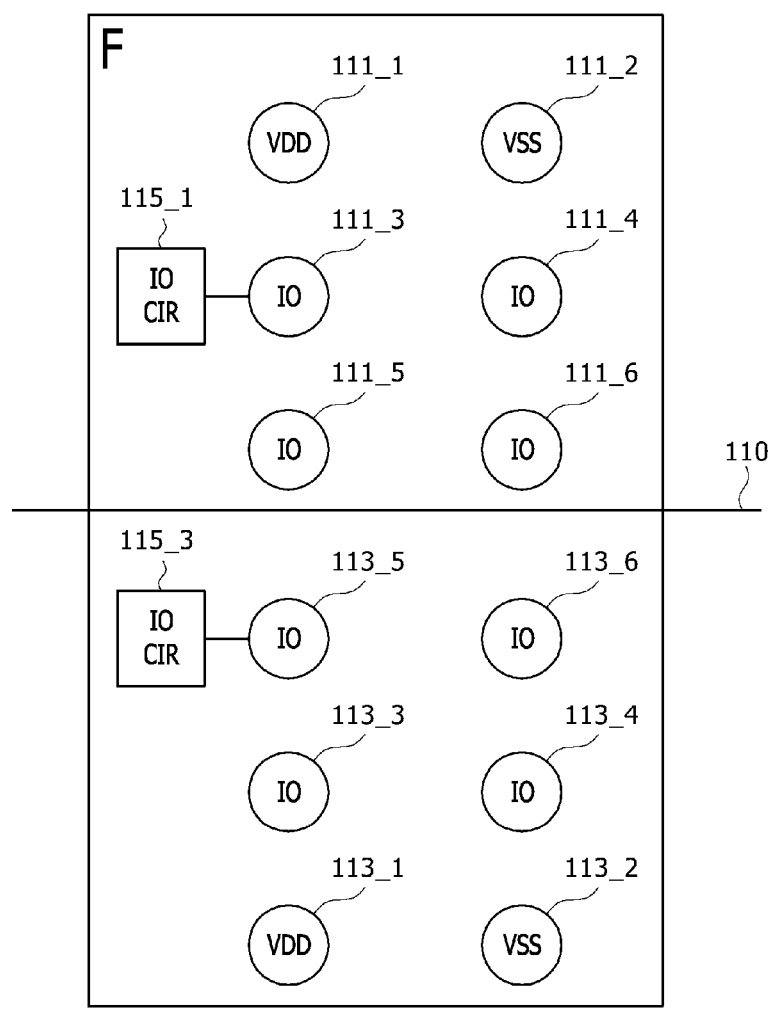
FIGS. 1 to 3 are plan views illustrating constructions of a stacked integrated circuit according to an example of the present disclosure.
Figure 2:
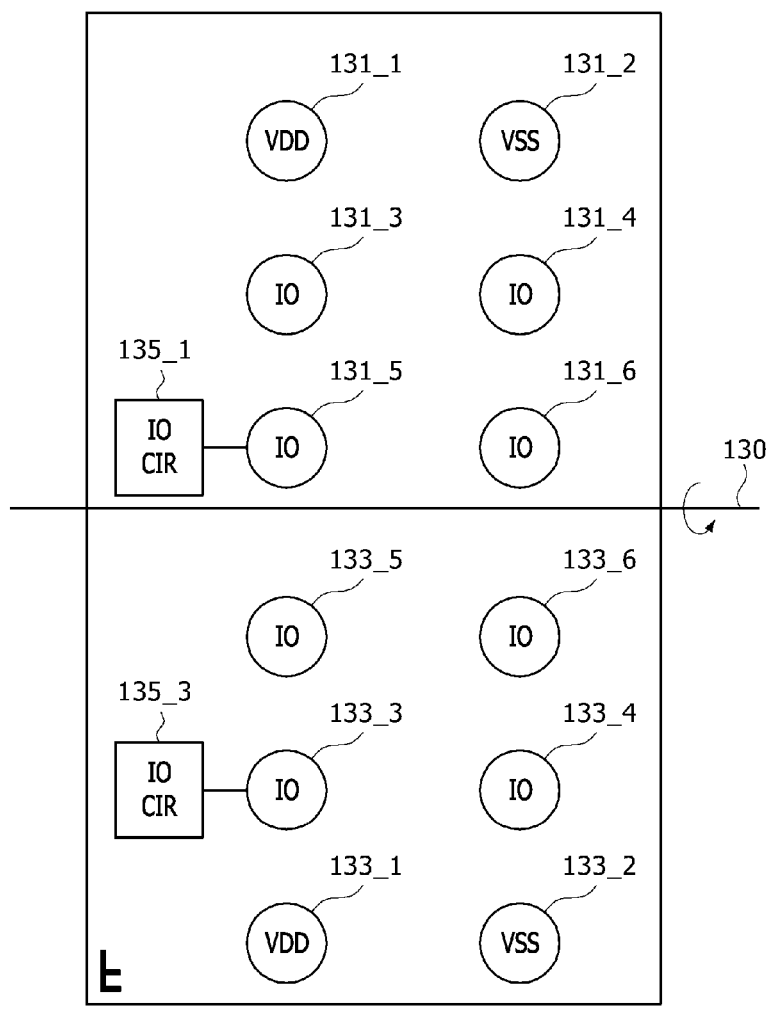
Figure 3:
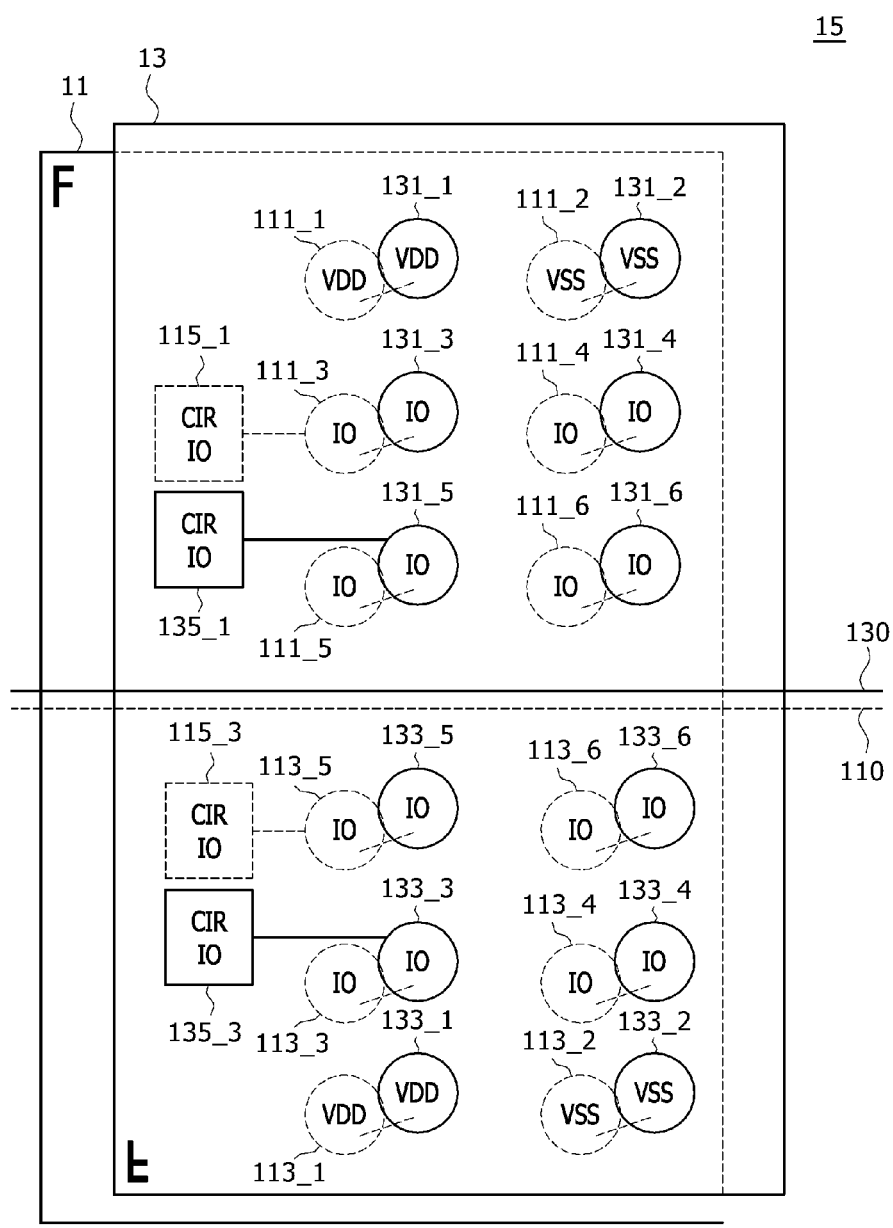

FIGS. 1 to 3 are plan views illustrating constructions of a stacked integrated circuit 15 according to an example of the present disclosure. More specifically, FIG. 1 is a plan view illustrating a construction of a lower chip 11 that is included in the stacked integrated circuit 15. FIG. 2 is a plan view illustrating a construction of an upper chip 13 that is included in the stacked integrated circuit 15. FIG. 3 is a plan view illustrating a construction of the stacked integrated circuit 15 that is formed by stacking the upper chip 13 on the lower chip 11 as a front face to front face bonding structure.

As illustrated in FIG. 1, the lower chip 11 may include a first through via set 111_1 to 111_6 that are disposed above a first rotating axis 110 and a second through via set 113_1 to 113_6 that are disposed below the first rotating axis 110. The first through via set 111_1 to 111_6 may include a through via 111_1 to which a power supply voltage VDD is supplied, a through via 111_2 to which a ground voltage VSS is supplied, and through vias 111_3 to 111_6 through which a control signal or data is input or output. The second through via set 113_1 to 113_6 may include a through via 113_1 to which the power supply voltage VDD is supplied, a through via 113_2 to which the ground voltage VSS is supplied, and through vias 113_3 to 113_6 through which a control signal or data is input or output. The first through via set 111_1 to 111_6 and the second through via set 113_1 to 113_6 may be disposed to be symmetrical to each other in relation to the first rotating axis 110. The lower chip 11 may include a first input and output circuit (IO CIR) 115_1 that is disposed above the first rotating axis 110 and a second IO circuit 115_3 that is disposed below the first rotating axis 110. The first IO circuit 115_1 may be connected to the through via 111_3 that is included in the first through via set 111_1 to 111_6. The second IO circuit 115_3 may be connected to the through via 113_5 that is included in the second through via set 113_1 to 113_6. The first IO circuit 115_1 and the second IO circuit 115_3 may be disposed to be asymmetrical to each other in relation to the first rotating axis 110.

As illustrated in FIG. 2, the upper chip 13 may include a third through via set 133_1 to 133_6 that are disposed below the second rotating axis 130 and a fourth through via set 131_1 to 131_6 that are disposed above the second rotating axis 130. The third through via set 133_1 to 133_6 may include a through via 133_1 to which the power supply voltage VDD is supplied, a through via 133_2 to which the ground voltage VSS is supplied, and through vias 133_3 to 133_6 through which a control signal or data is input or output. The fourth through via set 131_1 to 131_6 may include a through via 131_1 to which the power supply voltage VDD is supplied, a through via 131_2 to which the ground voltage VSS is supplied, and through vias 131_3 to 131_6 through which a control signal or data is input or output. The third through via set 133_1 to 133_6 and the fourth through via set 131_1 to 131_6 may be disposed to be symmetrical to each other in relation to the second rotating axis 130. The upper chip 13 may include a third IO circuit 135_3 that is disposed below the second rotating axis 130 and a fourth IO circuit 135_1 that is disposed above the second rotating axis 130. The third IO circuit 135_3 may be connected to the through via 133_3 that is included in the third through via set 133_1 to 133_6. The fourth IO circuit 135_1 may be connected to the through via 131_5 that is included in the fourth through via set 131_1 to 131_6. The third IO circuit 135_3 and the fourth IO circuit 135_1 may be disposed to be asymmetrical to each other in relation to the second rotating axis 130. The upper chip 13 may be a chip that is formed by using the same method as that of the lower chip 11 but may be formed to be mirror image symmetrical to the lower chip 11.

As illustrated in FIG. 3, the stacked integrated circuit 15 may be a three-dimensional (3-D) stacked integrated circuit that includes the upper chip 13, illustrated in FIG. 2, stacked on the lower chip 11, illustrated in FIG. 1. A method of stacking the upper chip 13 that is mirror image symmetrical to the lower chip 11 may be defined as a front face to front face bonding structure. As the upper chip 13 is stacked on the lower chip 11, the through vias that are included in the first through via set 111_1 to 111_6 that are included in the lower chip 11 may be connected to the through vias that are included in the fourth through via set 131_1 to 131_6 that are included in the upper chip 13, respectively. More specifically, the through via 111_1 of the lower chip 11 to which the power supply voltage VDD is supplied may be connected to the through via 131_1 of the upper chip 13 to which the power supply voltage VDD is supplied. The through via 111_2 of the lower chip 11 to which the ground voltage VSS is supplied may be connected to the through via 131_2 of the upper chip 13 to which the ground voltage VSS is supplied. The through vias 111_3 to 111_6 of the lower chip 11 through which a control signal or data is input or output may be connected to the through vias 131_3 to 131_6 of the upper chip 13 through which a control signal or data is input or output, respectively. The through vias that are included in the second through via set 113_1 to 113_6 that are included in the lower chip 11 may be connected to the through vias that are included in the third through via set 133_1 to 133_6 that are included in the upper chip 13, respectively. More specifically, the through via 113_1 of the lower chip 11 to which the power supply voltage VDD is supplied may be connected to the through via 133_1 of the upper chip 13 to which the power supply voltage VDD is supplied. The through via 113_2 of the lower chip 11 to which the ground voltage VSS is supplied may be connected to the through via 133_2 of the upper chip 13 to which the ground voltage VSS is supplied. The through vias 113_3 to 113_6 of the lower chip 11 through which a control signal or data is input or output may be connected to the through vias 133_3 to 133_6 of the upper chip 13 through which a control signal or data is input or output. The first IO circuit 115_1 may be connected to the through via 111_3 of the lower chip 11. The second IO circuit 115_3 may be connected to the through via 113_5 of the lower chip 11. The third IO circuit 135_3 may be connected to the through via 133_3 of the upper chip 13. The fourth IO circuit 135_1 may be connected to the through via 131_5 of the upper chip 13. Each of the first IO circuit 115_1, the second IO circuit 115_3, the third IO circuit 135_3, and the fourth IO circuit 135_1 may be formed as a separate rank and may input and output data or control signals through a separate channel.

Figure 4:
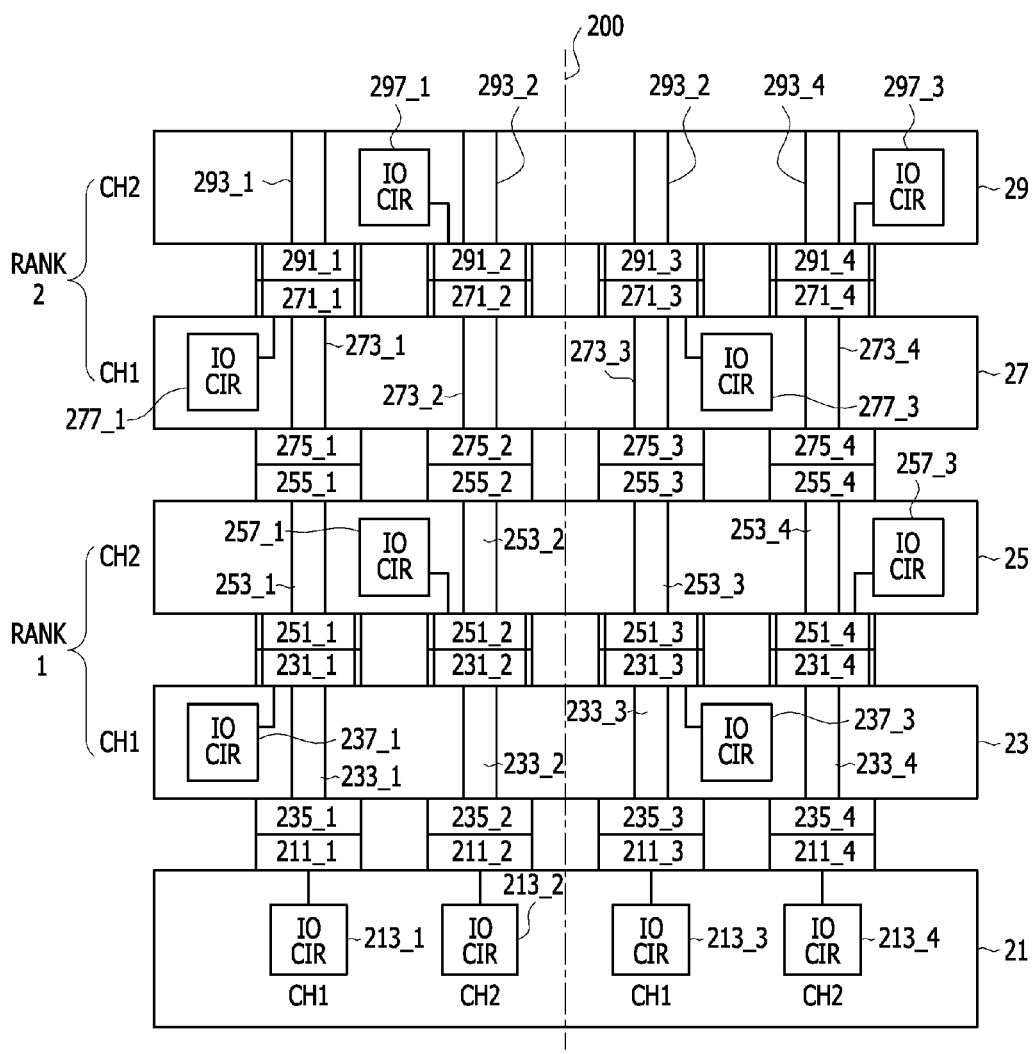
FIG. 4 is a side view illustrating a construction of a stacked integrated circuit according to another example of the present disclosure.

FIG. 4 is a diagram illustrating a construction of a stacked integrated circuit 20 according to another example of the present disclosure. As illustrated in FIG. 4, the stacked integrated circuit 20 may include a base chip 21, a first chip 23, a second chip 25, a third chip 27, and a fourth chip 29.

The base chip 21 may include a first base IO circuit (IO CIR) 213_1, a second base IO circuit 213_2, a third base IO circuit 213_3, and a fourth base IO circuit 213_4. Each of the first base IO circuit 213_1, the second base IO circuit 213_2, the third base IO circuit 213_3, and the fourth base IO circuit 213_4 may be allocated to a separate channel. The first base IO circuit 213_1 may be allocated to a first channel CH1, the second base IO circuit 213_2 may be allocated to a second channel CH2, the third base IO circuit 213_3 may be allocated to a first channel CH1, and the fourth base IO circuit 213_4 may be allocated to a second channel CH2. The base chip 21 may include a base pad set 211_1 to 211_4. The base pads of the base pad set 211_1 to 211_4 may be bonded to the back pads of a first back pad set 235_1 to 235_4 that are included in the first chip 23, respectively.

The first chip 23 may include a first front pad set 231_1 to 231_4, a first through via set 233_1 to 233_4, the first back pad set 235_1 to 235_4, a first IO circuit 237_1, and a second IO circuit 237_3. The front pads of the first front pad set 231_1 to 231_4 may be bonded to the front pads of a second front pad set 251_1 to 251_4 that are included in the second chip 25, respectively. The through vias of the first through via set 233_1 to 233_4 may be connected to the front pads of the first front pad set 231_1 to 231_4, respectively. The through vias of the first through via set 233_1 to 233_4 may be connected to the back pads of the first back pad set 235_1 to 235_4, respectively. The first IO circuit 237_1 may be connected to the front pad 231_1 and may be connected to the first base IO circuit 213_1 that is allocated to the first channel CH1 through the through via 233_1, the back pad 235_1, and the base pad 211_1. The second IO circuit 237_3 may be connected to the front pad 231_3 and may be connected to the third base IO circuit 213_3 that is allocated to the first channel CH1 through the through via 233_3, the back pad 235_3, and the base pad 211_3. The first IO circuit 237_1 and the second IO circuit 237_3 may be formed as a first rank RANK1 and may input and output data or control signals through the first channel CH1.

The second chip 25 may include the second front pad set 251_1 to 251_4, a second through via set 253_1 to 253_4, a second back pad set 255_1 to 255_4, a third IO circuit 257_1, and a fourth IO circuit 257_3. The second chip 25 may be formed to be mirror image symmetrical to the first chip 23 and may be stacked on the first chip 23. The first chip 23 and the second chip 25 may be bonded together as a front face to front face bonding structure and may form a first bonding chip 23 and 25. The first bonding chip 23 and 25 may be formed by using the same method as that of the stacked integrated circuit 15 illustrated in FIG. 3. The through vias of the second through via set 253_1 to 253_4 may be connected to the front pads of the second front pad set 251_1 to 251_4, respectively. The through vias of the second through via set 253_1 to 253_4 may be connected to the back pads of the second back pad set 255_1 to 255_4, respectively. The third IO circuit 257_1 may be connected to the front pad 251_2 and may be connected to the second base IO circuit 213_2 that is allocated to the second channel CH2. The fourth IO circuit 257_3 may be connected to the front pad 251_4 and may be connected to the fourth base IO circuit 213_4 that is allocated to the second channel CH2. The third IO circuit 257_1 and the fourth IO circuit 257_3 may be formed as the first rank RANK1 and may input and output data or control signals through the second channel CH2. The back pads of the second back pad set 255_1 to 255_4 may be bonded to the back pads of a third back pad set 275_1 to 275_4 that are included in the third chip 27, respectively.

The third chip 27 may include a third front pad set 271_1 to 271_4, a third through via set 273_1 to 273_4, the third back pad set 275_1 to 275_4, a fifth IO circuit 277_1, and a sixth IO circuit 277_3. The front pads of the third front pad set 271_1 to 271_4 may be bonded to the front pads of a fourth front pad set 291_1 to 291_4 that are included in the fourth chip 29, respectively. The through vias of the third through via set 273_1 to 273_4 may be connected to the front pads of the third front pad set 271_1 to 271_4, respectively. The through vias of the third through via set 273_1 to 273_4 may be connected to the back pads of the third back pad set 275_1 to 275_4, respectively. The fifth IO circuit 277_1 may be connected to the front pad 271_1 and may be connected to the first base IO circuit 213_1 that is allocated to the first channel CH1. The sixth IO circuit 277_3 may be connected to the front pad 271_3 and may be connected to the third base IO circuit 213_3 that is allocated to the first channel CH1. The fifth IO circuit 277_1 and the sixth IO circuit 277_3 may be formed as a second rank RANK2 and may input and output data or control signals through the first channel CH1.

The fourth chip 29 may include the fourth front pad set 291_1 to 291_4, a fourth through via set 293_1 to 293_4, a seventh IO circuit 297_1, and an eighth IO circuit 297_3. The fourth chip 29 may be formed to be mirror image symmetrical to the third chip 27 and may be stacked on the third chip 27. The third chip 27 and the fourth chip 29 may be bonded together as a front face to front face bonding structure and may form a second bonding chip 27 and 29. The second bonding chip 27 and 29 may be formed by using the same method as that of the stacked integrated circuit 15 illustrated in FIG. 3. The through vias of the fourth through via set 293_1 to 293_4 may be connected to the front pads of the fourth front pad set 291_1 to 291_4, respectively. The seventh IO circuit 297_1 may be connected to the front pad 291_2 and may be connected to the second base IO circuit 213_2 that is allocated to the second channel CH2. The eighth IO circuit 297_3 may be connected to the front pad 291_4 and may be connected to the fourth base IO circuit 213_4 that is allocated to the second channel CH2. The seventh IO circuit 297_1 and the eighth IO circuit 297_3 may be formed as the second rank RANK2 and may input and output data or control signals through the second channel CH2.

The first chip 23 and the second chip 25 that are included in the stacked integrated circuit 20 may be bonded together as a front face to front face bonding structure and may form the first bonding chip 23 and 25. The third chip 27 and the fourth chip 29 that are included in the stacked integrated circuit 20 may be bonded together as a front face to front face bonding structure and may form the second bonding chip 27 and 29. Each of the first chip 23, the second chip 25, the third chip 27, and the fourth chip 29 that is included in the stacked integrated circuit 20 may be formed as a separate rank and may input and output data or control signals through a separate channel. More specifically, the first chip 23 that is included in the stacked integrated circuit 20 may be formed as the first rank RANK1 by the first IO circuit 237_1 and the second IO circuit 237_3 and may input and output data or control signals through the first channel CH1. Furthermore, the second chip 25 that is included in the stacked integrated circuit 20 may be formed as the first rank RANK1 by the third IO circuit 257_1 and the fourth IO circuit 257_3 and may input and output data or control signals through the second channel CH2. Furthermore, the third chip 27 that is included in the stacked integrated circuit 20 may be formed as the second rank RANK2 by the fifth IO circuit 277_1 and the sixth IO circuit 277_3 and may input and output data or control signals through the first channel CH1. Furthermore, the fourth chip 29 that is included in the stacked integrated circuit 20 may be formed as the second rank RANK2 by the seventh IO circuit 297_1 and the eighth IO circuit 297_3 and may input and output data or control signals through the second channel CH2.

Figure 5:
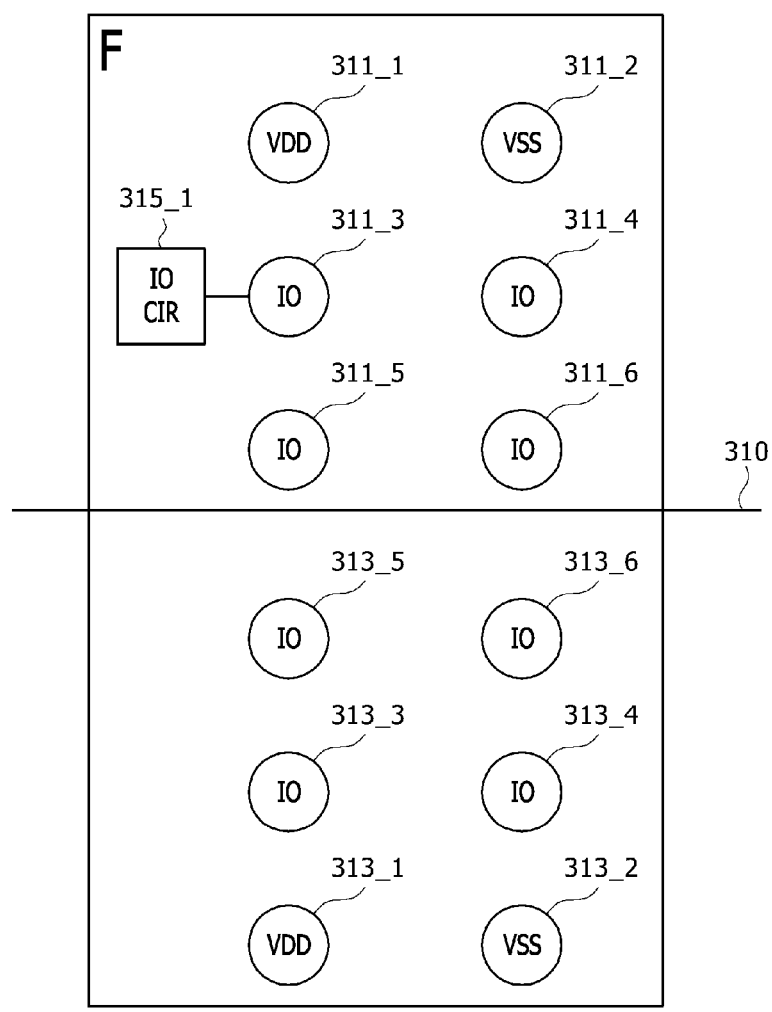
FIGS. 5 to 7 are plan views illustrating constructions of a stacked integrated circuit according to still another example of the present disclosure.

As illustrated in FIG. 5, a lower chip 31 may include a first through via set 311_1 to 311_6 that are disposed above a first rotating axis 310 and a second through via set 313_1 to 313_6 that are disposed below the first rotating axis 310. The first through via set 311_1 to 311_6 may include a through via 311_1 to which a power supply voltage VDD is supplied, a through via 311_2 to which a ground voltage VSS is supplied, and through vias 311_3 to 311_6 through which a control signal or data is input or output. The second through via set 313_1 to 313_6 may include a through via 313_1 to which the power supply voltage VDD is supplied, a through via 313_2 to which to which the ground voltage VSS is supplied, and through vias 313_3 to 313_6 through which a control signal or data is input or output. The first through via set 311_1 to 311_6 and the second through via set 313_1 to 313_6 may be disposed to be symmetrical to each other in relation to the first rotating axis 310. The lower chip 31 may include a first IO circuit (IO CIR) 315_1 that is disposed above the first rotating axis 310. The first IO circuit 315_1 may be connected to the through via 311_3 that is included in the first through via set 311_1 to 311_6.

Figure 6:
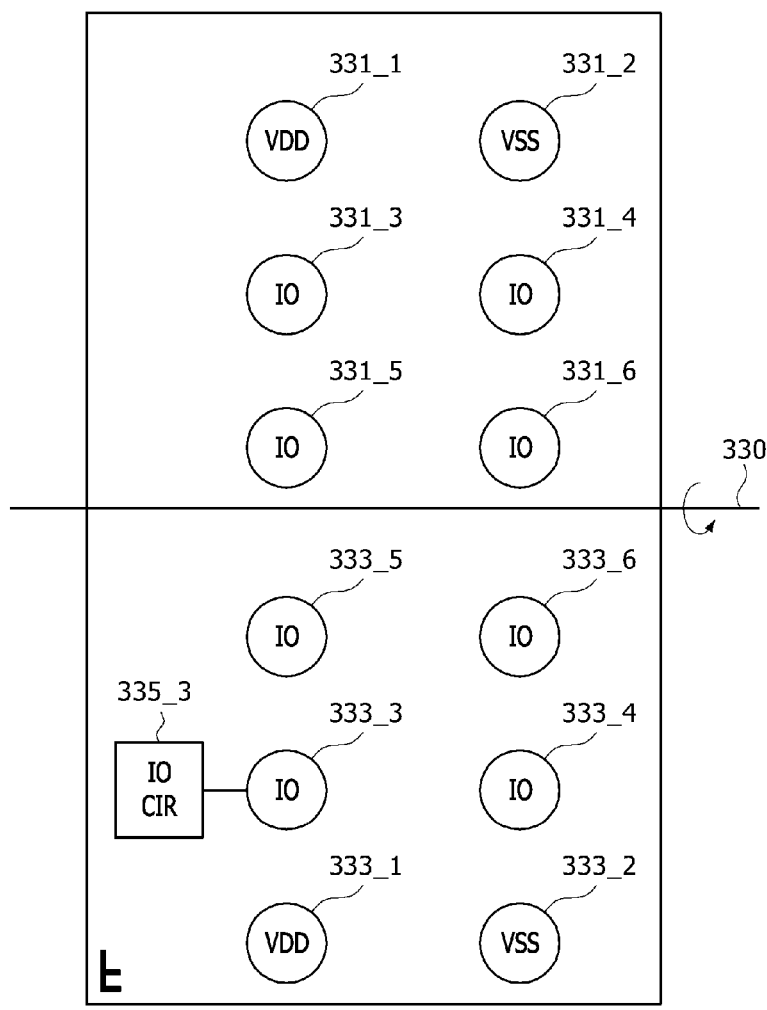

As illustrated in FIG. 6, an upper chip 33 may include a third through via set 333_1 to 333_6 that are disposed below the second rotating axis 330 and a fourth through via set 331_1 to 331_6 that are disposed above the second rotating axis 330. The third through via set 333_1 to 333_6 may include a through via 333_1 to which the power supply voltage VDD is supplied, a through via 333_2 to which the ground voltage VSS is supplied, and through vias 333_3 to 333_6 through which a control signal or data is input or output. The fourth through via set 331_1 to 331_6 may include a through via 331_1 to which the power supply voltage VDD is supplied, a through via 331_2 to which the ground voltage VSS is supplied, and through vias 331_3 to 331_6 through which a control signal or data is input or output. The third through via set 333_1 to 333_6 and the fourth through via set 331_1 to 331_6 may be disposed to be symmetrical to each other in relation to the second rotating axis 330. The upper chip 33 may include a second IO circuit (IO CIR) 335_3 that is disposed below the second rotating axis 330. The second IO circuit 335_3 may be connected to the through via 333_3 that is included in the third through via set 333_1 to 333_6. The upper chip 33 may be a chip that is formed by using the same method as that of the lower chip 31 but may be formed to be mirror image symmetrical to the lower chip 31.

Figure 7:
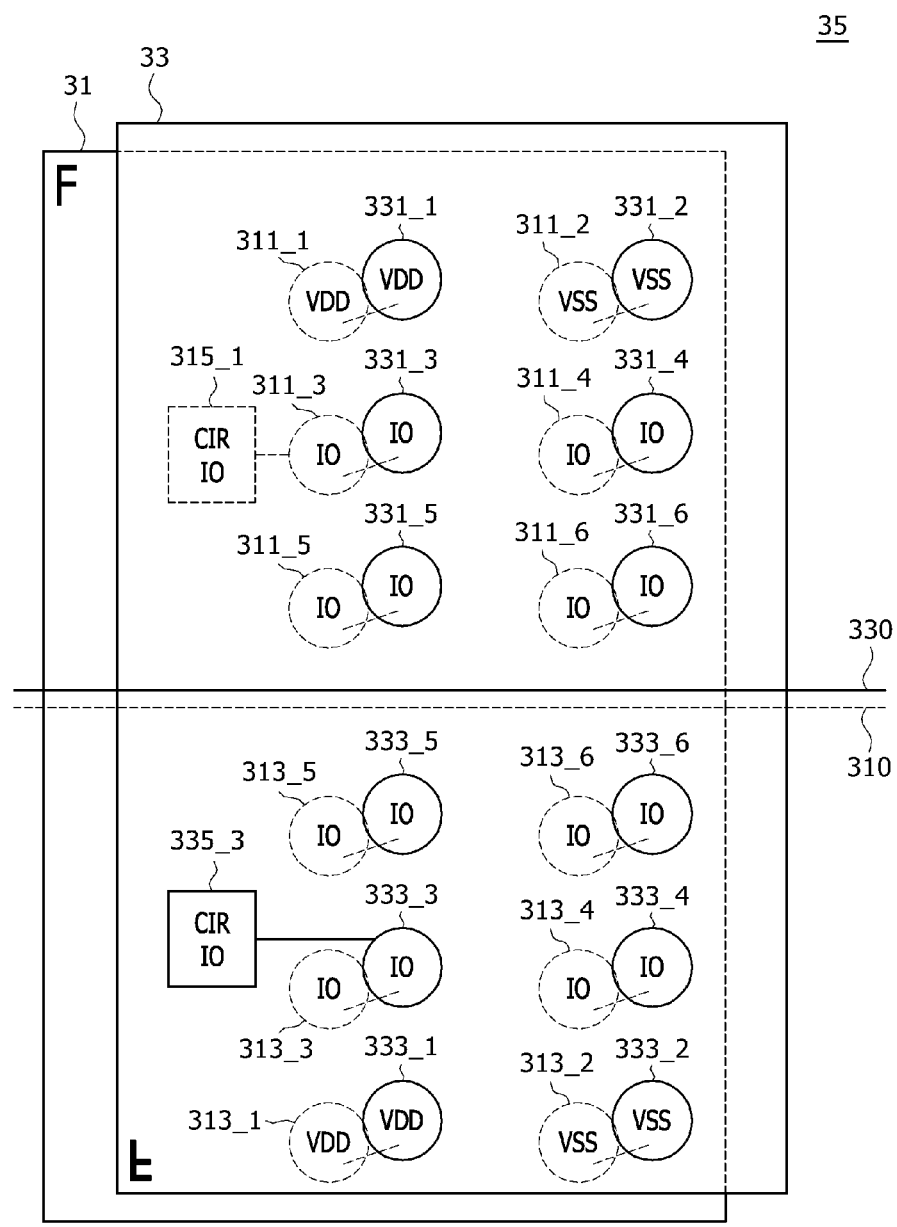

As illustrated in FIG. 7, a stacked integrated circuit 35 may be a 3-D stacked integrated circuit implemented in a way that the upper chip 33 illustrated in FIG. 6 is stacked on the lower chip 31 illustrated in FIG. 5. A method of stacking the upper chip 33, mirror image symmetrical to the lower chip 31, on the lower chip 31 may be defined as a front face to front face bonding structure. As the upper chip 33 is stacked on the lower chip 31, the through vias that are included in the first through via set 311_1 to 311_6 that are included in the lower chip 31 may be connected to the through vias that are included in the fourth through via set 331_1 to 331_6 that are included in the upper chip 33, respectively. More specifically, the through via 311_1 of the lower chip 31 to which the power supply voltage VDD is supplied may be connected to the through via 331_1 of the upper chip 33 to which the power supply voltage VDD is supplied. The through via 311_2 of the lower chip 31 to which the ground voltage VSS is supplied may be connected to the through via 331_2 of the upper chip 33 to which the ground voltage VSS is supplied. The through vias 311_3 to 311_6 of the lower chip 31 through which a control signal or data is input or output may be connected to the through vias 331_3 to 331_6 of the upper chip 33 through which a control signal or data is input or output, respectively. The through vias that are included in the second through via set 313_1 to 313_6 that are included in the lower chip 31 may be connected to the through vias that are included in the third through via set 333_1 to 333_6 that are included in the upper chip 33, respectively. More specifically, the through via 313_1 of the lower chip 31 to which the power supply voltage VDD is supplied may be connected to the through via 333_1 of the upper chip 33 to which the power supply voltage VDD is supplied. The through via 313_2 of the lower chip 31 to which the ground voltage VSS is supplied may be connected to the through via 333_2 of the upper chip 33 to which the ground voltage VSS is supplied. The through vias 313_3 to 313_6 of the lower chip 31 through which a control signal or data is input or output may be connected to the through vias 333_3 to 333_6 of the upper chip 33 through which a control signal or data is input or output, respectively. The first IO circuit 315_1 may be connected to the through via 311_3 of the lower chip 31. The second IO circuit 335_3 may be connected to the through via 333_3 of the upper chip 33. Each of the first IO circuit 315_1, the second IO circuit 115_3, the second IO circuit 335_3, and the fourth IO circuit 135_1 may be formed as a separate rank and may input and output data or control signals through a separate channel.

Figure 8:
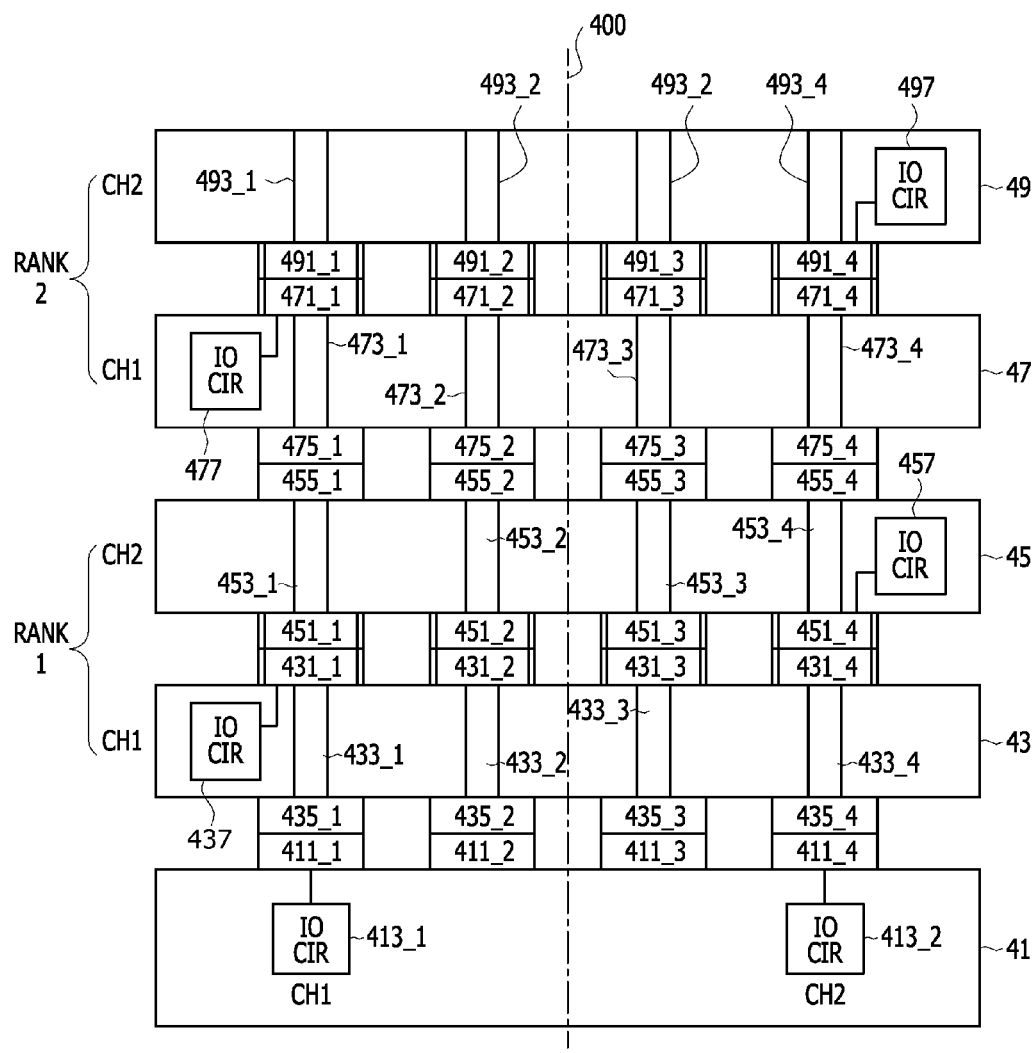
FIGS. 8 to 10 are side views each illustrating a construction of a stacked integrated circuit according to yet another example of the present disclosure.

FIG. 8 is a diagram illustrating a construction of a stacked integrated circuit 40 according to another example of the present disclosure. As illustrated in FIG. 8, the stacked integrated circuit 40 may include a base chip 41, a first chip 43, a second chip 45, a third chip 47, and a fourth chip 49.

The base chip 41 may include a first base IO circuit 413_1 and a second base IO circuit 413_2. Each of the first base IO circuit 413_1 and the second base IO circuit 413_2 may be allocated to a separate channel. The first base IO circuit 413_1 may be allocated to a first channel CH1, and the second base IO circuit 413_2 may be allocated to a second channel CH2. The base chip 41 may include a base pad set 411_1 to 411_4. The base pads of the base pad set 411_1 to 411_4 may be bonded to the back pads of a first back pad set 435_1 to 435_4 that are included in the first chip 43, respectively.

The first chip 43 may include a first front pad set 431_1 to 431_4, a first through via set 433_1 to 433_4, the first back pad set 435_1 to 435_4, and a first IO circuit 437. The front pads of the first front pad set 431_1 to 431_4 may be bonded to the front pads of a second front pad set 451_1 to 451_4 that are included in the second chip 45, respectively. The through vias of the first through via set 433_1 to 433_4 may be connected to the front pads of the first front pad set 431_1 to 431_4, respectively. The through vias of the first through via set 433_1 to 433_4 may be connected to the back pads of the first back pad set 435_1 to 435_4, respectively. The first IO circuit 437 may be connected to the front pad 431_1 and may be connected to the first base IO circuit 413_1 that is allocated to the first channel CH1 through the through via 433_1, the back pad 435_1, and the base pad 411_1. The first IO circuit 437 may be formed as a first rank RANK1 and may input and output data or control signals through the first channel CH1.

The second chip 45 may include the second front pad set 451_1 to 451_4, a second through via set 453_1 to 453_4, a second back pad set 455_1 to 455_4, and a second IO circuit 457. The second chip 45 may be formed to be mirror image symmetrical to the first chip 43 based on a rotating axis 400 and may be stacked on the first chip 43. The first chip 43 and the second chip 45 may be bonded together as a front face to front face bonding structure and may form a first bonding chip 43 and 45. The through vias of the second through via set 453_1 to 453_4 may be connected to the front pads of the second front pad set 451_1 to 451_4, respectively. The through vias of the second through via set 453_1 to 453_4 may be connected to the back pads of the second back pad set 455_1 to 455_4, respectively. The second IO circuit 457 may be connected to the front pad 451_4 and may be connected to the second base IO circuit 413_2 that is allocated to the second channel CH2. The second IO circuit 457 may be formed as the first rank RANK1 and may input and output data or control signals through the second channel CH2. The back pads of the second back pad set 455_1 to 455_4 may be bonded to the back pads of a third back pad set 475_1 to 475_4 that are included in the third chip 47, respectively.

The third chip 47 may include a third front pad set 471_1 to 471_4, a third through via set 473_1 to 473_4, the third back pad set 475_1 to 475_4, and a third IO circuit 477. The front pads of the third front pad set 471_1 to 471_4 may be bonded to the front pads of a fourth front pad set 491_1 to 491_4 that are included in the fourth chip 49, respectively. The through vias of the third through via set 473_1 to 473_4 may be connected to the front pads of the third front pad set 471_1 to 471_4, respectively. The through vias of the third through via set 473_1 to 473_4 may be connected to the back pads of the third back pad set 475_1 to 475_4, respectively. The third IO circuit 477 may be connected to the front pad 471_1 and may be connected to the first base IO circuit 413_1 that is allocated to the first channel CH1. The third IO circuit 477 may be formed as a second rank RANK2 and may input and output data or control signals through the first channel CH1.

The fourth chip 49 may include the fourth front pad set 491_1 to 491_4, a fourth through via set 493_1 to 493_4, and a fourth IO circuit 497. The fourth chip 49 may be formed to be mirror image symmetrical to the third chip 47 and may be stacked on the third chip 47. The third chip 47 and the fourth chip 49 may be bonded together as a front face to front face bonding structure and may form a second bonding chip 47 and 49. The through vias of the fourth through via set 493_1 to 493_4 may be connected to the front pads of the fourth front pad set 491_1 to 491_4, respectively. The fourth IO circuit 497 may be connected to the front pad 491_4 and may be connected to the second base IO circuit 413_2 that is allocated to the second channel CH2. The fourth IO circuit 497 may be formed as the second rank RANK2 and may input and output data or control signals through the second channel CH2.

The first chip 43 and the second chip 45 that are included in the stacked integrated circuit 40 may be bonded together as a front face to front face bonding structure and may form the first bonding chip 43 and 45. The third chip 47 and the fourth chip 49 that are included in the stacked integrated circuit 40 may be bonded together as a front face to front face bonding structure and may form the second bonding chip 47 and 49. Each of the first chip 43, the second chip 45, the third chip 47, and the fourth chip 49 that is included in the stacked integrated circuit 40 may be formed as a separate rank and may input and output data or control signals through a separate channel. More specifically, the first chip 43 that is included in the stacked integrated circuit 40 may be formed as the first rank RANK1 by the first IO circuit 437 and may input and output data or control signals through the first channel CH1. Furthermore, the second chip 45 that is included in the stacked integrated circuit 40 may be formed as the first rank RANK1 by the second IO circuit 457 and may input and output data or control signals through the second channel CH2. Furthermore, the third chip 47 that is included in the stacked integrated circuit 40 may be formed as the second rank RANK2 by the third IO circuit 477 and may input and output data or control signals through the first channel CH1. Furthermore, the fourth chip 49 that is included in the stacked integrated circuit 40 may be formed as the second rank RANK2 by the fourth IO circuit 497 and may input and output data or control signals through the second channel CH2.

Figure 9:
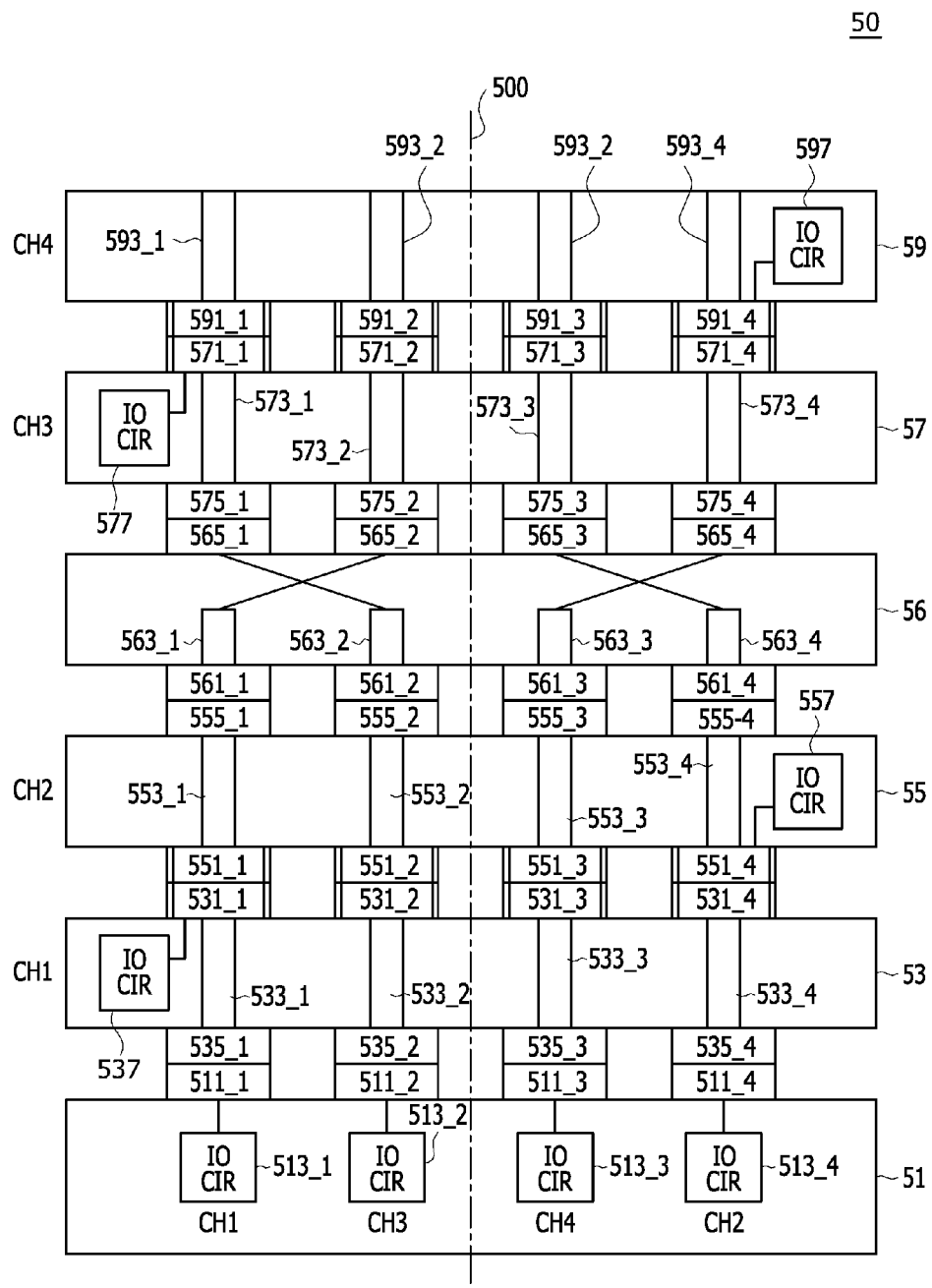

FIG. 9 is a diagram illustrating a construction of a stacked integrated circuit 50 according to another example of the present disclosure. As illustrated in FIG. 9, the stacked integrated circuit 50 may include a base chip 51, a first chip 53, a second chip 55, a dummy chip 56, a third chip 57, and a fourth chip 59.

The base chip 51 may include a first base IO circuit 513_1, a second base IO circuit 513_2, a third base IO circuit 513_3, and a fourth base IO circuit 513_4. Each of the first base IO circuit 513_1, the second base IO circuit 513_2, the third base IO circuit 513_3, and the fourth base IO circuit 513_4 may be allocated to a separate channel. The first base IO circuit 513_1 may be allocated to a first channel CH1, the second base IO circuit 513_2 may be allocated to a third channel CH3, the third base IO circuit 513_3 may be allocated to a fourth channel CH4, and the fourth base IO circuit 513_4 may be allocated to a second channel CH2. The base chip 51 may include a base pad set 511_1 to 511_4. The base pads of the base pad set 511_1 to 511_4 may be bonded to the back pads of a first back pad set 535_1 to 535_4 that are included in the first chip 53, respectively.

The first chip 53 may include a first front pad set 531_1 to 531_4, a first through via set 533_1 to 533_4, the first back pad set 535_1 to 535_4, and a first IO circuit 537. The front pads of the first front pad set 531_1 to 531_4 may be bonded to the front pads of a second front pad set 551_1 to 551_4 that are included in the second chip 55, respectively. The through vias of the first through via set 533_1 to 533_4 may be connected to the front pads of the first front pad set 531_1 to 531_4, respectively. The through vias of the first through via set 533_1 to 533_4 may be connected to the back pads of the first back pad set 535_1 to 535_4, respectively. The first IO circuit 537 may be connected to the front pad 531_1 and may be connected to the first base IO circuit 513_1 that is allocated to the first channel CH1 through the through via 533_1, the back pad 535_1, and the base pad 511_1. The first IO circuit 537 may input and output data or control signals through the first channel CH1.

The second chip 55 may include the second front pad set 551_1 to 551_4, a second through via set 553_1 to 553_4, a second back pad set 555_1 to 555_4, and a second IO circuit 557. The second chip 55 may be formed to be mirror image symmetrical to the first chip 53 based on a rotating axis 500 and may be stacked on the first chip 53. The first chip 53 and the second chip 55 may be bonded together as a front face to front face bonding structure and may form a first bonding chip 53 and 55. The through vias of the second through via set 553_1 to 553_4 may be connected to the front pads of the second front pad set 551_1 to 551_4, respectively. The through vias of the second through via set 553_1 to 553_4 may be connected to the back pads of the second back pad set 555_1 to 555_4, respectively. The second IO circuit 557 may be connected to the front pad 551_4 and may be connected to the fourth base IO circuit 513_4 that is allocated to the second channel CH2. The second IO circuit 557 may input and output data or control signals through the second channel CH2. The back pads of the second back pad set 555_1 to 555_4 may be bonded to the dummy pads of a first dummy pad set 561_1 to 561_4 that are included in the dummy chip 56, respectively.

The dummy chip 56 may include the first dummy pad set 561_1 to 561_4, a dummy via set 563_1 to 563_4, and a second dummy pad set 565_1 to 565_4. The dummy vias of the dummy via set 563_1 to 563_4 may be connected to the dummy pads of the first dummy pad set 561_1 to 561_4, respectively. The dummy vias of the dummy via set 563_1 to 563_4 may be connected to the dummy pads of the second dummy pad set 565_1 to 565_4, respectively. A configuration of the dummy vias of the dummy via set 563_1 to 563_4 being connected to the dummy pads of the second dummy pad set 565_1 to 565_4, respectively, may be different from a configuration of the dummy vias of the dummy via set 563_1 to 563_4 being connected to the dummy pads of the first dummy pad set 561_1 to 561_4, respectively. That is, the dummy vias of the dummy via set 563_1 to 563_4 may be directly connected to the dummy pads of the first dummy pad set 561_1 to 561_4, respectively, whereas the dummy vias of the dummy via set 563_1 to 563_4 may be connected to the dummy pads of the second dummy pad set 565_1 to 565_4, respectively, in a criss-cross manner. The dummy pads of the second dummy pad set 565_1 to 565_4 may be bonded to the back pads of a third back pad set 575_1 to 575_4 that are included in the third chip 57, respectively.

The third chip 57 may include a third front pad set 571_1 to 571_4, a third through via set 573_1 to 573_4, the third back pad set 575_1 to 575_4, and a third IO circuit 577. The front pads of the third front pad set 571_1 to 571_4 may be bonded to the front pads of a fourth front pad set 591_1 to 591_4 that are included in the fourth chip 59, respectively. The through vias of the third through via set 573_1 to 573_4 may be connected to the front pads of the third front pad set 571_1 to 571_4, respectively. The through vias of the third through via set 573_1 to 573_4 may be connected to the back pads of the third back pad set 575_1 to 575_4, respectively. The third IO circuit 577 may be connected to the front pad 571_1 and may be connected to the second base IO circuit 513_2 that is allocated to the third channel CH3 through the dummy via 563_2 of the dummy chip 56. The third IO circuit 577 may input and output data or control signals through the third channel CH3.

The fourth chip 59 may include the fourth front pad set 591_1 to 591_4, a fourth through via set 593_1 to 593_4, and a fourth IO circuit 597. The fourth chip 59 may be formed to be mirror image symmetrical to the third chip 57 and may be stacked on the third chip 57. The third chip 57 and the fourth chip 59 may be bonded together as a front face to front face bonding structure and may form a second bonding chip 57 and 59. The through vias of the fourth through via set 593_1 to 593_4 may be connected to the front pads of the fourth front pad set 591_1 to 591_4, respectively. The fourth IO circuit 597 may be connected to the front pad 591_4 and may be connected to the third base IO circuit 513_3 that is allocated to the fourth channel CH4 through the dummy via 563_3 of the dummy chip 56. The fourth IO circuit 597 may input and output data or control signals through the fourth channel CH4.

The first chip 53 and the second chip 55 that are included in the stacked integrated circuit 50 may be bonded together as a front face to front face bonding structure and may form the first bonding chip 53 and 55. The third chip 57 and the fourth chip 59 that are included in the stacked integrated circuit 50 may be bonded together as a front face to front face bonding structure and may form the second bonding chip 57 and 59. Each of the first chip 53, the second chip 55, the third chip 57, and the fourth chip 59 that is included in the stacked integrated circuit 50 may be formed as a separate rank and may input and output data or control signals through a separate channel. The first chip 53 that is included in the stacked integrated circuit 50 may input and output data or control signals through the first channel CH1 based on the first IO circuit 537. Furthermore, the second chip 55 that is included in the stacked integrated circuit 50 may input and output data or control signals through the second channel CH2 based on the second IO circuit 557. Furthermore, the third chip 57 that is included in the stacked integrated circuit 50 may be connected to the second base IO circuit 513_2 through the dummy via 563_2 of the dummy chip 56 by the third IO circuit 577 and may input and output data or control signals through the third channel CH3. Furthermore, the fourth chip 59 that is included in the stacked integrated circuit 50 may be connected to the third base IO circuit 513_3 through the dummy via 563_3 of the dummy chip 56 by the fourth IO circuit 597 and may input and output data or control signals through the fourth channel CH4.

Figure 10:
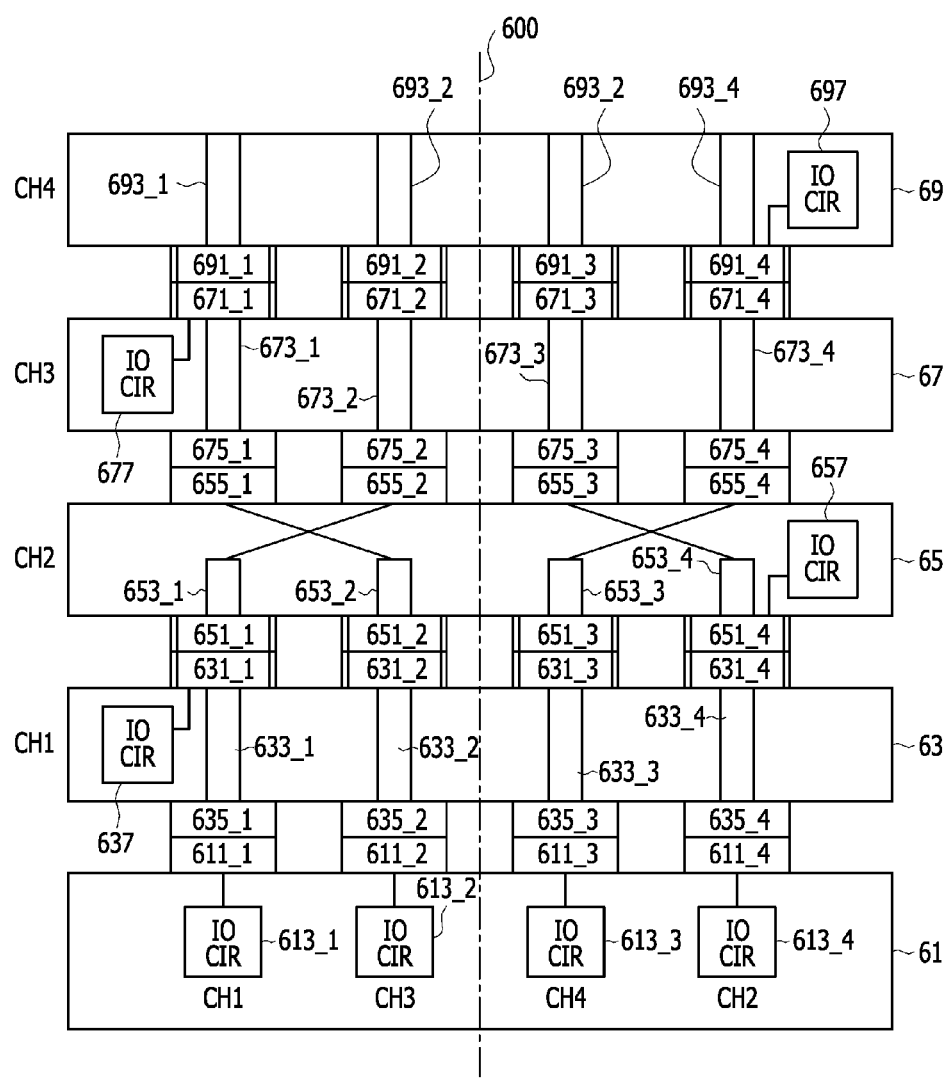

FIG. 10 is a diagram illustrating a construction of a stacked integrated circuit 60 according to another example of the present disclosure. As illustrated in FIG. 10, the stacked integrated circuit 60 may include a base chip 61, a first chip 63, a second chip 65, a third chip 67, and a fourth chip 69.

The base chip 61 may include a first base IO circuit 613_1, a second base IO circuit 613_2, a third base IO circuit 613_3, and a fourth base IO circuit 613_4. Each of the first base IO circuit 613_1, the second base IO circuit 613_2, the third base IO circuit 613_3, and the fourth base IO circuit 613_4 may be allocated to a separate channel. The first base IO circuit 613_1 may be allocated to a first channel CH1, the second base IO circuit 613_2 may be allocated to a third channel CH3, the third base IO circuit 613_3 may be allocated to a fourth channel CH4, and the fourth base IO circuit 613_4 may be allocated to a second channel CH2. The base chip 61 may include a base pad set 611_1 to 611_4. The base pads of the base pad set 611_1 to 611_4 may be bonded to the back pads of a first back pad set 635_1 to 635_4 that are included in the first chip 63, respectively.

The first chip 63 may include a first front pad set 631_1 to 631_4, a first through via set 633_1 to 633_4, the first back pad set 635_1 to 635_4, and a first IO circuit 637. The front pads of the first front pad set 631_1 to 631_4 may be bonded to the front pads of a second front pad set 651_1 to 651_4 that are included in the second chip 65, respectively. The through vias of the first through via set 633_1 to 633_4 may be connected to the front pads of the first front pad set 631_1 to 631_4, respectively. The through vias of the first through via set 633_1 to 633_4 may be connected to the back pads of the first back pad set 635_1 to 635_4, respectively. The first IO circuit 637 may be connected to the front pad 631_1 and may be connected to the first base IO circuit 613_1 that is allocated to the first channel CH1 through the through via 633_1, the back pad 635_1, and the base pad 611_1. The first IO circuit 637 may input and output data or control signals through the first channel CH1.

The second chip 65 may include the second front pad set 651_1 to 651_4, a second through via set 653_1 to 653_4, a second back pad set 655_1 to 655_4, and a second IO circuit 657. The second chip 65 may be formed to be mirror image symmetrical to the first chip 63 and may be stacked on the first chip 63. The first chip 63 and the second chip 65 may be bonded together as a front face to front face bonding structure and may form a first bonding chip 63 and 65. The through vias of the second through via set 653_1 to 653_4 may be connected to the front pads of the second front pad set 651_1 to 651_4, respectively. The through vias of the second through via set 653_1 to 653_4 may be connected to the back pads of the second back pad set 655_1 to 655_4, respectively. A method of the through vias of the second through via set 653_1 to 653_4 being connected to the back pads of the second back pad set 655_1 to 655_4, respectively, may be configured differently from a method of the through vias of the second through via set 653_1 to 653_4 being connected to the front pads of the second front pad set 651_1 to 651_4, respectively. That is, the through vias of the second through via set 653_1 to 653_4 are directly connected to the front pads of the second front pad set 651_1 to 651_4, respectively, whereas the through vias of the second through via set 653_1 to 653_4 are connected to the back pads of the second back pad set 655_1 to 655_4, respectively, in a cross manner. The second IO circuit 657 may be connected to the front pad 651_4 and may be connected to the fourth base IO circuit 613_4 that is allocated to the second channel CH2. The second IO circuit 657 may input and output data or control signals through the second channel CH2. The back pads of the second back pad set 655_1 to 655_4 may be bonded to the back pads of a third back pad set 675_1 to 675_4 that are included in the third chip 67, respectively.

The third chip 67 may include a third front pad set 671_1 to 671_4, a third through via set 673_1 to 673_4, the third back pad set 675_1 to 675_4, and a third IO circuit 677. The front pads of the third front pad set 671_1 to 671_4 may be bonded to the front pads of a fourth front pad set 691_1 to 691_4 that are included in the fourth chip 69, respectively. The through vias of the third through via set 673_1 to 673_4 may be connected to the front pads of the third front pad set 671_1 to 671_4, respectively. The through vias of the third through via set 673_1 to 673_4 may be connected to the back pads of the third back pad set 675_1 to 675_4, respectively. The third IO circuit 677 may be connected to the front pad 671_1 and may be connected to the second base IO circuit 613_2 that is allocated to the third channel CH3 through the through via 653_2 of the second chip 65. The third IO circuit 677 may input and output data or control signals through the third channel CH3.

The fourth chip 69 may include the fourth front pad set 691_1 to 691_4, a fourth through via set 693_1 to 693_4, and a fourth IO circuit 697. The fourth chip 69 may be formed to be mirror image symmetrical to the third chip 67 and may be stacked on the third chip 67. The third chip 67 and the fourth chip 69 may be bonded together as a front face to front face bonding structure and may form a second bonding chip 67 and 69. The through vias of the fourth through via set 693_1 to 693_4 may be connected to the front pads of the fourth front pad set 691_1 to 691_4, respectively. The fourth IO circuit 697 may be connected to the front pad 671_4 and may be connected to the third base IO circuit 613_3 that is allocated to the fourth channel CH4 through the through via 653_3 of the second chip 65. The fourth IO circuit 697 may input and output data or control signals through the fourth channel CH4.

The first chip 63 and the second chip 65 that are included in the stacked integrated circuit 60 may be bonded together as a front face to front face bonding structure and may form the first bonding chip 63 and 65. The third chip 67 and the fourth chip 69 that are included in the stacked integrated circuit 60 may be bonded together as a front face to front face bonding structure and may form the second bonding chip 67 and 69. Each of the first chip 63, the second chip 65, the third chip 67, and the fourth chip 69 that is included in the stacked integrated circuit 60 may be formed as a separate rank and may input and output data or control signals through a separate channel. The first chip 63 that is included in the stacked integrated circuit 60 may input and output data or control signals through the first channel CH1 based on the first IO circuit 637. Furthermore, the second chip 65 that is included in the stacked integrated circuit 60 may input and output data or control signals through the second channel CH2 based on the second IO circuit 657. Furthermore, the third chip 67 that is included in the stacked integrated circuit 60 may be connected to the second base IO circuit 613_2 through the through via 653_2 of the second chip 65 by the third IO circuit 677 and may input and output data or control signals through the third channel CH3. Furthermore, the fourth chip 69 that is included in the stacked integrated circuit 60 may be connected to the third base IO circuit 613_3 through the through via 653_3 of the second chip 65 by the fourth IO circuit 697 and may input and output data or control signals through the fourth channel CH4.

Figure 11:
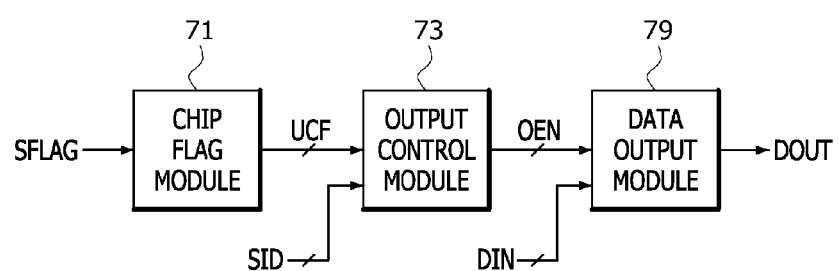
FIG. 11 is a block diagram illustrating a construction of a stacked integrated circuit according to still yet another example of the present disclosure.

FIG. 11 is a block diagram illustrating a construction of a stacked integrated circuit 7 according to still another example of the present disclosure. As illustrated in FIG. 11, the stacked integrated circuit 7 may include a chip flag module 71, an output control module 73, and a data output module 79.

The chip flag module 71 may generate a chip flag UCF including information on whether a chip is a lower chip or an upper chip based on a source flag SFLAG. The source flag SFLAG may be received from an external device of the stacked integrated circuit 7. The external device of the stacked integrated circuit 7 may be implemented as one of a memory controller (1002 in FIG. 20), a controller (2300 in FIG. 21), and a test device. The source flag SFLAG may be configured to be generated to a preset logic level when a preset operation is performed. The preset operation may include a read operation of outputting data or a control signal, a write operation of inputting data or a control signal, an operation of generating a chip ID, etc. In the present embodiment, the preset logic level of the source flag SFLAG may be set to a logic high level, but this is merely an embodiment and the present disclosure is not limited thereto. The chip flag module 71 may be included in each of the lower chips (11 in FIGS. 1 and 3, 23 and 27 in FIGS. 4, 43 and 47 in FIGS. 8, 53 and 57 in FIG. 9, and 63 and 67 in FIG. 10) and may generate, from the source flag SFLAG, the chip flag UCF including information regarding the lower chip. For example, the chip flag module 71 that is included in each of the lower chips (11 in FIGS. 1 and 3, 23 and 27 in FIGS. 4, 43 and 47 in FIGS. 8, 53 and 57 in FIG. 9, and 63 and 67 in FIG. 10) may generate the chip flag UCF that is set as a logic low level by receiving the source flag SFLAG that has been inverted and buffered. The chip flag module 71 may be included in each of the upper chips (13 in FIGS. 2 and 3, 25 and 29 in FIGS. 4, 45 and 49 in FIGS. 8, 55 and 59 in FIG. 9, and 65 and 69 in FIG. 10) and may generate, from the source flag SFLAG, the chip flag UCF including information with regard to the upper chip. For example, the chip flag module 71 that is included in each of the upper chips (13 in FIGS. 2 and 3, 25 and 29 in FIGS. 4, 45 and 49 in FIGS. 8, 55 and 59 in FIG. 9, and 65 and 69 in FIG. 10) may generate the chip flag UCF that is set as a logic high level by receiving the source flag SFLAG.

The output control module 73 may receive the chip flag UCF from the chip flag module 71 and may receive a selection ID SID from the external device of the stacked integrated circuit 7. The selection ID SID may be configured to be generated to a preset logic bit set when a preset operation is performed. The selection ID SID may include multiple bits. All bits that are included in a preset logic bit set of the selection ID SID may be set to a logic low level, but this is merely an embodiment and the present disclosure is not limited thereto. The output control module 73 may generate an output control signal OEN based on the chip flag UCF and the selection ID SID. The output control module 73 may generate a chip ID (CID1 or CID3 in FIG. 13) through a first path determined based on the chip flag UCF in each of the lower chips (11 in FIGS. 1 and 3, 23 and 27 in FIGS. 4, 43 and 47 in FIGS. 8, 53 and 57 in FIG. 9, and 63 and 67 in FIG. 10). The output control module 73 may generate a chip ID (CID2 or CID4 in FIG. 13) through a second path that is determined based on the chip flag UCF in each of the upper chips (13 in FIGS. 2 and 3, 25 and 29 in FIGS. 4, 45 and 49 in FIGS. 8, 55 and 59 in FIG. 9, and 65 and 69 in FIG. 10). The output control module 73 may generate the output control signal OEN that determines, based on each of the lower chips (23 and 27 in FIGS. 4, 43 and 47 in FIGS. 8, 53 and 57 in FIG. 9, and 63 and 67 in FIG. 10), whether to output internal data DIN in a read operation by comparing the chip ID (CID1 or CID3 in FIG. 13) and the selection ID SID. The output control module 73 may generate the output control signal OEN that determines, based on each of the upper chips (13 in FIGS. 2 and 3, 25 and 29 in FIGS. 4, 45 and 49 in FIGS. 8, 55 and 59 in FIG. 9, and 65 and 69 in FIG. 10), whether to output the internal data DIN in a read operation by comparing the chip ID (CID2 or CID4 in FIG. 13) and the selection ID SID.

The data output module 79 may receive the output control signal OEN from the output control module 73. The data output module 79 may control whether to output, as output data DOUT, the internal data DIN that is output by a memory cell array (not illustrated) after the start of a read operation based on the output control signal OEN.

Figure 12:
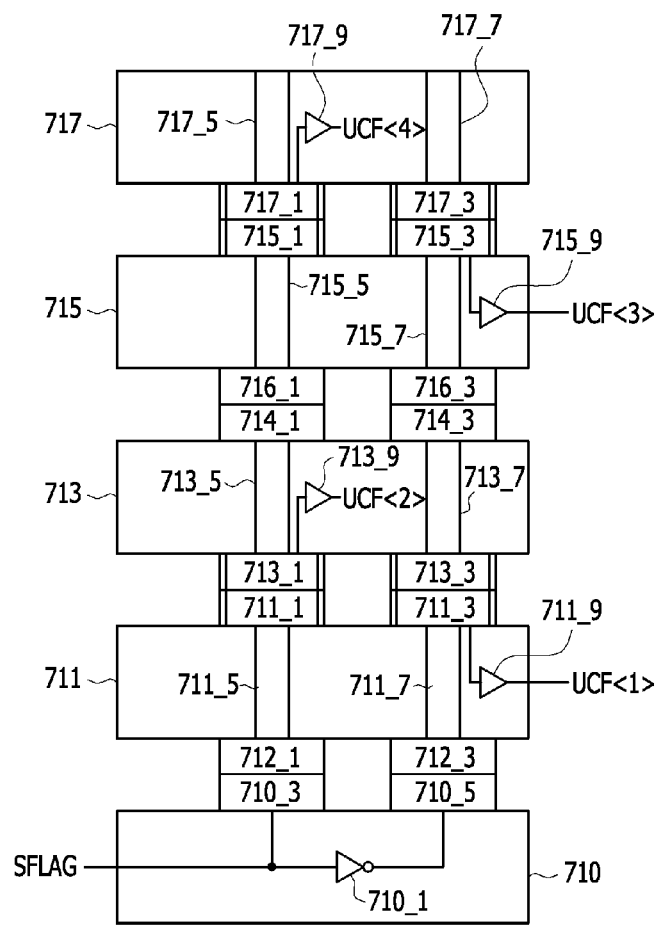
FIG. 12 is a side view illustrating a construction of a chip flag module according to an example of the present disclosure.

FIG. 12 is a diagram illustrating a construction of a chip flag module 71A according to an example of the present disclosure. As illustrated in FIG. 12, the chip flag module 71A may include a source flag reception module 710, a first chip flag module 711, a second chip flag module 713, a third chip flag module 715, and a fourth chip flag module 717.

The source flag reception module 710 may include an inverter 710_1 and a source flag pad set 710_3 and 710_5. The inverter 710_1 may output the source flag SFLAG by inverting and buffering the source flag SFLAG. The source flag reception module 710 may receive the source flag SFLAG and may output the source flag SFLAG or the source flag SFLAG, inverted and buffered through the inverter 710_1, to the source flag pad set 710_3 and 710_5. The source flag pads of the source flag pad set 710_3 and 710_5 may be bonded to the back flag pads of a first back flag pad set 712_1 and 712_3 that are included in the first chip flag module 711, respectively. The source flag reception module 710 may deliver the source flag SFLAG to the first chip flag module 711 through the source flag pad 710_3 and the back flag pad 712_1. The source flag reception module 710 may deliver the source flag SFLAG, inverted and buffered through the inverter 710_1, to the first chip flag module 711 through the source flag pad 710_5 and the back flag pad 712_3. The source flag reception module 710 may be included in the base chip (21 in FIG. 4, 41 in FIG. 8, 51 in FIG. 9, or 61 FIG. 10).

The first chip flag module 711 may include a first front flag pad set 711_1 and 711_3, a first flag through via set 711_5 and 711_7, a first flag driver 711_9, and the first back flag pad set 712_1 and 712_3. The front flag pads of the first front flag pad set 711_1 and 711_3 may be bonded to the front flag pads of a second front flag pad set 713_1 and 713_3 that are included in the second chip flag module 713, respectively. Flag through vias that are included in the first flag through via set 711_5 and 711_7 may be connected to the front flag pads of the first front flag pad set 711_1 and 711_3, respectively. The flag through vias that are included in the first flag through via set 711_5 and 711_7 may be connected to the back flag pads of the first back flag pad set 712_1 and 712_3, respectively. The first flag driver 711_9 may be connected to the front flag pad 711_3 and may drive a first bit UCF<1> of the chip flag UCF based on the inverted-buffered source flag SFLAG. For example, when the source flag SFLAG is set to a logic high level, the first flag driver 711_9 may generate the first bit UCF<1> of the chip flag UCF driven to a logic low level. The first chip flag module 711 may be included in the first chip (23 in FIG. 4, 43 in FIG. 8, 53 in FIG. 9, or 63 in FIG. 10).

The second chip flag module 713 may include the second front flag pad set 713_1 and 713_3, a second flag through via set 713_5 and 713_7, a second flag driver 713_9, and a second back flag pad set 714_1 and 714_3. Flag through vias that are included in the first flag through via set 711_5 and 711_7 may be connected to the front flag pads of the second front flag pad set 713_1 and 713_3, respectively. Flag through vias that are included in the second flag through via set 713_5 and 713_7 may be connected to the back flag pads of the second back flag pad set 714_1 and 714_3, respectively. The second flag driver 713_9 may be connected to the front flag pad 713_1 and may drive a second bit UCF<2> of the chip flag UCF based on the source flag SFLAG. For example, when the source flag SFLAG is set to a logic high level, the second flag driver 713_9 may generate the second bit UCF<2> of the chip flag UCF driven in the logic high level. The back flag pads of the second back flag pad set 714_1 and 714_3 may be bonded to the back flag pads of a third back flag pad set 716_1 and 716_3 that are included in the third chip flag module 715, respectively. The second chip flag module 713 may be included in the second chip (25 in FIG. 4, 45 in FIG. 8, 55 in FIG. 9, or 65 in FIG. 10).

The third chip flag module 715 may include a third front flag pad set 715_1 and 715_3, a third flag through via set 715_5 and 715_7, a third flag driver 715_9, and the third back flag pad set 716_1 and 716_3. The front flag pads of the third front flag pad set 715_1 and 715_3 may be bonded to the front flag pads of a fourth front flag pad set 717_1 and 717_3 that are included in the fourth chip flag module 717, respectively. Flag through vias that are included in the third flag through via set 715_5 and 715_7 may be connected to the front flag pads of the third front flag pad set 715_1 and 715_3, respectively. The flag through vias that are included in the third flag through via set 715_5 and 715_7 may be connected to the back flag pads of the third back flag pad set 716_1 and 716_3, respectively. The third flag driver 715_9 may be connected to the front flag pad 715_3 and may drive a third bit UCF<3> of the chip flag UCF based on the inverted-buffered source flag SFLAG. For example, when the source flag SFLAG is set to a logic high level, the third flag driver 715_9 may generate the third bit UCF<3> of the chip flag UCF driven in the logic low level. The third chip flag module 715 may be included in the third chip (27 in FIG. 4, 47 in FIG. 8, 57 in FIG. 9, or 67 in FIG. 10).

The fourth chip flag module 717 may include the fourth front flag pad set 717_1 and 717_3, a fourth flag through via set 717_5 and 717_7, and a fourth flag driver 717_9. Flag through vias that are included in the fourth flag through via set 717_5 and 717_7 may be connected to the front flag pads of the fourth front flag pad set 717_1 and 717_3, respectively. The fourth flag driver 717_9 may be connected to the front flag pad 717_1 and may drive a fourth bit UCF<4> of the chip flag UCF based on the source flag SFLAG. For example, when the source flag SFLAG is set to a logic high level, the fourth flag driver 717_9 may generate the fourth bit UCF<4> of the chip flag UCF that is driven to the logic high level. The fourth chip flag module 717 may be included in the fourth chip (29 in FIG. 4, 49 in FIG. 8, 59 in FIG. 9, or 69 in FIG. 10).

Figure 13:
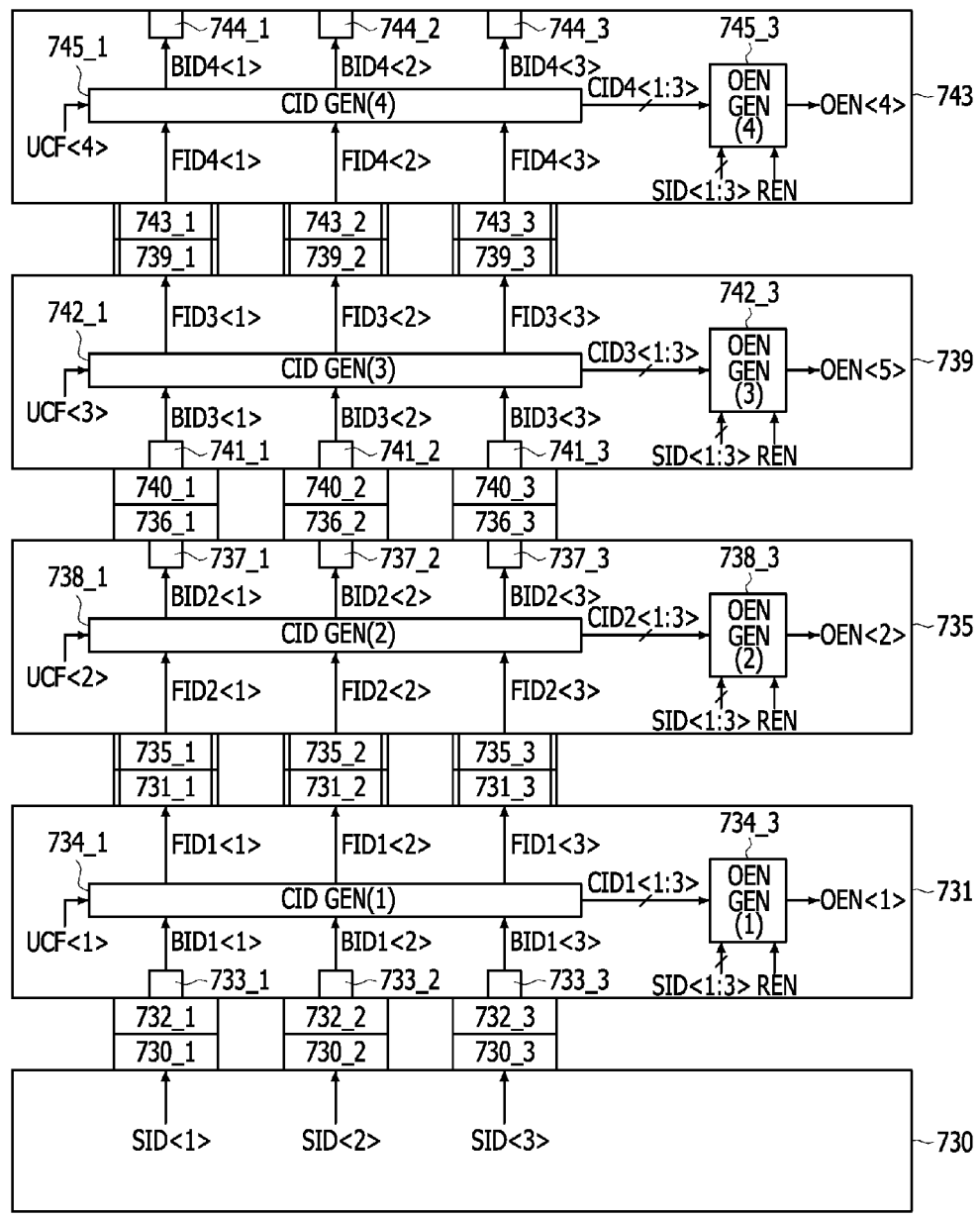
FIG. 13 is a side view illustrating a construction of an output control module according to an example of the present disclosure.

FIG. 13 is a diagram illustrating a construction of an output control module 73A according to an example of the present disclosure. As illustrated in FIG. 13, the output control module 73A may include a source control module 730, a first chip output control module 731, a second chip output control module 735, a third chip output control module 739, and a fourth chip output control module 743.

The source control module 730 may include a source control pad set 730_1, 730_2, and 730_3. The source control module 730 may receive selection IDs SID<1:3> and may output the selection IDs SID<1:3> to the source control pad set 730_1, 730_2, and 730_3. More specifically, the source control module 730 may output the first bit SID<1> of the selection ID SID to the source control pad 730_1, may output the second bit SID<2> of the selection ID SID to the source control pad 730_2 and may output the third bit SID<3> of the selection ID SID to the source control pad 730_3.

The first chip output control module 731 may include a first front control pad set 731_1, 731_2, and 731_3, a first back control pad set 732_1, 732_2, and 732_3, a first control through via set 733_1, 733_2, and 733_3, a first chip ID generation circuit (CID GEN(1)) 734_1, and a first output control signal generation circuit (OEN GEN(1)) 734_3. The front flag pads of the first front control pad set 731_1, 731_2, and 731_3 may be bonded to the front flag pads of a second front control pad set 735_1, 735_2, and 735_3 that are included in the second chip output control module 735, respectively. Control through vias that are included in the first control through via set 733_1, 733_2, and 733_3 may be connected to the back flag pads of the first back control pad set 732_1, 732_2, and 732_3, respectively. The first chip ID generation circuit 734_1 may receive first back IDs BID1<1:3> through the first control through via set 733_1, 733_2, and 733_3. The first chip ID generation circuit 734_1 may generate first chip IDs CID1<1:3> and first front IDs FID1<1:3> from the first back IDs BID1<1:3> through a first path that is configured based on the first bit UCF<1> of the chip flag UCF. The first back IDs BID1<1:3> may be set as the same logic bit set as the selection IDs SID<1:3> and the first chip IDs CID1<1:3> may be set as the same logic bit set as the first back IDs BID1<1:3>. However, this is merely an embodiment and the present disclosure is not limited thereto. The first front IDs FID1<1:3> may be generated by counting the first back IDs BID1<1:3>. For example, when a logic bit set of the first back IDs BID1<1:3> is "000", a logic bit set of the first front IDs FID1<1:3> may be set as "001" that is up-counted by 1 bit. The first output control signal generation circuit 734_3 may receive the first chip IDs CID1<1:3> from the first chip ID generation circuit 734_1. The first output control signal generation circuit 734_3 may generate a first bit OEN<1> of the output control signal OEN that is activated when the first chip IDs CID1<1:3> and the selection IDs SID<1:3> are set as the same logic bit set. The first chip output control module 731 may be included in the first chip (23 in FIG. 4, 43 in FIG. 8, 53 in FIG. 9, or 63 in FIG. 10).

The second chip output control module 735 may include the second front control pad set 735_1, 735_2, and 735_3, a second back control pad set 736_1, 736_2, and 736_3, a second control through via set 737_1, 737_2, and 737_3, a second chip ID generation circuit (CID GEN(2)) 738_1, and a second output control signal generation circuit (OEN GEN(2)) 738_3. The back control pads of the second back control pad set 736_1, 736_2, and 736_3 may be bonded to the back control pads of a third back control pad set 740_1, 740_2, and 740_3 that are included in the third chip output control module 739, respectively. Control through vias that are included in the second control through via set 737_1, 737_2, and 737_3 may be connected to the back flag pads of the second back control pad set 736_1, 736_2, and 736_3, respectively. The second chip ID generation circuit 738_1 may receive second front IDs FID2<1:3> through the second front control pad set 735_1, 735_2, and 735_3. The first chip ID generation circuit 734_1 may generate second chip IDs CID2<1:3> and second front IDs BID2<1:3> from the second front IDs FID2<1:3> through a second path that is configured based on the second bit UCF<2> of the chip flag UCF. The second front IDs FID2<1:3> may be set as the same logic bit set as the first front IDs FID1<1:3> and the second chip IDs CID2<1:3> may be set as the same logic bit set as the second front IDs FID2<1:3>. However, this is merely an embodiment and the present disclosure is not limited thereto. The second back IDs BID2<1:3> may be generated by counting the second front IDs FID2<1:3>. For example, when a logic bit set of the second front IDs FID2<1:3> is set "001", a logic bit set of the second back IDs BID2<1:3> may be set as "010" that is up-counted by 1 bit. The second output control signal generation circuit 738_3 may receive the second chip IDs CID2<1:3> from the second chip ID generation circuit 738_1. The second output control signal generation circuit 738_3 may generate a second bit OEN<2> of the output control signal OEN that is activated when the second chip IDs CID2<1:3> and the selection IDs SID<1:3> are set as the same logic bit set. The second chip output control module 735 may be included in the second chip (25 in FIG. 4, 45 in FIG. 8, 55 in FIG. 9, or 65 in FIG. 10).

The third chip output control module 739 may include a third front control pad set 739_1, 739_2, and 739_3, the third back control pad set 740_1, 740_2, and 740_3, a third control through via set 741_1, 741_2, and 741_3, a third chip ID generation circuit (CID GEN(3)) 742_1, and a third output control signal generation circuit (OEN GEN (3)) 742_3. The front flag pads of the third front control pad set 739_1, 739_2, and 739_3 may be bonded to the front flag pads of a fourth front control pad set 743_1, 743_2, and 743_3 that are included in the fourth chip output control module 743, respectively. Control through vias that are included in the third control through via set 741_1, 741_2, and 741_3 may be connected to the back flag pads of the third back control pad set 740_1, 740_2, and 740_3, respectively. The third chip ID generation circuit 742_1 may receive third back IDs BID3<1:3> through the third control through via set 741_1, 741_2, and 741_3. The third chip ID generation circuit 742_1 may generate third chip IDs CID3<1:3> and third front IDs FID3<1:3> from the third back IDs BID3<1:3> through a first path that is configured based on a third bit UCF<3> of the chip flag UCF. The third back IDs BID3<1:3> may be set as the same logic bit set as the second back IDs BID2<1:3> and the third chip IDs CID3<1:3> may be set as the same logic bit set as the third back IDs BID3<1:3>, but this is merely an embodiment and the present disclosure is not limited thereto. The third front IDs FID3<1:3> may be generated by counting the third back IDs BID3<1:3>. For example, when a logic bit set of the third back IDs BID3<1:3> is "010", a logic bit set of the third front IDs FID3<1:3> may be set as "011" that is up-counted by 1 bit. The third output control signal generation circuit 742_3 may receive the third chip IDs CID3<1:3> from the third chip ID generation circuit 742_1. The third output control signal generation circuit 742_3 may generate a third bit OEN<3> of the output control signal OEN that is activated when the third chip IDs CID3<1:3> and the selection IDs SID<1:3> are set as the same logic bit set. The third chip output control module 739 may be included in the third chip (27 in FIG. 4, 47 in FIG. 8, 57 in FIG. 9, or 67 in FIG. 10).

The fourth chip output control module 743 may include the fourth front control pad set 743_1, 743_2, and 743_3, a fourth control through via set 744_1, 744_2, and 744_3, a fourth chip ID generation circuit (CID GEN(4)) 745_1, and a fourth output control signal generation circuit (OEN GEN(4)) 745_3. The fourth chip ID generation circuit 745_1 may receive fourth front IDs FID4<1:3> through the fourth front control pad set 743_1, 743_2, and 743_3. The fourth chip ID generation circuit 745_1 may generate fourth chip IDs CID4<1:3> and fourth back IDs BID4<1:3> from the fourth front IDs FID4<1:3> through a second path that is configured based on a fourth bit UCF<4> of the chip flag UCF. The fourth front IDs FID4<1:3> may be set as the same logic bit set as the third front ID FID3<1:3> and the fourth chip IDs CID4<1:3> may be set as the same logic bit set as the fourth front IDs FID4<1:3>. However, this is merely an embodiment and the present disclosure is not limited thereto. The fourth back IDs BID4<1:3> may be generated by counting the fourth front IDs FID4<1:3>. For example, when a logic bit set of the fourth front IDs FID4<1:3> is "011", a logic bit set of the fourth back IDs BID4<1:3> may be set as "100" that is up-counted by 1 bit. The fourth output control signal generation circuit 745_3 may receive the fourth chip IDs CID4<1:3> from the fourth chip ID generation circuit 745_1. The fourth output control signal generation circuit 745_3 may generate a fourth bit OEN<4> of the output control signal OEN that is activated when the fourth chip IDs CID4<1:3> and the selection IDs SID<1:3> are set as the same logic bit set. The fourth chip output control module 743 may be included in the fourth chip (29 in FIG. 4, 49 in FIG. 8, 59 in FIG. 9, or 69 in FIG. 10).

Figure 14:
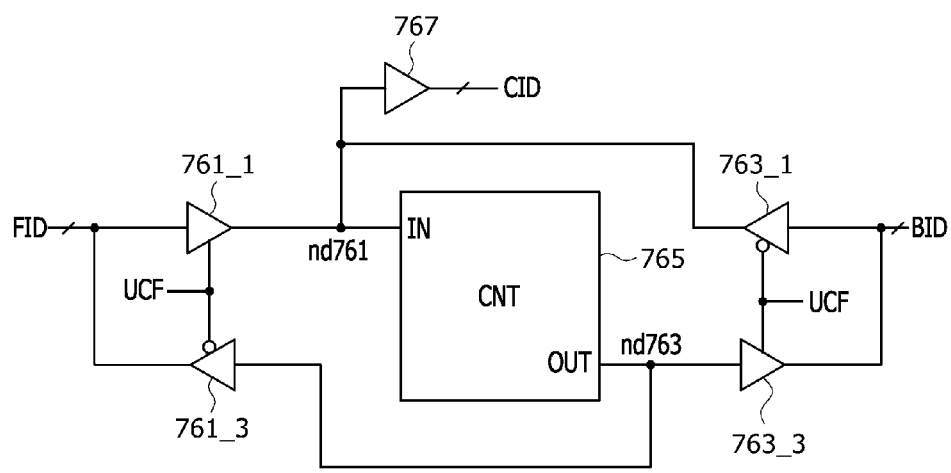
FIG. 14 is a diagram illustrating a construction of a chip ID generation circuit according to an example of the present disclosure.

FIG. 14 is a diagram illustrating a construction of a chip ID generation circuit 76 according to an example of the present disclosure. As illustrated in FIG. 14, the chip ID generation circuit 76 may include a first ID input driver 761_1, a first ID output driver 761_3, a second ID input driver 763_1, a second ID output driver 763_3, a counter (CNT) 765, and a third ID output driver 767. The first ID input driver 761_1 may drive an input node nd761 based on a front ID FID when the chip flag UCF is set to a logic high level in each of the upper chips (13 in FIGS. 2 and 3, 25 and 29 in FIGS. 4, 45 and 49 in FIGS. 8, 55 and 59 in FIG. 9, and 65 and 69 in FIG. 10). The first ID input driver 761_1 may deliver the front ID FID to the input node nd761 in each of the upper chips. The first ID output driver 761_3 may drive the front ID FID based on a signal of an output node nd763 when the chip flag UCF is set to a logic low level in each of the lower chips (11 in FIGS. 1 and 3, 23 and 27 in FIGS. 4, 43 and 47 in FIGS. 8, 53 and 57 in FIG. 9, and 63 and 67 in FIG. 10). The first ID output driver 761_3 may deliver the signal of the output node nd763 as the front ID FID in each of the lower chips. The second ID input driver 763_1 may drive the input node nd761 based on the back ID BID when the chip flag UCF is set to a logic low level in each of the lower chips. The second ID input driver 763_1 may deliver the back ID BID to the input node nd761 in each of the lower chips. The second ID output driver 763_3 may drive the back ID BID based on a signal of the output node nd763 when the chip flag UCF is set to a logic high level in each of the upper chips. The second ID output driver 763_3 may deliver a signal of the output node nd763 as the back ID BID in each of the upper chips. The counter 765 may count a signal of the input node nd761 and output the signal to the output node nd763. The third ID output driver 767 may drive the chip ID CID based on the signal of the input node nd761. The third ID output driver 767 may deliver the signal of the input node nd761 as the chip ID CID.

The chip ID generation circuit 76 may be used to implement the first chip ID generation circuit 734_1, the second chip ID generation circuit 738_1, the third chip ID generation circuit 742_1, and the fourth chip ID generation circuit 745_1 illustrated in FIG. 13. For example, when the first chip ID generation circuit 734_1 is implemented by using the chip ID generation circuit 76, the chip flag UCF and the back ID BID input to the chip ID generation circuit 76 may be set as the first bit UCF<1> of the chip flag UCF and the first back IDs BID1<1:3>, respectively, and the chip ID CID and the front ID FID output by the chip ID generation circuit 76 may be set as the first chip IDs CID1<1:3> and the first front IDs FID1<1:3>, respectively. Furthermore, for example, when the second chip ID generation circuit 738_1 is implemented by using the chip ID generation circuit 76, the chip flag UCF and the front ID FID input to the chip ID generation circuit 76 may be set as the second bit UCF<2> of the chip flag UCF and the second front IDs FID2<1:3>, respectively, and the chip ID CID and the back ID BID output by the chip ID generation circuit 76 may be set as the first chip IDs CID1<1:3> and the second back IDs BID2<1:3>, respectively.

An operation of the chip ID generation circuit 76 constructed as described above is described with reference to FIGS. 15 and 16. In this case, a case where the chip flag UCF is set to a logic low level in each of the lower chips and a case where the chip flag UCF is set to a logic high level in each of the upper chips are divided and described.

Figure 15:
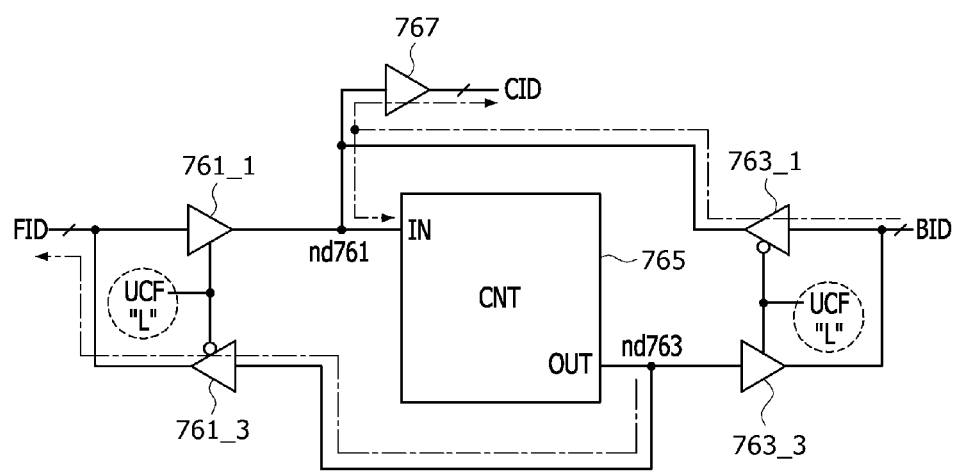
FIGS. 15 and 16 are diagrams for describing an operation of a chip ID generation circuit according to an example of the present disclosure.

As illustrated in FIG. 15, when the chip flag UCF is set to a logic low level "L" in each of the lower chips, the chip ID generation circuit 76 may generate the chip ID CID from the back ID BID through the first path and may generate the front ID FID by counting the back ID BID. The first path may include a path in which the second ID input driver 763_1 drives the input node nd761 from the back ID BID, a path in which the third ID output driver 767 delivers a signal of the input node nd761 as the chip ID CID, a path in which the counter 767 counts the signal of the input node nd761 and outputs the signal to the output node nd763, and a path in which the first ID output driver 761_3 drives the front ID FID from the signal of the output node nd763.

Figure 16:
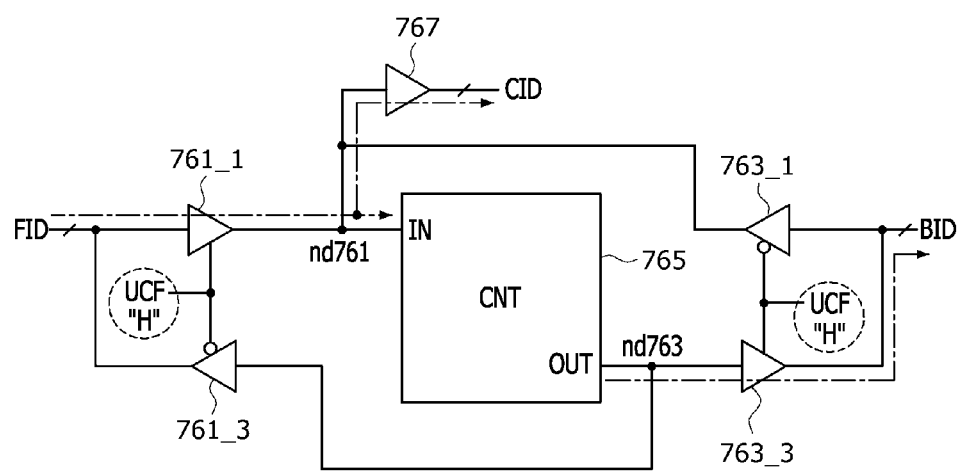

As illustrated in FIG. 16, when the chip flag UCF is set to a logic high level "H" in each of the upper chips, the chip ID generation circuit 76 may generate the chip ID CID from the front ID FID through the second path and may generate the back ID BID by counting the front ID FID. The second path may include a path in which the first ID input driver 761_1 drives the input node nd761 from the front ID FID, a path in which the third ID output driver 767 delivers a signal of the input node nd761 as the chip ID CID, a path in which the counter 767 counts the signal of the input node nd761 and outputs the signal to the output node nd763, and a path in which the second ID output driver 763_3 drives the back ID BID from the signal of the output node nd763.

Figure 17:
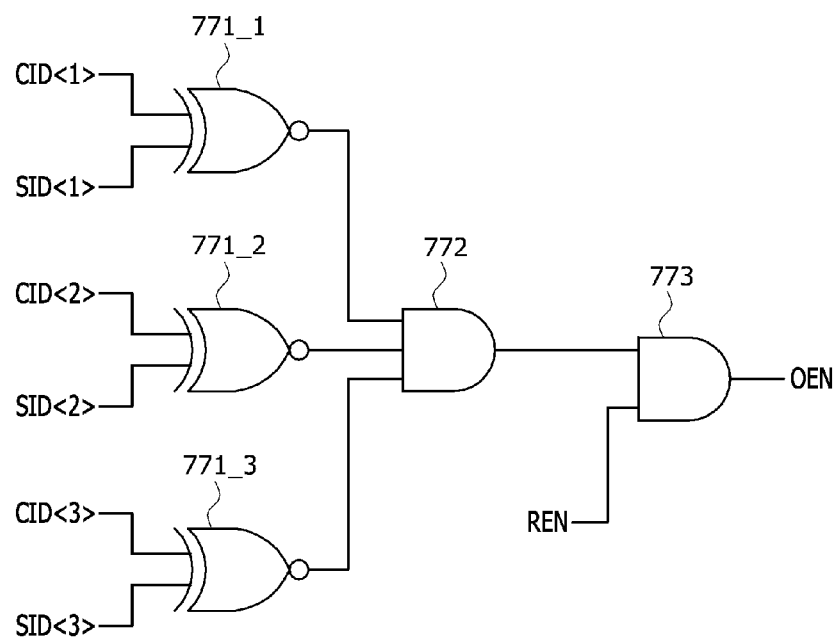
FIG. 17 is a diagram illustrating an output control signal generation circuit according to an example of the present disclosure.

FIG. 17 is a diagram illustrating an output control signal generation circuit 77 according to an example of the present disclosure. As illustrated in FIG. 17, the output control signal generation circuit 77 may include XNOR operation elements 771_1 to 771_3 and AND operation elements 772 and 773. The XNOR operation element 771_1 may perform an XNOR operation on a first bit CID<1> of the chip ID CID and a first bit SID<1> of the selection ID SID. The XNOR operation element 771_2 may perform an XNOR operation on a second bit CID<2> of the chip ID CID and a second bit SID<2> of the selection ID SID. The XNOR operation element 771_3 may perform an XNOR operation on a third bit CID<3> of the chip ID CID and a third bit SID<3> of the selection ID SID. The AND operation element 772 may perform an AND operation on output signals of the respective XNOR operation elements 771_1 to 771_3. The AND operation element 773 may perform an AND operation on an output signal of the AND operation element 772 and a read control signal REN. The read control signal REN may be activated to a logic high level in a read operation. The output control signal generation circuit 77 may generate the output control signal OEN that is activated to a logic high level when the first bit CID<1> of the chip ID CID, the second bit CID<2> of the chip ID CID, and the third bit CID<3> of the chip ID CID are the same as the first bit SID<1> of the selection ID SID, the second bit SID<2> of the selection ID SID, and the third bit SID<3> of the selection ID SID, respectively, in a read operation. The output control signal generation circuit 77 may generate the output control signal OEN that is activated in order to output the internal data DIN when the selection IDs SID<1:3> having the same logic bit set as the chip IDs CID<1:3> are input in a read operation.

The output control signal generation circuit 77 may be used to implement the first output control signal generation circuit 734_3, the second output control signal generation circuit 738_3, the third output control signal generation circuit 742_3, and the fourth output control signal generation circuit 745_3, illustrated in FIG. 13. For example, when the first output control signal generation circuit 734_3 is implemented by using the output control signal generation circuit 77, the chip IDs CID<1:3> that is input to the output control signal generation circuit 77 may be set as the first chip IDs CID1<1:3>, and the output control signal OEN that is output by the output control signal generation circuit 77 may be set as a first output control signal OEN1. Furthermore, for example, when the second output control signal generation circuit 738_3 is implemented by using the output control signal generation circuit 77, the chip IDs CID<1:3> that is input to the output control signal generation circuit 77 may be set as the second chip IDs CID2<1:3>, and the output control signal OEN that is output by the output control signal generation circuit 77 may be set as a second output control signal OEN2.

Figure 18:
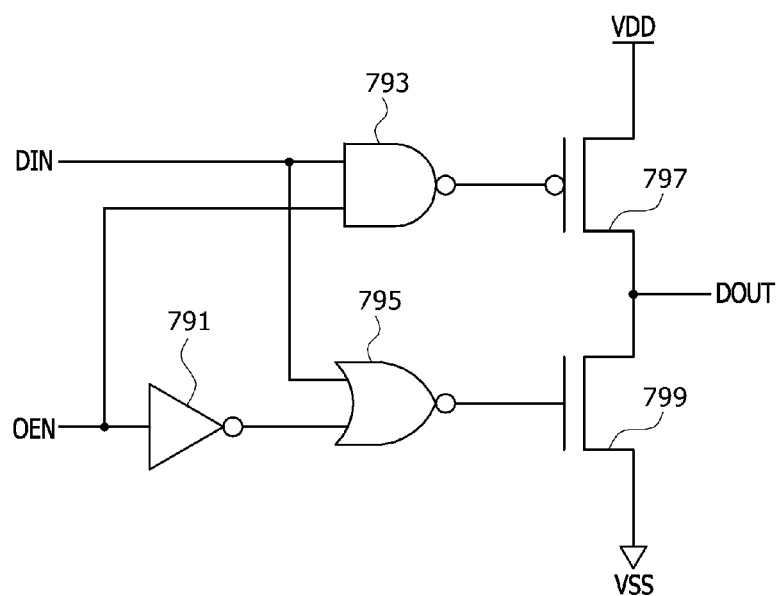
FIG. 18 is a diagram illustrating a data output module according to an example of the present disclosure.

FIG. 18 is a diagram illustrating a data output module 79A according to an example of the present disclosure. As illustrated in FIG. 18, the data output module 79A may include an inverter 791, a NAND operation element 793, a NOR operation element 795, a PMOS transistor 797, and an NMOS transistor 799. The inverter 791 may invert and buffer the output control signal OEN. The NAND operation element 793 may perform a NAND operation on the internal data DIN and the output control signal OEN. The NOR operation element 795 may perform a NOR operation on the internal data DIN and an output signal of the inverter 791. The PMOS transistor 797 may be turned on in response to an output signal of the NAND operation element 793 and may drive the output data DOUT by the power supply voltage VDD. The NMOS transistor 799 may be turned on in response to an output signal of the NOR operation element 795 and may drive the output data DOUT by the ground voltage VSS. The data output module 79A may drive the output data DOUT based on a logic level of the internal data DIN when the output control signal OEN is activated to a logic high level in a read operation. For example, when the NMOS transistor 799 is turned on by the NOR operation element 795 that outputs a logic high level when the level of the internal data DIN is a logic low level in the state in which the output control signal OEN has been activated to a logic high level, the data output module 79A may drive the output data DOUT to a logic low level. Furthermore, for example, when the PMOS transistor 797 is turned on by the NAND operation element 793 that outputs a logic low level when the level of the internal data DIN is a logic high level in the state in which the output control signal OEN has been activated to a logic high level, the data output module 79A may drive the output data DOUT to a logic high level.

Figure 19:
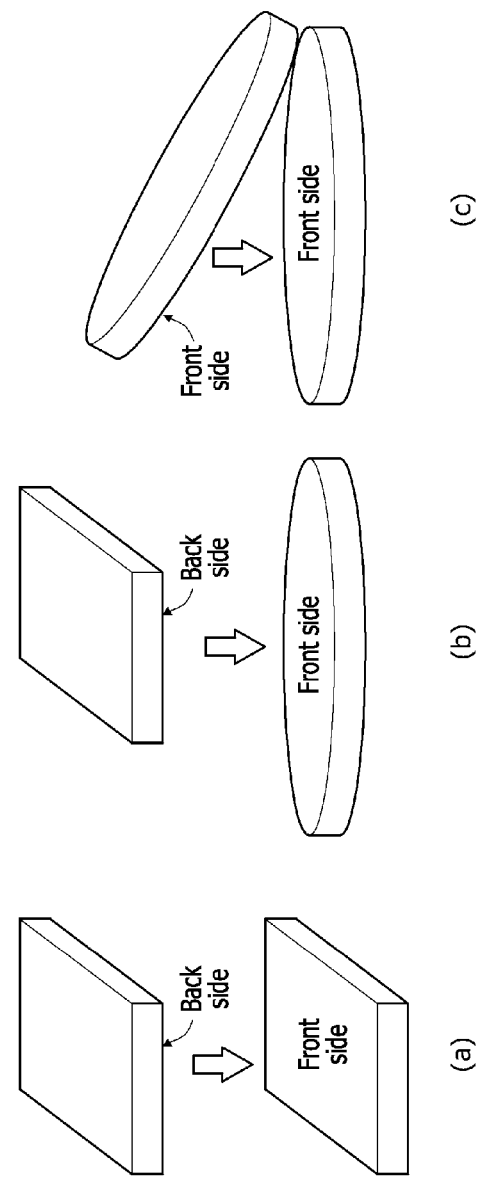
FIG. 19 is a diagram for describing a connection structure for a chip and a wafer.

FIG. 19 is a diagram for describing a connection structure for a chip and a wafer. As illustrated in FIG. 19, the connection structure for a chip and a wafer may include a method of stacking the back side of a chip on the front side of a chip so that the back side of the chip and the front side of the chip face each other as illustrated in (a), a method of stacking the back side of a chip on the front side of a wafer so that the back side of the chip and the front side of the wafer face each other as illustrated in (b), and a method of stacking the front side of a wafer on the front side of a wafer so that the front side of the wafer and the front side of the wafer face each other as illustrated in (c). As illustrated in (c), a front face to front face bonding structure may be formed by the method of stacking the front side of a wafer on the front side of a wafer so that the front side of the wafer and the front side of the wafer face each other.

The stacked integrated circuit 15 described above with reference to FIG. 3, the stacked integrated circuit 20 described with reference to FIG. 4, the stacked integrated circuit 35 described with reference to FIG. 7, the stacked integrated circuit 40 described with reference to FIG. 8, the stacked integrated circuit 50 described with reference to FIG. 9, the stacked integrated circuit 60 described with reference to FIG. 10, or the stacked integrated circuit 7 described with reference to FIG. 11 may be applied to an electronic system, which include a memory system, a graphic system, a computing system, a mobile system, etc. For example, referring to FIG. 20, an electronic system 1000 according to an embodiment of the present disclosure may include a data storage unit 1001, a memory controller 1002, a buffer memory 1003, and an input and output (I/O) interface 1004.

The data storage unit 1001 may store data (not illustrated) applied by the memory controller 1002 in response to a control signal from the memory controller 1002, may read the stored data (not illustrated), and may output the read data to the memory controller 1002. The data storage unit 1001 may include a non-volatile memory capable of continuously retaining stored data without receiving power. The non-volatile memory may be implemented as a flash memory (a NOR flash memory, a NAND flash memory), phase change random access memory (PRAM), a resistive random access memory (RRAM), a spin transfer torque random access memory (STTRAM), or magnetic random access memory (MRAM).

Figure 20:
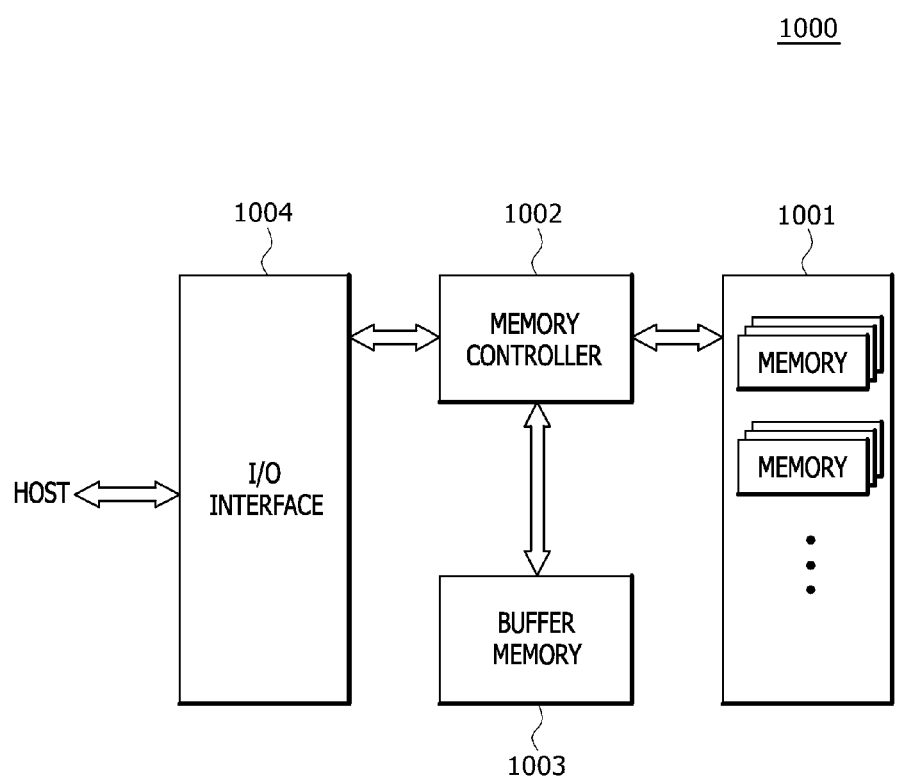
FIG. 20 is a block diagram illustrating a construction of an electronic system according to an example of the present disclosure.

The memory controller 1002 may decode an instruction applied by an external device (host device) through the I/O interface 1004 and may control data I/O for the data storage unit 1001 and the buffer memory 1003 based on a result of the decoding. In FIG. 20, the memory controller 1002 has been illustrated as one block, but a controller to control the data storage unit 1001 and a controller to control the buffer memory 1003, that is, a volatile memory, may be constructed independently of the memory controller 1002.

The buffer memory 1003 may temporarily store data to be processed by the memory controller 1002, that is, data (not illustrated) input to and output from the data storage unit 1001. The buffer memory 1003 may store data (not illustrated) that is applied by the memory controller 1002 in response to a control signal. The buffer memory 1003 may include the stacked integrated circuit 15 described with reference to FIG. 3, the stacked integrated circuit 20 described with reference to FIG. 4, the stacked integrated circuit 35 described with reference to FIG. 7, the stacked integrated circuit 40 described with reference to FIG. 8, the stacked integrated circuit 50 described with reference to FIG. 9, the stacked integrated circuit 60 described with reference to FIG. 10, or the stacked integrated circuit 7 described with reference to FIG. 11. The buffer memory 1003 may read data stored therein and may output the read data to the memory controller 1002. The buffer memory 1003 may include a volatile memory, such as dynamic random access memory (DRAM), a mobile DRAM, or a static random access memory (SRAM).

The I/O interface 1004 may provide a physical connection between the memory controller 1002 and the external device (host) so that the memory controller 1002 can receive a control signal for data I/O from the external device and exchange data with the external device. The I/O interface 1004 may include one of various interface protocols, such as a USB, MMC, PCI-E, SAS, SATA, PATA, an SCSI, ESDI, and IDE.

The electronic system 1000 may be used as an auxiliary memory device or external storage device of a host device. The electronic system 1000 may include a solid state disk (SSD), a universal serial bus memory (USB memory), a secure digital (SD) card, a mini secure digital (mSD) card, a micro SD, a secure digital high capacity (SDHC), a memory stick card, a smart media card (SM), a multi media card (MMC), an embedded MMC (eMMC), a compact flash (CF) card, etc.

Figure 21:
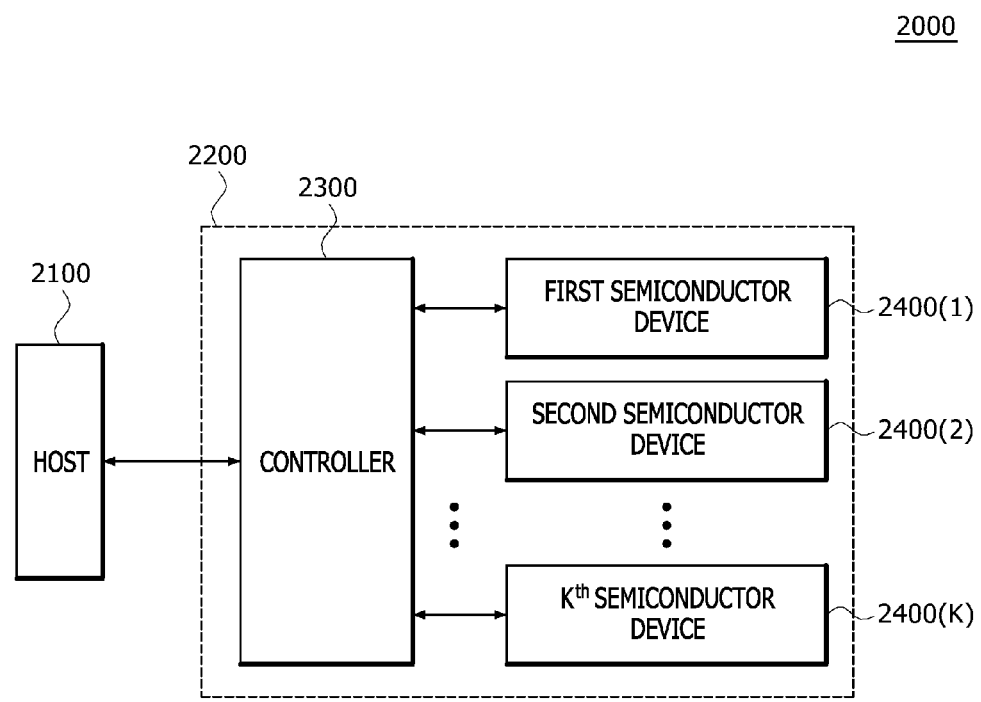
FIG. 21 is a block diagram illustrating a construction of an electronic system according to another example of the present disclosure.

FIG. 21 is a block diagram illustrating a construction of an electronic system 2000 according to another embodiment of the present disclosure. As illustrated in FIG. 21, the electronic system 2000 may include a host 2100 and a semiconductor system 2200.

The host 2100 and the semiconductor system 2200 may mutually transmit signals by using an interface protocol. The interface protocol that is used between the host 2100 and the semiconductor system 2200 may include a multi-media card (MMC), an enhanced small disk interface (ESDI), integrated drive electronics (IDE), a peripheral component interconnect-express (PCI-E), advanced technology attachment (ATA), serial ATA (SATA), parallel ATA (PATA), a serial attached SCSI (SAS), a universal serial bus (USB), etc.

Each of semiconductor devices 2400(K:1) may include the stacked integrated circuit 15 described with reference to FIG. 3, the stacked integrated circuit 20 described with reference to FIG. 4, the stacked integrated circuit 35 described with reference to FIG. 7, the stacked integrated circuit 40 described with reference to FIG. 8, the stacked integrated circuit 50 described with reference to FIG. 9, the stacked integrated circuit 60 described with reference to FIG. 10, or the stacked integrated circuit 7 described with reference to FIG. 11. Each of the semiconductor devices 2400(K:1) may be implemented as one of dynamic random access memory (DRAM), phase change random access memory (PRAM), resistive random access memory (PRAM), magnetic random access memory (MRAM), and ferroelectric random access memory (FRAM).

Figure 22:
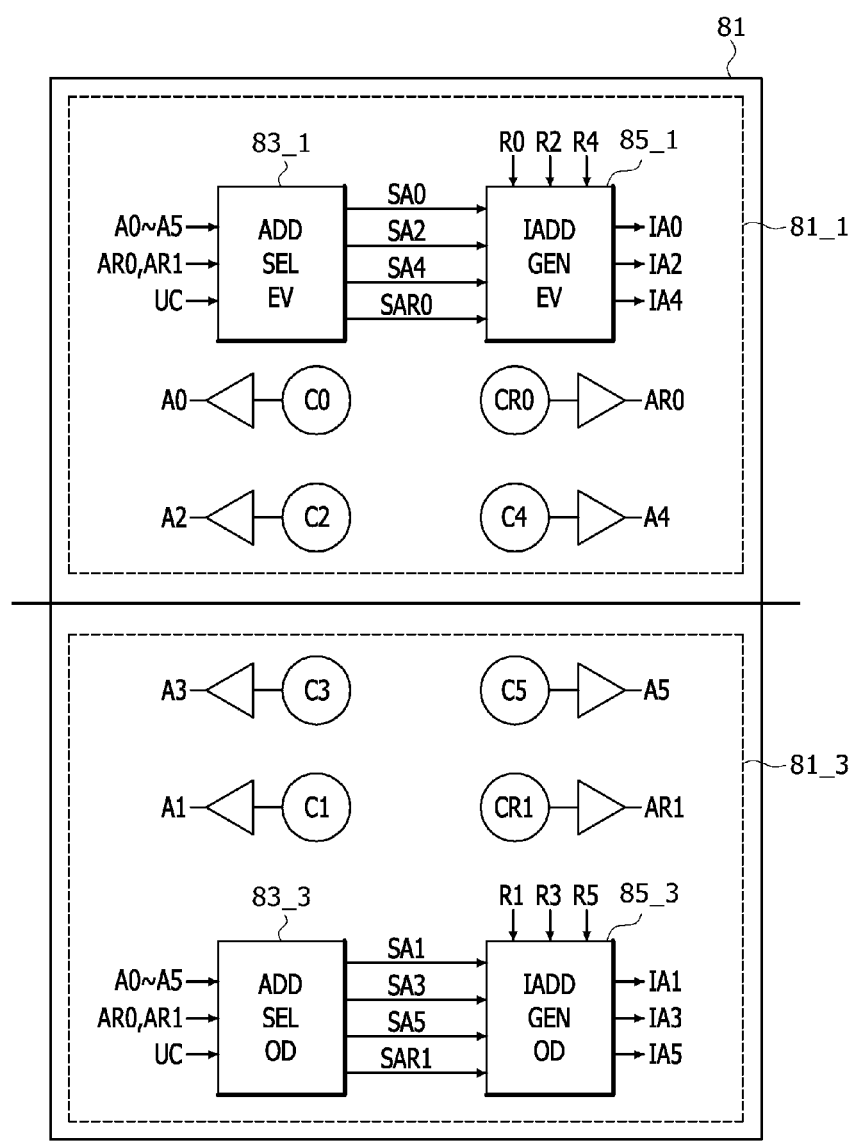
FIG. 22 is a plan view illustrating a construction of a chip according to another example of the present disclosure.

FIG. 22 is a plan view illustrating a construction of a chip 81 according to another example of the present disclosure. As illustrated in FIG. 22, the chip 81 may include an even area 81_1 and an odd area 81_3. The even area 81_1 may include a first even through via C0 through which a first even address A0 is received, a second even through via C2 through which a second even address A2 is received, a third even through via C4 through which a third even address A4 is received, an even redundancy through via CR0 through which an even redundancy address AR0 is received, an even address selection circuit (ADD SEL EV) 83_1, and an even internal address generation circuit (IADD GEN EV) 85_1. The odd area 81_3 may include a first odd through via C1 through which a first odd address A1 is received, a second odd through via C3 through which a second odd address A3 is received, a third odd through via C5 through which a third odd address A5 is received, an odd redundancy through via CR1 through which an odd redundancy address AR1 is received, an odd address selection circuit (ADD SEL OD) 83_3, and an odd internal address generation circuit (IADD GEN OD) 85_3.

The even address selection circuit 83_1 may receive the first even address A0 through the first even through via C0, may receive the second even address A2 through the second even through via C2, may receive the third even address A4 through the third even through via C4, may receive the even redundancy address AR0 through the even redundancy through via CR0, may receive the first odd address A1 through the first odd through via C1, may receive the second odd address A3 through the second odd through via C3, may receive the third odd address A5 through the third odd through via C5, and may receive the odd redundancy address AR1 through the odd redundancy through via CR1. Based on a chip information signal UC, the even address selection circuit 83_1 may generate a first selection even address SA0, a second selection even address SA2, a third selection even address SA4, and a selection even redundancy address SAR0 from the first even address A0, the second even address A2, the third even address A4, the even redundancy address AR0, the first odd address A1, the second odd address A3, the third odd address A5, and the odd redundancy address AR1. The level of the chip information signal UC may be set at a first logic level (e.g., a logic low level) when the chip 81 is a lower chip and may be set at a second logic level (e.g., a logic high level) when the chip 81 is an upper chip. When the level of the chip information signal UC is set at the first logic level, the even address selection circuit 83_1 may generate the first selection even address SA0, the second selection even address SA2, the third selection even address SA4, and the selection even redundancy address SAR0 from the first even address A0, the second even address A2, the third even address A4, and the even redundancy address AR0. When the level of the chip information signal UC is set at the second logic level, the even address selection circuit 83_1 may generate the first selection even address SA0, the second selection even address SA2, the third selection even address SA4, and the selection even redundancy address SAR0 from the first odd address A1, the second odd address A3, the third odd address A5, and the odd redundancy address AR1.

The even internal address generation circuit 85_1 may receive the first selection even address SA0, the second selection even address SA2, the third selection even address SA4, and the selection even redundancy address SAR0 from the even address selection circuit 83_1. Based on a first even repair signal R0, a second even repair signal R2, and a third even repair signal R4, the even internal address generation circuit 85_1 may generate a first internal even address IA0, a second internal even address IA2, and a third internal even address IA4 from the first selection even address SA0, the second selection even address SA2, the third selection even address SA4, and the selection even redundancy address SAR0. The first even repair signal R0 may be activated when the first even through via C0 is a fail. The second even repair signal R2 may be activated when the second even through via C2 is a fail. The third even repair signal R4 may be activated when the third even through via C4 is a fail. When all of the first even repair signal R0, the second even repair signal R2, and the third even repair signal R4 are deactivated, the even internal address generation circuit 85_1 may generate the first internal even address IA0 from the first selection even address SA0, may generate the second internal even address IA2 from the second selection even address SA2, and may generate the third internal even address IA4 from the third selection even address SA4. When any one of the first even repair signal R0, the second even repair signal R2, and the third even repair signal R4 is activated, the even internal address generation circuit 85_1 may generate the first internal even address IA0, the second internal even address IA2, and the third internal even address IA4 by selectively shifting the first selection even address SA0, the second selection even address SA2, the third selection even address SA4, and the selection even redundancy address SAR0.

More specifically, when the first even repair signal R0 is activated because a fail occurs in the first even through via C0, the even internal address generation circuit 85_1 may generate the first internal even address IA0 by shifting the second selection even address SA2, may generate the second internal even address IA2 by shifting the third selection even address SA4, and may generate the third internal even address IA4 by shifting the selection even redundancy address SAR0. When the second even repair signal R2 is activated because a fail occurs in the second even through via C2, the even internal address generation circuit 85_1 may generate the first internal even address IA0 from the first selection even address SA0, may generate the second internal even address IA2 by shifting the third selection even address SA4, and may generate the third internal even address IA4 by shifting the selection even redundancy address SAR0. When the third even repair signal R4 is activated because a fail occurs in the third even through via C4, the even internal address generation circuit 85_1 may generate the first internal even address IA0 from the first selection even address SA0, may generate the second internal even address IA2 from the second selection even address SA2, and may generate the third internal even address IA4 by shifting the selection even redundancy address SAR0.

The odd address selection circuit 83_3 may receive the first even address A0 through the first even through via C0, may receive the second even address A2 through the second even through via C2, may receive the third even address A4 through the third even through via C4, may receive the even redundancy address AR0 through the even redundancy through via CR0, may receive the first odd address A1 through the first odd through via C1, may receive the second odd address A3 through the second odd through via C3, may receive the third odd address A5 through the third odd through via C5, and may receive the odd redundancy address AR1 through the odd redundancy through via CR1. Based on the chip information signal UC, the odd address selection circuit 83_3 may generate a first selection odd address SA1, a second selection odd address SA3, a third selection odd address SA5, and a selection odd redundancy address SAR1 from the first even address A0, the second even address A2, the third even address A4, the even redundancy address AR0, the first odd address A1, the second odd address A3, the third odd address A5, and the odd redundancy address AR1. When the level of the chip information signal UC is set at the first logic level, the odd address selection circuit 83_3 may generate the first selection odd address SA1, the second selection odd address SA3, the third selection odd address SA5, and the selection odd redundancy address SAR1 from the first odd address A1, the second odd address A3, the third odd address A5, and the odd redundancy address AR1. When the level of the chip information signal UC is set at the second logic level, the odd address selection circuit 83_3 may generate the first selection odd address SA1, the second selection odd address SA3, the third selection odd address SA5, and the selection odd redundancy address SAR1 from the first even address A0, the second even address A2, the third even address A4, and the even redundancy address AR0.

The odd internal address generation circuit 85_3 may receive the first selection odd address SA1, the second selection odd address SA3, the third selection odd address SA5, and the selection odd redundancy address SAR1 from the odd address selection circuit 83_3. Based on a first odd repair signal R1, a second odd repair signal R3, and a third odd repair signal R5, the odd internal address generation circuit 85_3 may generate a first internal odd address IA1, a second internal odd address IA3, and a third internal odd address IA5 from the first selection odd address SA1, the second selection odd address SA3, the third selection odd address SA5, and the selection odd redundancy address SAR1. The first odd repair signal R1 may be activated when the first odd through via C1 is a fail. The second odd repair signal R3 may be activated when the second odd through via C3 is a fail. The third odd repair signal R5 may be activated when the third odd through via C5 is a fail. When all of the first odd repair signal R1, the second odd repair signal R3, and the third odd repair signal R5 are deactivated, the odd internal address generation circuit 85_3 may generate the first internal odd address IA1 from the first selection odd address SA1, may generate the second internal odd address IA3 from the second selection odd address SA3, and may generate the third internal odd address IA5 from the third selection odd address SA5. When any one of the first odd repair signal R1, the second odd repair signal R3, and the third odd repair signal R5 is activated, the odd internal address generation circuit 85_3 may generate the first internal odd address IA1, the second internal odd address IA3, and the third internal odd address IA5 by selectively shifting the first selection odd address SA1, the second selection odd address SA3, the third selection odd address SA5, and the selection odd redundancy address SAR1.

More specifically, when the first odd repair signal R1 is activated because a fail occurs in the first odd through via C1, the odd internal address generation circuit 85_3 may generate the first internal odd address IA1 by shifting the second selection odd address SA3, may generate the second internal odd address IA3 by shifting the third selection odd address SA5, and may generate the third internal odd address IA5 by shifting the selection odd redundancy address SAR1. When the second odd repair signal R3 is activated because a fail occurs in the second odd through via C3, the odd internal address generation circuit 85_3 may generate the first internal odd address IA1 from the first selection odd address SA1, may generate the second internal odd address IA3 by shifting the third selection odd address SA5, and may generate the third internal odd address IA5 by shifting the selection odd redundancy address SAR1. When the third odd repair signal R5 is activated because a fail occurs in the third odd through via C5, the odd internal address generation circuit 85_3 may generate the first internal odd address IA1 from the first selection odd address SA1, may generate the second internal odd address IA3 from the second selection odd address SA3, and may generate the third internal odd address IA5 by shifting the selection odd redundancy address SAR1.

Figure 23:
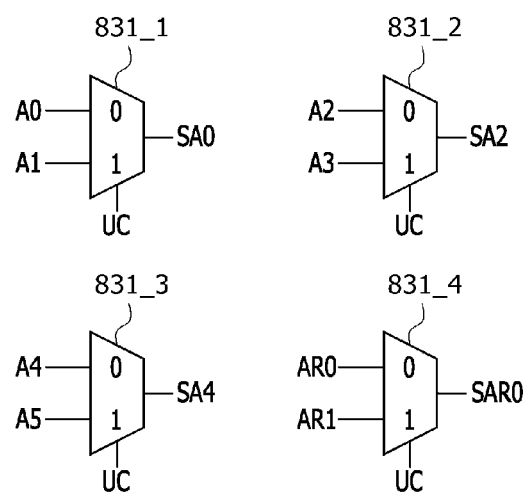
FIG. 23 is a diagram illustrating a construction according to an example of an even address selection circuit that is included in the chip illustrated in FIG. 22.

FIG. 23 is a diagram illustrating a construction of an even address selection circuit 83_1A according to an example of the even address selection circuit 83_1. As illustrated in FIG. 23, the even address selection circuit 83_1A may include first to fourth even address selectors 831_1 to 831_4.

Based on the chip information signal UC, the first even address selector 831_1 may generate the first selection even address SA0 from the first even address A0 and the first odd address A1. The first even address selector 831_1 may output the first even address A0 as the first selection even address SA0 when the level of the chip information signal UC is a logic low level "0" by the chip 81, that is, a lower chip. The first even address selector 831_1 may output the first odd address A1 as the first selection even address SA0 when the level of the chip information signal UC is a logic high level "1" by the chip 81, that is, an upper chip.

Based on the chip information signal UC, the second even address selector 831_2 may generate the second selection even address SA2 from the second even address A2 and the second odd address A3. The second even address selector 831_2 may output the second even address A2 as the second selection even address SA2 when the level of the chip information signal UC is a logic low level "0" by the chip 81, that is, a lower chip. The second even address selector 831_2 may output the second odd address A3 as the second selection even address SA2 when the level of the chip information signal UC is a logic high level "1" by the chip 81, that is, an upper chip.

Based on the chip information signal UC, the third even address selector 831_3 may generate the third selection even address SA4 from the third even address A4 and the third odd address A5. The third even address selector 831_3 may output the third even address A4 as the third selection even address SA4 when the level of the chip information signal UC is a logic low level "0" by the chip 81, that is, a lower chip. The third even address selector 831_3 may output the third odd address A5 as the third selection even address SA4 when the level of the chip information signal UC is a logic high level "1" by the chip 81, that is, an upper chip.

Based on the chip information signal UC, the fourth even address selector 831_4 may generate the selection even redundancy address SAR0 from the even redundancy address AR0 and the odd redundancy address AR1. The fourth even address selector 831_4 may output the even redundancy address AR0 as the selection even redundancy address SAR0 when the level of the chip information signal UC is a logic low level "0" by the chip 81, that is, a lower chip. The fourth even address selector 831_4 may output the odd redundancy address AR1 as the selection even redundancy address SAR0 when the level of the chip information signal UC is a logic high level "1" by the chip 81, that is, an upper chip.

Figure 24:
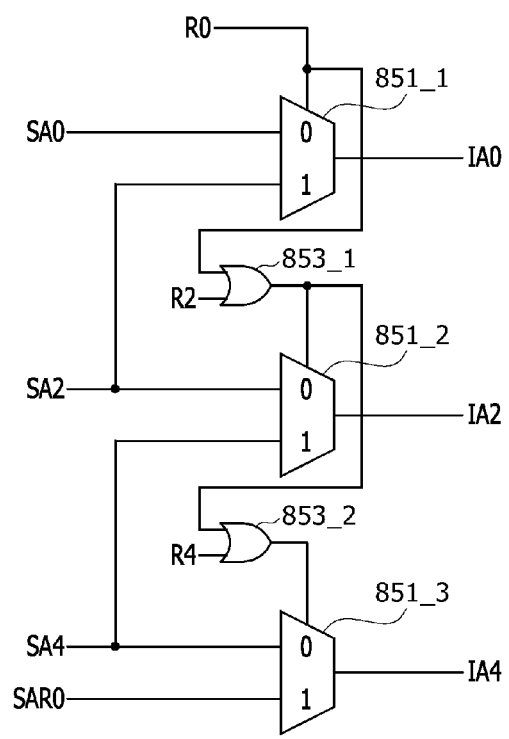
FIG. 24 is a diagram illustrating a construction according to an example of an even internal address generation circuit that is included in the chip illustrated in FIG. 22.

FIG. 24 is a diagram illustrating a construction of an even internal address generation circuit 85_1A according to an example of the even internal address generation circuit 85_1.

As illustrated in FIG. 24, the even internal address generation circuit 85_1A may include first to third selection even address selectors 851_1 to 851_3 and OR gates 853_1 and 853_2.

When the level of the first even repair signal R0 is a logic low level "0" because the first even through via C0 is not a fail, the first selection even address selector 851_1 may generate the first internal even address IA0 from the first selection even address SA0. When the level of the first even repair signal R0 is a logic high level "1" because the first even through via C0 is a fail, the first selection even address selector 851_1 may generate the first internal even address IA0 by shifting the second selection even address SA2.

When both the levels of the first even repair signal R0 and the second even repair signal R2 are at a logic low level "0" because the first even through via C0 and the second even through via C2 are not a fail, the second selection even address selector 851_2 may generate the second internal even address IA2 from the second selection even address SA2 because the OR gate 853_1 outputs a logic low level "0". When the level of one of the first even repair signal R0 and the second even repair signal R2 is a logic high level "1" because one of the first even through via C0 and the second even through via C2 is a fail, the second selection even address selector 851_2 may generate the second internal even address IA2 by shifting the third selection even address SA4 because the OR gate 853_1 outputs a logic high level "1".

When the levels of all of the first even repair signal R0, the second even repair signal R2, and the third even repair signal R4 are at a logic low level "0" because the first even through via C0, the second even through via C2, and the third even through via C4 are not a fail, the third selection even address selector 851_3 may generate the third internal even address IA4 from the third selection even address SA4 because the OR gate 853_2 outputs a logic low level "0". When the level of one of the first even repair signal R0, the second even repair signal R2, and the third even repair signal R4 is a logic high level "1" because one of the first even through via C0, the second even through via C2, and the third even through via C4 is a fail, the third selection even address selector 851_3 may generate the third internal even address IA4 by shifting the selection even redundancy address SAR0 because the OR gate 853_2 outputs a logic high level "1".

Figure 25:
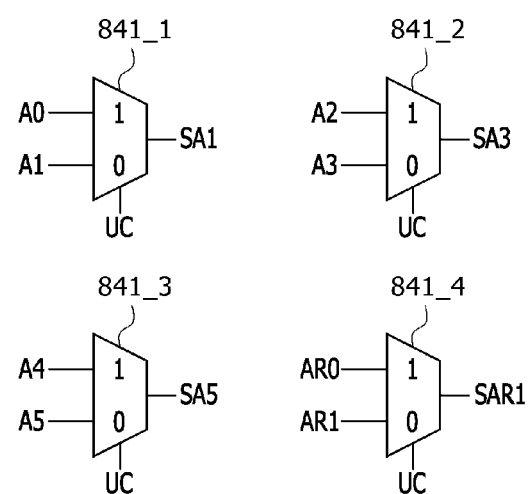
FIG. 25 is a diagram illustrating a construction according to an example of an odd address selection circuit that is included in the chip illustrated in FIG. 22.

FIG. 25 is a diagram illustrating a construction of an odd address selection circuit 83_3A according to an example of the odd address selection circuit 83_3. As illustrated in FIG. 25, the odd address selection circuit 83_3A may include first to fourth odd address selectors 841_1 to 841_4.

Based on the chip information signal UC, the first odd address selector 841_1 may generate the first selection odd address SA1 from the first even address A0 and the first odd address A1. The first odd address selector 841_1 may output the first odd address A1 as the first selection odd address SA1 when the level of the chip information signal UC is a logic low level "0" by the chip 81, that is, a lower chip. The first odd address selector 841_1 may output the first even address A0 as the first selection odd address SA1 when the level of the chip information signal UC is a logic high level "1" by the chip 81, that is, an upper chip.

Based on the chip information signal UC, the second odd address selector 841_2 may generate the second selection odd address SA3 from the second even address A2 and the second odd address A3. The second odd address selector 841_2 may output the second odd address A3 as the second selection odd address SA3 when the level of the chip information signal UC is a logic low level "0" by the chip 81, that is, a lower chip. The second odd address selector 841_2 may output the second even address A2 as the second selection odd address SA3 when the level of the chip information signal UC is a logic high level "1" by the chip 81, that is, an upper chip.

Based on the chip information signal UC, the third odd address selector 841_3 may generate the third selection odd address SA5 from the third even address A4 and the third odd address A5. The third odd address selector 841_3 may output the third odd address A5 as the third selection odd address SA5 when the level of the chip information signal UC is a logic low level "0" by the chip 81, that is, a lower chip. The third odd address selector 841_3 may output the third even address A4 as the third selection odd address SA5 when the level of the chip information signal UC is a logic high level "1" by the chip 81, that is, an upper chip.

Based on the chip information signal UC, the fourth odd address selector 841_4 may generate the selection odd redundancy address SAR1 from the even redundancy address AR0 and the odd redundancy address AR1. The fourth odd address selector 841_4 may output the odd redundancy address AR1 as the selection odd redundancy address SAR1 when the level of the chip information signal UC is a logic low level "0" by the chip 81, that is, a lower chip. The fourth odd address selector 841_4 may output the even redundancy address AR0 as the selection odd redundancy address SAR1 when the level of the chip information signal UC is a logic high level "1" by the chip 81, that is, an upper chip.

Figure 26:
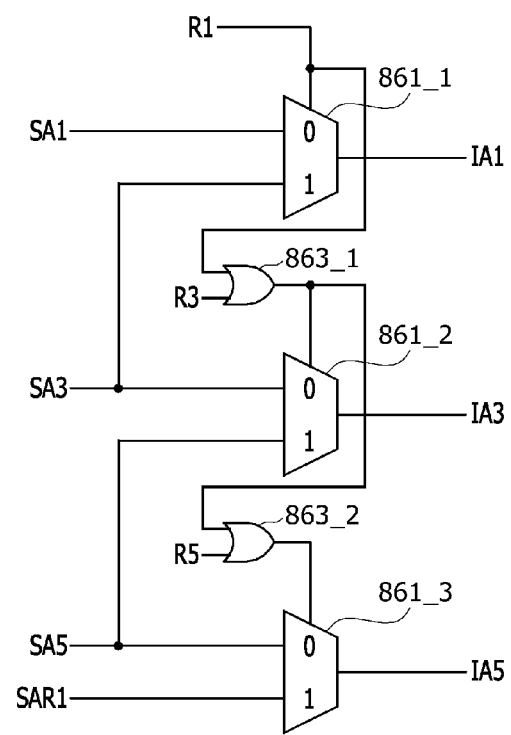
FIG. 26 is a diagram illustrating a construction according to an example of an odd internal address generation circuit that is included in the chip illustrated in FIG. 22.

FIG. 26 is a diagram illustrating a construction of an odd internal address generation circuit 85_3A according to an example of the odd internal address generation circuit 85_3. As illustrated in FIG. 26, the odd internal address generation circuit 85_3A may include first to third selection odd address selectors 861_1 to 861_3 and OR gates 863_1 and 863_2.

When the level of the first odd repair signal R1 is a logic low level "0" because the first odd through via C1 is not a fail, the first selection odd address selector 861_1 may generate the first internal odd address IA1 from the first selection odd address SA1. When the level of the first odd repair signal R1 is a logic high level "1" because the first odd through via C1 is a fail, the first selection odd address selector 861_1 may generate the first internal odd address IA1 by shifting the second selection odd address SA3.

When the levels of both the first odd repair signal R1 and the second odd repair signal R3 are at a logic low level "0" because the first odd through via C1 and the second odd through via C3 are not a fail, the second selection odd address selector 861_2 may generate the second internal odd address IA3 from the second selection odd address SA3 because the OR gate 863_1 outputs a logic low level "0". When the level of one of the first odd repair signal R1 and the second odd repair signal R3 is a logic high level "1" because one of the first odd through via C1 and the second odd through via C3 is a fail, the second selection odd address selector 861_2 may generate the second internal odd address IA3 by shifting the third selection odd address SA5 because the OR gate 863_1 outputs a logic high level "1".

When the levels of all of the first odd repair signal R1, the second odd repair signal R3, and the third odd repair signal R5 are at a logic low level "0" because the first odd through via C1, the second odd through via C3, and the third odd through via C5 are not a fail, the third selection odd address selector 861_3 may generate the third internal odd address IA5 from the third selection odd address SA5 because the OR gate 863_2 outputs a logic low level "0". When the level of one of the first odd repair signal R1, the second odd repair signal R3, and the third odd repair signal R5 is a logic high level "1" because one of the first odd through via C1, the second odd through via C3, and the third odd through via C5 is a fail, the third selection odd address selector 861_3 may generate the third internal odd address IA5 by shifting the selection odd redundancy address SAR1 because the OR gate 863_2 outputs a logic high level "1".

Figure 27:
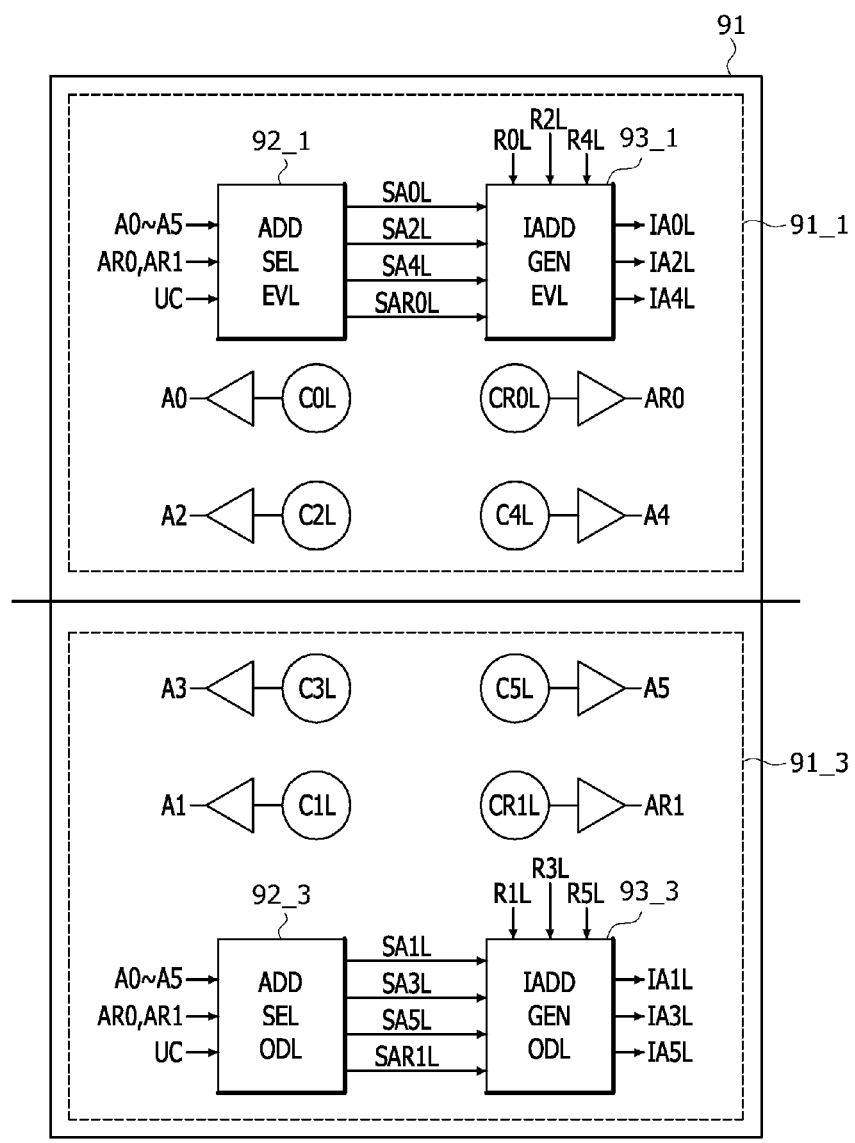
FIG. 27 is a plan view illustrating a construction of a lower chip according to another example of the present disclosure.

FIG. 27 is a plan view illustrating a construction of a lower chip 91 according to another example of the present disclosure. As illustrated in FIG. 27, the lower chip 91 may include a lower even area 91_1 and a lower odd area 91_3. The lower even area 91_1 may include a first lower even through via C0L through which a first even address A0 is received, a second lower even through via C2L through which a second even address A2 is received, a third lower even through via C4L through which a third even address A4 is received, a lower even redundancy through via CR0L through which an even redundancy address AR0 is received, a lower even address selection circuit (ADD SEL EVL) 92_1, and an lower even internal address generation circuit (IADD GEN EVL) 93_1. The lower odd area 91_3 may include a first lower odd through via C1L through which a first odd address A1 is received, a second lower odd through via C3L through which a second odd address A3 is received, a third lower odd through via C5L through which a third odd address A5 is received, a lower odd redundancy through via CR1L through which an odd redundancy address AR1 is received, a lower odd address selection circuit (ADD SEL ODL) 92_3, and a lower odd internal address generation circuit (IADD GEN ODL) 93_3.

The lower even address selection circuit 92_1 may receive the first even address A0 through the first lower even through via C0L, may receive the second even address A2 through the second lower even through via C2L, may receive the third even address A4 through the third lower even through via C4L, may receive the even redundancy address AR0 through the lower even redundancy through via CR0L, may receive the first odd address A1 through the first lower odd through via C1L, may receive the second odd address A3 through the second lower odd through via C3L, may receive the third odd address A5 through the third lower odd through via C5L, and may receive the odd redundancy address AR1 through the lower odd redundancy through via CR1L. Based on a chip information signal UC, the lower even address selection circuit 92_1 may generate a first lower selection even address SA0L, a second lower selection even address SA2L, a third lower selection even address SA4L, and a lower selection even redundancy address SAR0L from the first even address A0, the second even address A2, the third even address A4, the even redundancy address AR0, the first odd address A1, the second odd address A3, the third odd address A5, and the odd redundancy address AR1. The lower even address selection circuit 92_1 may generate the first lower selection even address SA0L, the second lower selection even address SA2L, the third lower selection even address SA4L, and the lower selection even redundancy address SAR0L from the first even address A0, the second even address A2, the third even address A4, and the even redundancy address AR0 by the chip information signal UC.

The lower even internal address generation circuit 93_1 may receive the first lower selection even address SA0L, the second lower selection even address SA2L, the third lower selection even address SA4L, and the lower selection even redundancy address SAR0L from the lower even address selection circuit 92_1. Based on a first lower even repair signal R0L, a second lower even repair signal R2L, and a third lower even repair signal R4L, the lower even internal address generation circuit 93_1 may generate a first lower internal even address IA0L, a second lower internal even address IA2L, and a third lower internal even address IA4L from the first lower selection even address SA0L, the second lower selection even address SA2L, the third lower selection even address SA4L, and the lower selection even redundancy address SAR0L. The first lower even repair signal R0L may be activated when the first lower even through via C0L is a fail. The second lower even repair signal R2L may be activated when the second lower even through via C2L is a fail. The third lower even repair signal R4L may be activated when the third lower even through via C4L is a fail. When all of the first lower even repair signal R0L, the second lower even repair signal R2L, and the third lower even repair signal R4L are deactivated, the lower even internal address generation circuit 93_1 may generate the first lower internal even address IA0L from the first lower selection even address SA0L, may generate the second lower internal even address IA2L from the second lower selection even address SA2L, and may generate the third lower internal even address IA4L from the third lower selection even address SA4L. When one of the first lower even repair signal R0L, the second lower even repair signal R2L, and the third lower even repair signal R4L is activated, the lower even internal address generation circuit 93_1 may generate the first lower internal even address IA0L, the second lower internal even address IA2L, and the third lower internal even address IA4L by selectively shifting the first lower selection even address SA0L, the second lower selection even address SA2L, the third lower selection even address SA4L, and the lower selection even redundancy address SAR0L.

More specifically, when the first lower even repair signal R0L is activated because a fail occurs in the first lower even through via C0L, the lower even internal address generation circuit 93_1 may generate the first lower internal even address IA0L by shifting the second lower selection even address SA2L, may generate the second lower internal even address IA2L by shifting the third lower selection even address SA4L, and may generate the third lower internal even address IA4L by shifting the lower selection even redundancy address SAR0L. When the second lower even repair signal R2L is activated because a fail occurs in the second lower even through via C2L, the lower even internal address generation circuit 93_1 may generate the first lower internal even address IA0L from the first lower selection even address SA0L, may generate the second lower internal even address IA2L by shifting the third lower selection even address SA4L, and may generate the third lower internal even address IA4L by shifting the lower selection even redundancy address SAR0L. When the third lower even repair signal R4L is activated because a fail occurs in the third lower even through via C4L, the lower even internal address generation circuit 93_1 may generate the first lower internal even address IA0L from the first lower selection even address SA0L, may generate the second lower internal even address IA2L from the second lower selection even address SA2L, and may generate the third lower internal even address IA4L by shifting the lower selection even redundancy address SAR0L.

The lower odd address selection circuit 92_3 may receive the first even address A0 through the first lower even through via C0L, may receive the second even address A2 through the second lower even through via C2L, may receive the third even address A4 through the third lower even through via C4L, may receive the even redundancy address AR0 through the lower even redundancy through via CR0L, may receive the first odd address A1 through the first lower odd through via C1L, may receive the second odd address A3 through the second lower odd through via C3L, may receive the third odd address A5 through the third lower odd through via C5L, and may receive the odd redundancy address AR1 through the lower odd redundancy through via CR1L. Based on the chip information signal UC, the lower odd address selection circuit 92_3 may generate a first lower selection odd address SA1L, a second lower selection odd address SA3L, a third lower selection odd address SA5L, and a lower selection odd redundancy address SAR1L from the first even address A0, the second even address A2, the third even address A4, the even redundancy address AR0, the first odd address A1, the second odd address A3, the third odd address A5, and the odd redundancy address AR1. The lower odd address selection circuit 92_3 may generate the first lower selection odd address SA1L, the second lower selection odd address SA3L, the third lower selection odd address SA5L, and the lower selection odd redundancy address SAR1L from the first odd address A1, the second odd address A3, the third odd address A5, and the odd redundancy address AR1 by the chip information signal UC.

The lower odd internal address generation circuit 93_3 may receive the first lower selection odd address SA1L, the second lower selection odd address SA3L, the third lower selection odd address SA5L, and the lower selection odd redundancy address SAR1L from the lower odd address selection circuit 92_3. Based on a first lower odd repair signal R1L, a second lower odd repair signal R3L, and a third lower odd repair signal R5L, the lower odd internal address generation circuit 93_3 may generate a first lower internal odd address IA1L, a second lower internal odd address IA3L, and a third lower internal odd address IA5L from the first lower selection odd address SA11_, the second lower selection odd address SA3L, the third lower selection odd address SA5L, and the lower selection odd redundancy address SAR1L. The first lower odd repair signal R1L may be activated when the first lower odd through via C1L is a fail. The second lower odd repair signal R3L may be activated when the second lower odd through via C3L is a fail. The third lower odd repair signal R5L may be activated when the third lower odd through via C5L is a fail. The lower odd internal address generation circuit 93_3 may generate the first lower internal odd address IA1L from the first lower selection odd address SA11_, may generate the second lower internal odd address IA3L from the second lower selection odd address SA3L, and may generate the third lower internal odd address IA5L from the third lower selection odd address SA5L, when all of the first lower odd repair signal R1L, the second lower odd repair signal R3L, and the third lower odd repair signal R5L are deactivated. When one of the first lower odd repair signal R1L, the second lower odd repair signal R3L, and the third lower odd repair signal R5L is activated, the lower odd internal address generation circuit 93_3 may generate the first lower internal odd address IA1L, the second lower internal odd address IA3L, and the third lower internal odd address IA5L by selectively shifting the first lower selection odd address SA11_, the second lower selection odd address SA3L, the third lower selection odd address SA5L, and the lower selection odd redundancy address SAR1L.

More specifically, when the first lower odd repair signal R1L is activated because a fail occurs in the first lower odd through via C1L, the lower odd internal address generation circuit 93_3 may generate the first lower internal odd address IA1L by shifting the second lower selection odd address SA3L, may generate the second lower internal odd address IA3L by shifting the third lower selection odd address SA5L, and may generate the third lower internal odd address IA5L by shifting the lower selection odd redundancy address SAR1L. When the second lower odd repair signal R3L is activated because a fail occurs in the second lower odd through via C3L, the lower odd internal address generation circuit 93_3 may generate the first lower internal odd address IA1L from the first lower selection odd address SA11_, may generate the second lower internal odd address IA3L by shifting the third lower selection odd address SA5L, and may generate the third lower internal odd address IA5L by shifting the lower selection odd redundancy address SAR1L. When the third lower odd repair signal R5L is activated because a fail occurs in the third lower odd through via C5L, the lower odd internal address generation circuit 93_3 may generate the first lower internal odd address IA1L from the first lower selection odd address SA11_, may generate the second lower internal odd address IA3L from the second lower selection odd address SA3L, and may generate the third lower internal odd address IA5L by shifting the lower selection odd redundancy address SAR1L.

Figure 28:
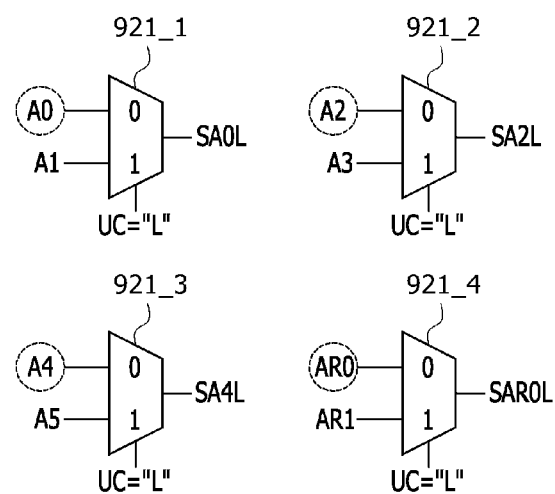
FIG. 28 is a diagram illustrating a construction according to an example of a lower even address selection circuit that is included in the lower chip illustrated in FIG. 27.

FIG. 28 is a diagram illustrating a construction of a lower even address selection circuit 92_1A according to an example of the lower even address selection circuit 92_1. As illustrated in FIG. 28, the lower even address selection circuit 92_1A may include first to fourth lower even address selectors 921_1 to 921_4.

Based on the chip information signal UC, the first lower even address selector 921_1 may generate the first lower selection even address SA0L from the first even address A0 and the first odd address A1. The first even address selector 921_1 may output the first even address A0 as the first lower selection even address SA0L because the level of the chip information signal UC is a logic low level "0" by the lower chip 91.

Based on the chip information signal UC, the second lower even address selector 921_2 may generate the second lower selection even address SA2L from the second even address A2 and the second odd address A3. The second even address selector 921_2 may output the second even address A2 as the second lower selection even address SA2L because the level of the chip information signal UC is a logic low level "0" by the lower chip 91.

Based on the chip information signal UC, the third lower even address selector 921_3 may generate the third lower selection even address SA4L from the third even address A4 and the third odd address A5. The third even address selector 921_3 may output the third even address A4 as the third lower selection even address SA4L because the level of the chip information signal UC is a logic low level "0" by the lower chip 91.

Based on the chip information signal UC, the fourth lower even address selector 921_4 may generate the lower selection even redundancy address SAR0L from the even redundancy address AR0 and the odd redundancy address AR1. The fourth even address selector 921_4 may output the even redundancy address AR0 as the lower selection even redundancy address SAR0L because the level of the chip information signal UC is a logic low level "0" by the lower chip 91.

Figure 29:
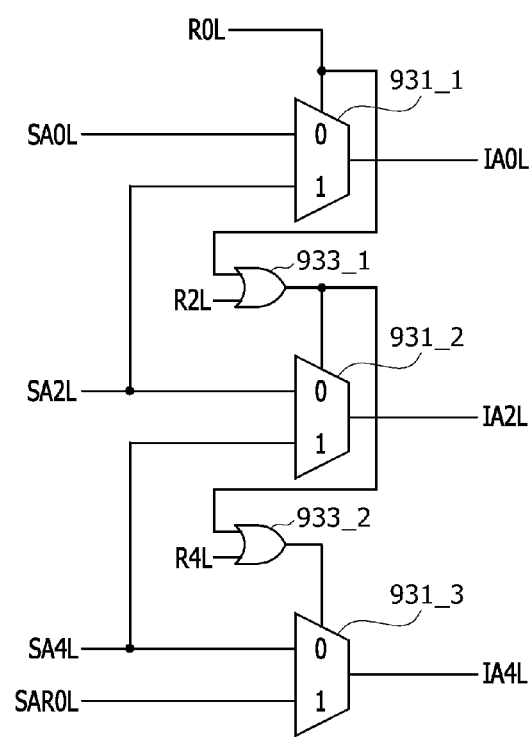
FIG. 29 is a diagram illustrating a construction according to an example of a lower even internal address generation circuit that is included in the lower chip illustrated in FIG. 27.

FIG. 29 is a diagram illustrating a construction of a lower even internal address generation circuit 93_1A according to an example of the lower even internal address generation circuit 93_1. As illustrated in FIG. 29, the lower even internal address generation circuit 93_1A may include first to third lower selection even address selectors 931_1 to 931_3 and lower OR gates 933_1 and 933_2.

When the level of the first lower even repair signal R0L is a logic low level "0" because the first lower even through via C0L is not a fail, the first lower selection even address selector 931_1 may generate the first lower internal even address IA0L from the first lower selection even address SA0L. When the level of the first lower even repair signal R0L is a logic high level "1" because the first lower even through via C0L is a fail, the first lower selection even address selector 931_1 may generate the first lower internal even address IA0L by shifting the second lower selection even address SA2L.

When the levels of both the first lower even repair signal R0L and the second lower even repair signal R2L are at a logic low level "0" because the first lower even through via C0L and the second lower even through via C2L are not a fail, the second lower selection even address selector 931_2 may generate the second lower internal even address IA2L from the second lower selection even address SA2L because the lower OR gate 933_1 outputs a logic low level "0". When the level of one of the first lower even repair signal R0L and the second lower even repair signal R2L is a logic high level "1" because one of the first lower even through via C0L and the second lower even through via C2L is a fail, the second lower selection even address selector 931_2 may generate the second lower internal even address IA2L by shifting the third lower selection even address SA4L because the lower OR gate 933_1 outputs a logic high level "1".

When the levels of all of the first lower even repair signal R0L, the second lower even repair signal R2L, and the third lower even repair signal R4L are at a logic low level "0" because the first lower even through via C0L, the second lower even through via C2L, and the third lower even through via C4L are not a fail, the third lower selection even address selector 931_3 may generate the third lower internal even address IA4L from the third lower selection even address SA4L because the lower OR gate 933_2 outputs a logic low level "0". When the level of one of the first lower even repair signal R0L, the second lower even repair signal R21_, and the third lower even repair signal R4L is a logic high level "1" because one of the first lower even through via C0L, the second lower even through via C21_, and the third lower even through via C4L is a fail, the third lower selection even address selector 931_3 may generate the third lower internal even address IA4L by shifting the lower selection even redundancy address SAR0L because the lower OR gate 933_2 outputs a logic high level "1".

Figure 30:
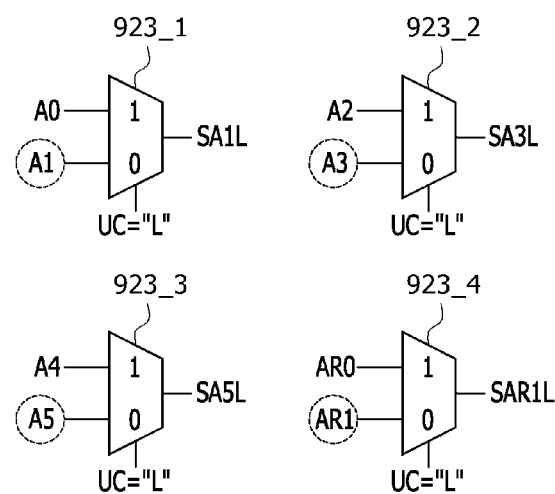
FIG. 30 is a diagram illustrating a construction according to an example of a lower odd address selection circuit that is included in the lower chip illustrated in FIG. 27.

FIG. 30 is a diagram illustrating a construction of a lower odd address selection circuit 92_3A according to an example of the lower odd address selection circuit 92_3. As illustrated in FIG. 30, the lower odd address selection circuit 92_3A may include first to fourth lower odd address selectors 923_1 to 923_4.

Based on the chip information signal UC, the first lower odd address selector 923_1 may generate the first lower selection odd address SA1L from the first even address A0 and the first odd address A1. The first lower odd address selector 923_1 may output the first odd address A1 as the first lower selection odd address SA1L because the level of the chip information signal UC is a logic low level "0" by the lower chip 91.

Based on the chip information signal UC, the second lower odd address selector 923_2 may generate the second lower selection odd address SA3L from the second even address A2 and the second odd address A3. The second lower odd address selector 923_2 may output the second odd address A3 as the second lower selection odd address SA3L because the level of the chip information signal UC is a logic low level "0" by the lower chip 91.

Based on the chip information signal UC, the third lower odd address selector 923_3 may generate the third lower selection odd address SA5L from the third even address A4 and the third odd address A5. The third lower odd address selector 923_3 may output the third odd address A5 as the third lower selection odd address SA5L because the level of the chip information signal UC is a logic low level "0" by the lower chip 91.

Based on the chip information signal UC, the fourth lower odd address selector 923_4 may generate the lower selection odd redundancy address SAR1L from the even redundancy address AR0 and the odd redundancy address AR1. The fourth lower odd address selector 923_4 may output the odd redundancy address AR1 as the lower selection odd redundancy address SAR1L because the level of the chip information signal UC is a logic low level "0" by the lower chip 91.

Figure 31:
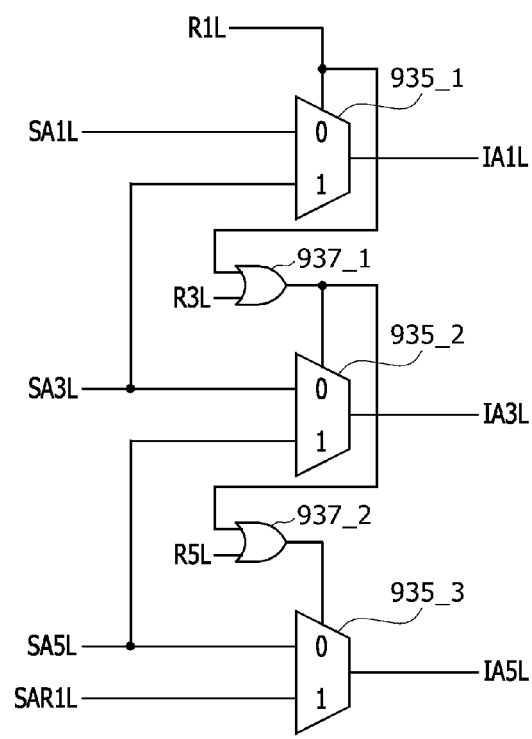
FIG. 31 is a diagram illustrating a construction according to an example of a lower odd internal address generation circuit that is included in the lower chip illustrated in FIG. 27.

FIG. 31 is a diagram illustrating a construction of a lower odd internal address generation circuit 93_3A according to an example of the lower odd internal address generation circuit 93_3. As illustrated in FIG. 31, the lower odd internal address generation circuit 93_3A may include first to third lower selection odd address selectors 935_1 to 935_3 and OR gates 937_1 and 937_2.

When the level of the first lower odd repair signal R1L is a logic low level "0" because the first lower odd through via C1L is not a fail, the first lower selection odd address selector 935_1 may generate the first lower internal odd address IA1L from the first lower selection odd address SA1L. When the level of the first lower odd repair signal R1L is a logic high level "1" because the first lower odd through via C1L is a fail, the first lower selection odd address selector 935_1 may generate the first lower internal odd address IA1L by shifting the second lower selection odd address SA3L.

When the levels of both the first lower odd repair signal R1L and the second lower odd repair signal R3L are at a logic low level "0" because the first lower odd through via C1L and the second lower odd through via C3L are not a fail, the second lower selection odd address selector 935_2 may generate the second lower internal odd address IA3L from the second lower selection odd address SA3L because the OR gate 937_1 outputs a logic low level "0". When the level of one of the first lower odd repair signal R1L and the second lower odd repair signal R3L is a logic high level "1" because one of the first lower odd through via C1L and the second lower odd through via C3L is a fail, the second lower selection odd address selector 935_2 may generate the second lower internal odd address IA3L by shifting the third lower selection odd address SA5L because the OR gate 937_1 outputs a logic high level "1".

When the levels of all of the first lower odd repair signal R1L, the second lower odd repair signal R3L, and the third lower odd repair signal R5L are at a logic low level "0" because the first lower odd through via C1L, the second lower odd through via C3L, and the third lower odd through via C5L are not a fail, the third lower selection odd address selector 935_3 may generate the third lower internal odd address IA5L from the third lower selection odd address SA5L because the OR gate 937_2 outputs a logic low level "0". When the level of one of the first lower odd repair signal R1L, the second lower odd repair signal R3L, and the third lower odd repair signal R5L is a logic high level "1" because one of the first lower odd through via C1L, the second lower odd through via C3L, and the third lower odd through via C5L is a fail, the third lower selection odd address selector 935_3 may generate the third lower internal odd address IA5L by shifting the lower selection odd redundancy address SAR1L because the OR gate 937_2 outputs a logic high level "1".

Figure 32:
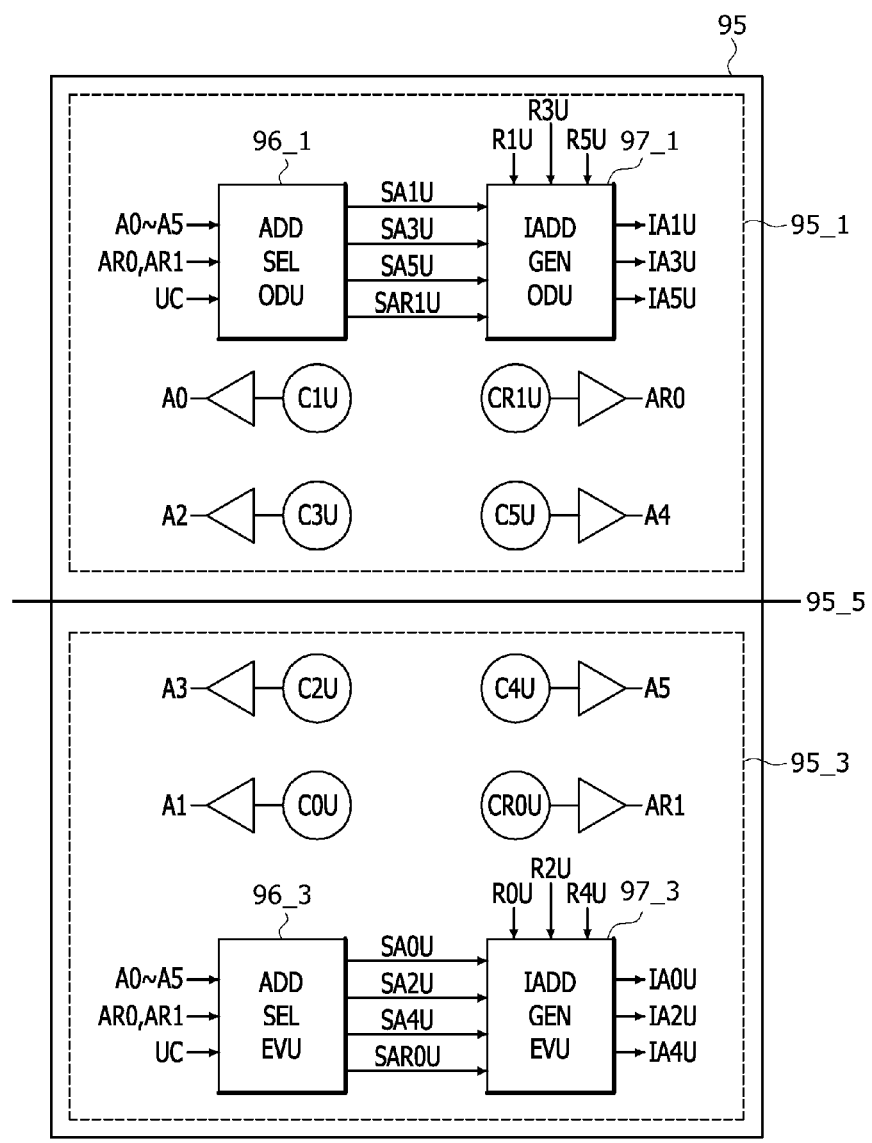
FIG. 32 is a plan view illustrating a construction of an upper chip according to another example of the present disclosure.

FIG. 32 is a plan view illustrating a construction of an upper chip 95 according to another example of the present disclosure. As illustrated in FIG. 32, the upper chip 95 may include an upper odd area 95_1 and an upper even area 95_3. The upper odd area 95_1 may include a first upper odd through via C1U through which a first even address A0 is received, a second upper odd through via C3U through which a second even address A2 is received, a third upper odd through via C5U through which a third even address A4 is received, an upper odd redundancy through via CR1U through which an even redundancy address AR0 is received, an upper odd address selection circuit (ADD SEL ODU) 96_1, and an upper odd internal address generation circuit (IADD GEN ODU) 97_1. The upper even area 95_3 may include a first upper even through via C0U through which a first odd address A1 is received, a second upper even through via C2U through which a second odd address A3 is received, a third upper even through via C4U through which a third odd address A5 is received, an upper even redundancy through via CR0U through which an odd redundancy address AR1 is received, an upper even address selection circuit (ADD SEL EVU) 96_3, and an upper even internal address generation circuit (IADD GEN EVU) 97_3.

The upper odd address selection circuit 96_1 may receive the first even address A0 through the first upper odd through via C1U, may receive the second even address A2 through the second upper odd through via C3U, may receive the third even address A4 through the third upper odd through via C5U, may receive the even redundancy address AR0 through the upper odd redundancy through via CR1U, may receive the first odd address A1 through the first upper even through via C0U, may receive the second odd address A3 through the second upper even through via C2U, may receive the third odd address A5 through the third upper even through via C4U, and may receive the odd redundancy address AR1 through the upper even redundancy through via CR0U.

Based on a chip information signal UC, the upper odd address selection circuit 96_1 may generate a first upper selection odd address SA1U, a second upper selection odd address SA3U, a third upper selection odd address SA5U, and an upper selection odd redundancy address SAR1U from the first even address A0, the second even address A2, the third even address A4, the even redundancy address AR0, the first odd address A1, the second odd address A3, the third odd address A5, and the odd redundancy address AR1. The upper odd address selection circuit 96_1 may generate the first upper selection odd address SA1U, the second upper selection odd address SA3U, the third upper selection odd address SA5U, and the upper selection odd redundancy address SAR1U from the first even address A0, the second even address A2, the third even address A4, and the even redundancy address AR0 by the chip information signal UC.

The upper odd internal address generation circuit 97_1 may receive the first upper selection odd address SA1U, the second upper selection odd address SA3U, the third upper selection odd address SA5U, and the upper selection odd redundancy address SAR1U from the upper odd address selection circuit 96_1. Based on a first upper odd repair signal R1U, a second upper odd repair signal R3U, and a third upper odd repair signal R5U, the upper odd internal address generation circuit 97_1 may generate a first upper internal odd address IA1U, a second upper internal odd address IA3U, and a third upper internal odd address IA5U from the first upper selection odd address SA1U, the second upper selection odd address SA3U, the third upper selection odd address SA5U, and the upper selection odd redundancy address SAR1U. The first upper odd repair signal R1U may be activated when the first upper odd through via C1U is a fail. The second upper odd repair signal R3U may be activated when the second upper odd through via C3U is a fail. The third upper odd repair signal R5U may be activated when the third upper odd through via C5U is a fail. When all of the first upper odd repair signal R1U, the second upper odd repair signal R3U, and the third upper odd repair signal R5U are deactivated, the upper odd internal address generation circuit 97_1 may generate the first upper internal odd address IA1U from the first upper selection odd address SA1U, may generate the second upper internal odd address IA3U from the second upper selection odd address SA3U, and may generate the third upper internal odd address IA5U from the third upper selection odd address SA5U. When one of the first upper odd repair signal R1U, the second upper odd repair signal R3U, and the third upper odd repair signal R5U is activated, the upper odd internal address generation circuit 97_1 may generate the first upper internal odd address IA1U, the second upper internal odd address IA3U, and the third upper internal odd address IA5U by selectively shifting the first upper selection odd address SA1U, the second upper selection odd address SA3U, the third upper selection odd address SA5U, and the upper selection odd redundancy address SAR1U.

More specifically, when the first upper odd repair signal R1U is activated because a fail occurs in the first upper odd through via C1U, the upper odd internal address generation circuit 97_1 may generate the first upper internal odd address IA1U by shifting the second upper selection odd address SA3U, may generate the second upper internal odd address IA3U by shifting the third upper selection odd address SA5U, and may generate the third upper internal odd address IA5U by shifting the upper selection odd redundancy address SAR1U. When the second upper odd repair signal R3U is activated because a fail occurs in the second upper odd through via C3U, the upper odd internal address generation circuit 97_1 may generate the first upper internal odd address IA1U from the first upper selection odd address SA1U, may generate the second upper internal odd address IA3U by shifting the third upper selection odd address SA5U, and may generate the third upper internal odd address IA5U by shifting the upper selection odd redundancy address SAR1U. When the third upper odd repair signal R5U is activated because a fail occurs in the third upper odd through via C5U, the upper odd internal address generation circuit 97_1 may generate the first upper internal odd address IA1U from the first upper selection odd address SA1U, may generate the second upper internal odd address IA3U from the second upper selection odd address SA3U, and may generate the third upper internal odd address IA5U by shifting the upper selection odd redundancy address SAR1U.

The upper even address selection circuit 96_3 may receive the first even address A0 through the first upper odd through via C1U, may receive the second even address A2 through the second upper odd through via C3U, may receive the third even address A4 through the third upper odd through via C5U, may receive the even redundancy address AR0 through the upper odd redundancy through via CR1U, may receive the first odd address A1 through the first upper even through via C0U, may receive the second odd address A3 through the second upper even through via C2U, may receive the third odd address A5 through the third upper even through via C4U, and may receive the odd redundancy address AR1 through the upper even redundancy through via CR0U. Based on the chip information signal UC, the upper even address selection circuit 96_3 may generate a first upper selection even address SA0U, a second upper selection even address SA2U, a third upper selection even address SA4U, and an upper selection even redundancy address SAR0U from the first even address A0, the second even address A2, the third even address A4, the even redundancy address AR0, the first odd address A1, the second odd address A3, the third odd address A5, and the odd redundancy address AR1. The upper even address selection circuit 96_3 may generate the first upper selection even address SA0U, the second upper selection even address SA2U, the third upper selection even address SA4U, and the upper selection even redundancy address SAR0U from the first odd address A1, the second odd address A3, the third odd address A5, and the odd redundancy address AR1 by the chip information signal UC.

The upper even internal address generation circuit 97_3 may receive the first upper selection even address SA0U, the second upper selection even address SA2U, the third upper selection even address SA4U, and the upper selection even redundancy address SAR0U from the upper even address selection circuit 96_3. Based on a first upper even repair signal R0U, a second upper even repair signal R2U, and a third upper even repair signal R4U, the upper even internal address generation circuit 97_3 may generate a first upper internal even address IA0U, a second upper internal even address IA2U, and a third upper internal even address IA4U from the first upper selection even address SA0U, the second upper selection even address SA2U, the third upper selection even address SA4U, and the upper selection even redundancy address SAR0U. The first upper even repair signal R0U may be activated when the first upper even through via C0U is a fail. The second upper even repair signal R2U may be activated when the second upper even through via C2U is a fail. The third upper even repair signal R4U may be activated when the third upper even through via C4U is a fail. When all of the first upper even repair signal R0U, the second upper even repair signal R2U, and the third upper even repair signal R4U are deactivated, the upper even internal address generation circuit 97_3 may generate the first upper internal even address IA0U from the first upper selection even address SA0U, may generate the second upper internal even address IA2U from the second upper selection even address SA2U, and may generate the third upper internal even address IA4U from the third upper selection even address SA4U. When one of the first upper even repair signal R0U, the second upper even repair signal R2U, and the third upper even repair signal R4U is activated, the upper even internal address generation circuit 97_3 may generate the first upper internal even address IA0U, the second upper internal even address IA2U, and the third upper internal even address IA4U by selectively shifting the first upper selection even address SA0U, the second upper selection even address SA2U, the third upper selection even address SA4U, and the upper selection even redundancy address SAR0U.

More specifically, when the first upper even repair signal R0U is activated because a fail occurs in the first upper even through via C0U, the upper even internal address generation circuit 97_3 may generate the first upper internal even address IA0U by shifting the second upper selection even address SA2U, may generate the second upper internal even address IA2U by shifting the third upper selection even address SA4U, and may generate the third upper internal even address IA4U by shifting the upper selection even redundancy address SAR0U. When the second upper even repair signal R2U is activated because a fail occurs in the second upper even through via C2U, the upper even internal address generation circuit 97_3 may generate the first upper internal even address IA0U from the first upper selection even address SA0U, may generate the second upper internal even address IA2U by shifting the third upper selection even address SA4U, and may generate the third upper internal even address IA4U by shifting the upper selection even redundancy address SAR0U. When the third upper even repair signal R4U is activated because a fail occurs in the third upper even through via C4U, the upper even internal address generation circuit 97_3 may generate the first upper internal even address IA0U from the first upper selection even address SA0U, may generate the second upper internal even address IA2U from the second upper selection even address SA2U, and may generate the third upper internal even address IA4U by shifting the upper selection even redundancy address SAR0U.

The lower chip 91 and the upper chip 95 may be formed to have the same structure. The upper chip 95 may be stacked on the lower chip 91 by rotating around a rotating axis 95_5, thus forming a stacked integrated circuit. In this case, the upper odd area 95_1 of the upper chip 95 may be disposed on the lower even area 91_1 of the lower chip 91. The upper even area 95_3 of the upper chip 95 may be disposed on the lower odd area 91_3 of the lower chip 91. Furthermore, the first lower even through via C0L, second lower even through via C2L, third lower even through via C4L, and lower even redundancy through via CR0L of the lower even area 91_1 may be connected to the first upper odd through via C1U, second upper odd through via C3U, third upper odd through via C5U, and upper odd redundancy through via CR1U of the upper odd area 95_1, respectively. The first lower odd through via C1L, second lower odd through via C3L, third lower odd through via C5L, and lower odd redundancy through via CR1L of the lower odd area 91_3 may be connected to the first upper even through via C0U, second upper even through via C2U, third upper even through via C4U, and upper even redundancy through via CR0U of the upper even area 95_3, respectively.

Figure 33:
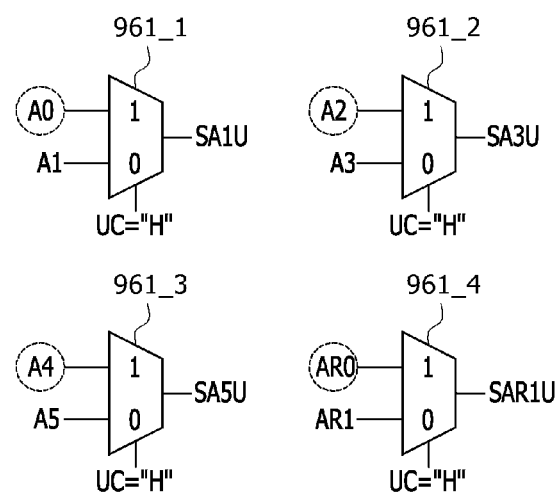
FIG. 33 is a diagram illustrating a construction according to an example of an upper odd address selection circuit that is included in the upper chip illustrated in FIG. 32.

FIG. 33 is a diagram illustrating a construction of an upper odd address selection circuit 96_1A according to an example of the upper odd address selection circuit 96_1. As illustrated in FIG. 33, the upper odd address selection circuit 96_1A may include first to fourth upper odd address selectors 961_1 to 961_4.

Based on the chip information signal UC, the first upper odd address selector 961_1 may generate the first upper selection odd address SA1U from the first even address A0 and the first odd address A1. The first even address selector 961_1 may output the first even address A0 as the first upper selection odd address SA1U because the level of the chip information signal UC is a logic high level "1" by the upper chip 95.

Based on the chip information signal UC, the second upper odd address selector 961_2 may generate the second upper selection odd address SA3U from the second even address A2 and the second odd address A3. The second even address selector 961_2 may output the second even address A2 as the second upper selection odd address SA3U because the level of the chip information signal UC is a logic high level "1" by the upper chip 95.

Based on the chip information signal UC, the third upper odd address selector 961_3 may generate the third upper selection odd address SA5U from the third even address A4 and the third odd address A5. The third even address selector 961_3 may output the third even address A4 as the third upper selection odd address SA5U because the level of the chip information signal UC is a logic high level "1" by the upper chip 95.

Based on the chip information signal UC, the fourth upper odd address selector 961_4 may generate the upper selection odd redundancy address SAR1U from the even redundancy address AR0 and the odd redundancy address AR1. The fourth even address selector 961_4 may output the even redundancy address AR0 as the upper selection odd redundancy address SAR1U because the level of the chip information signal UC is a logic high level "1" by the upper chip 95.

Figure 34:
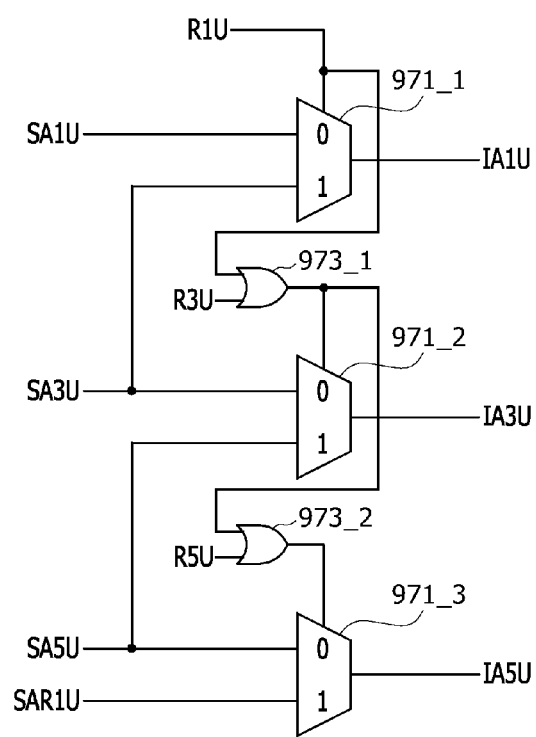
FIG. 34 is a diagram illustrating a construction according to an example of an upper odd internal address generation circuit that is included in the upper chip illustrated in FIG. 32.

FIG. 34 is a diagram illustrating a construction of an upper odd internal address generation circuit 97_1A according to an example of the upper odd internal address generation circuit 97_1. As illustrated in FIG. 34, the upper odd internal address generation circuit 97_1A may include first to third upper selection odd address selectors 971_1 to 971_3 and upper OR gates 973_1 and 973_2.

When the level of the first upper odd repair signal R1U is a logic low level "0" because the first upper odd through via C1U is not a fail, the first upper selection odd address selector 971_1 may generate the first upper internal odd address IA1U from the first upper selection odd address SA1U. When level of the first upper odd repair signal R1U is a logic high level "1" because the first upper odd through via C1U is a fail, the first upper selection odd address selector 971_1 may generate the first upper internal odd address IA1U by shifting the second upper selection odd address SA3U.

When the levels of both the first upper odd repair signal R1U and the second upper odd repair signal R3U are at a logic low level "0" because the first upper odd through via C1U and the second upper odd through via C3U are not a fail, the second upper selection odd address selector 971_2 may generate the second upper internal odd address IA3U from the second upper selection odd address SA3U because the upper OR gate 973_1 outputs a logic low level "0". When the level of one of the first upper odd repair signal R1U and the second upper odd repair signal R3U is a logic high level "1" because one of the first upper odd through via C1U and the second upper odd through via C3U is a fail, the second upper selection odd address selector 971_2 may generate the second upper internal odd address IA3U by shifting the third upper selection odd address SA5U because the upper OR gate 973_1 outputs a logic high level "1".

When the levels of all of the first upper odd repair signal R1U, the second upper odd repair signal R3U, and the third upper odd repair signal R5U are at a logic low level "0" because the first upper odd through via C1U, the second upper odd through via C3U, and the third upper odd through via C5U are not a fail, the third upper selection odd address selector 971_3 may generate the third upper internal odd address IA5U from the third upper selection odd address SA5U because the upper OR gate 973_2 outputs a logic low level "0". When the level of one of the first upper odd repair signal R1U, the second upper odd repair signal R3U, and the third upper odd repair signal R5U is a logic high level "1" because one of the first upper odd through via C1U, the second upper odd through via C3U, and the third upper odd through via C5U is a fail, the third upper selection odd address selector 971_3 may generate the third upper internal odd address IA5U by shifting the upper selection odd redundancy address SAR1U because the upper OR gate 973_2 outputs a logic high level "1".

Figure 35:
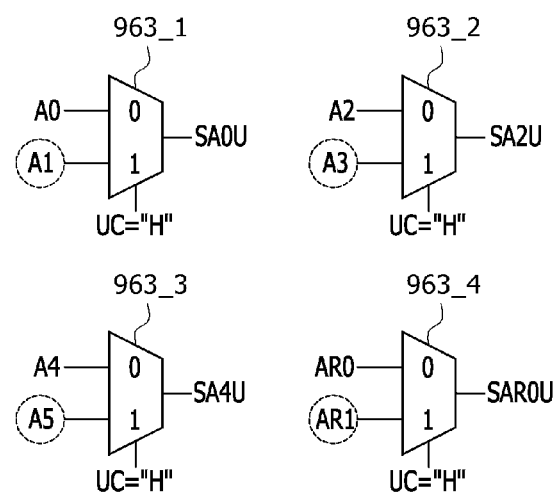
FIG. 35 is a diagram illustrating a construction according to an example of an upper even address selection circuit that is included in the upper chip illustrated in FIG. 32.

FIG. 35 is a diagram illustrating a construction of an upper even address selection circuit 96_3A according to an example of the upper even address selection circuit 96_3. As illustrated in FIG. 35, the upper even address selection circuit 96_3A may include first to fourth upper even address selectors 963_1 to 963_4.

Based on the chip information signal UC, the first upper even address selector 963_1 may generate the first upper selection even address SA0U from the first even address A0 and the first odd address A1. The first upper even address selector 963_1 may output the first odd address A1 as the first upper selection even address SA0U because the level of the chip information signal UC is a logic high level "1" by the upper chip 95.

Based on the chip information signal UC, the second upper even address selector 963_2 may generate the second upper selection even address SA2U from the second even address A2 and the second odd address A3. The second upper even address selector 963_2 may output the second odd address A3 as the second upper selection even address SA2U because the level of the chip information signal UC is a logic high level "1" by the upper chip 95.

Based on the chip information signal UC, the third upper even address selector 963_3 may generate the third upper selection even address SA4U from the third even address A4 and the third odd address A5. The third upper even address selector 963_3 may output the third odd address A5 as the third upper selection even address SA4U because the level of the chip information signal UC is a logic high level "1" by the upper chip 95.

Based on the chip information signal UC, the fourth upper even address selector 963_4 may generate the upper selection even redundancy address SAR0U from the even redundancy address AR0 and the odd redundancy address AR1. The fourth upper even address selector 963_4 may output the odd redundancy address AR1 as the upper selection even redundancy address SAR0U because the level of the chip information signal UC is a logic high level "1" by the upper chip 95.

Figure 36:
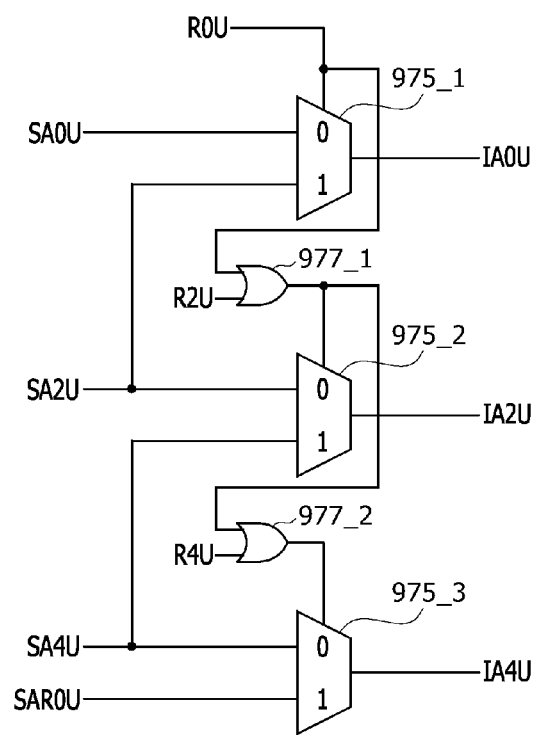
FIG. 36 is a diagram illustrating a construction according to an example of an upper even internal address generation circuit that is included in the upper chip illustrated in FIG. 32.

FIG. 36 is a diagram illustrating a construction of an upper even internal address generation circuit 97_3A according to an example of the upper even internal address generation circuit 97_3. As illustrated in FIG. 36, the upper even internal address generation circuit 97_3A may include first to third upper selection even address selectors 975_1 to 975_3 and OR gates 977_1 and 977_2.

When the level of the first upper even repair signal R0U is a logic low level "0" because the first upper even through via C0U is not a fail, the first upper selection even address selector 975_1 may generate the first upper internal even address IA0U from the first upper selection even address SA0U. When the first upper even repair signal R0U is a logic high level "1" because the first upper even through via C0U is a fail, the first upper selection even address selector 975_1 may generate the first upper internal even address IA0U by shifting the second upper selection even address SA2U.

When the levels of both the first upper even repair signal R0U and the second upper even repair signal R2U are at a logic low level "0" because the first upper even through via C0U and the second upper even through via C2U are not a fail, the second upper selection even address selector 975_2 may generate the second upper internal even address IA2U from the second upper selection even address SA2U because the OR gate 977_1 outputs a logic low level "0". When the level of one of the first upper even repair signal R0U and the second upper even repair signal R2U is a logic high level "1" because one of the first upper even through via C0U and the second upper even through via C2U is a fail, the second upper selection even address selector 975_2 may generate the second upper internal even address IA2U by shifting the third upper selection even address SA4U because the OR gate 977_1 outputs a logic high level "1".

When the levels of all of the first upper even repair signal R0U, the second upper even repair signal R2U, and the third upper even repair signal R4U are at a logic low level "0" because the first upper even through via C0U, the second upper even through via C2U, and the third upper even through via C4U are not a fail, the third upper selection even address selector 975_3 may generate the third upper internal even address IA4U from the third upper selection even address SA4U because the OR gate 977_2 outputs a logic low level "0". When the level of one of the first upper even repair signal R0U, the second upper even repair signal R2U, and the third upper even repair signal R4U is a logic high level "1" because one of the first upper even through via C0U, the second upper even through via C2U, and the third upper even through via C4U is a fail, the third upper selection even address selector 975_3 may generate the third upper internal even address IA4U by shifting the upper selection even redundancy address SAR0U because the OR gate 977_2 outputs a logic high level "1".

Figure 37:
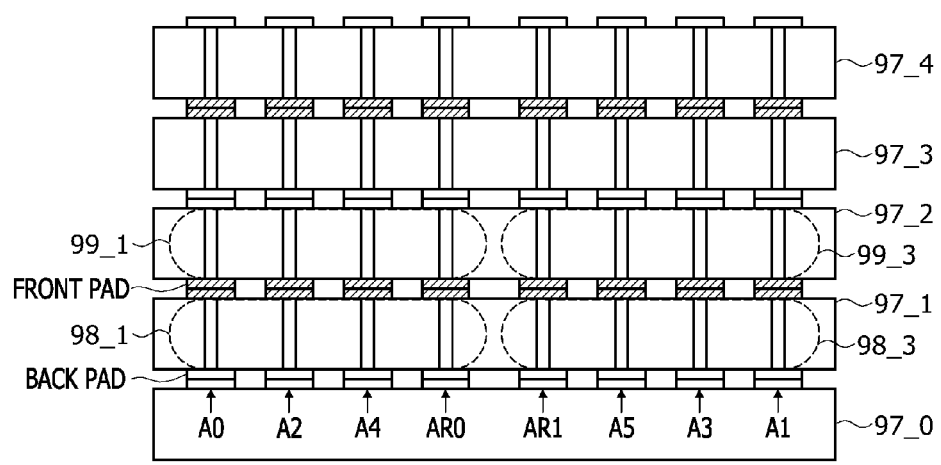
FIG. 37 is a side view illustrating a construction of a stacked integrated circuit according to another example of the present disclosure.

FIG. 37 is a side view illustrating a construction of a stacked integrated circuit 97 according to another example of the present disclosure. As illustrated in FIG. 37, the stacked integrated circuit 97 may include a base chip 97_0, lower chips 97_1 and 97_3, and upper chips 97_2 and 97_4.

The base chip 97_0 may apply the first even address A0, the second even address A2, the third even address A4, the even redundancy address AR0, the first odd address A1, the second odd address A3, the third odd address A5, and the odd redundancy address AR1 through a back pad of the lower chip 97_1.

The lower chips 97_1 and 97_3 and the upper chips 97_2 and 97_4 may be implemented as the same chips. The stacked integrated circuit 97 may be implemented in a way to bond a front pad of the lower chip 97_1 to a front pad of the upper chip 97_2, bond a front pad of the lower chip 97_3 to a front pad of the upper chip 97_4, and bond a back pad of the lower chip 97_3 to the back pad of the upper chip 97_2. The upper chip 97_2 may be stacked on the lower chip 97_1 by rotating around the rotating axis. The upper chip 97_4 may be stacked on the lower chip 97_3 by rotating around the rotating axis.

A first area 98_1 of the lower chip 97_1 may correspond to the lower even area 91_1 illustrated in FIG. 27. A second area 98_3 of the lower chip 97_1 may correspond to the lower odd area 91_3 illustrated in FIG. 27. A first area 99_1 of the upper chip 97_2 may correspond to the upper odd area 95_1 illustrated in FIG. 32. A second area 99_3 of the upper chip 97_2 may correspond to the upper even area 95_3 illustrated in FIG. 32. A case in which the two lower chips and the two upper chips have been stacked on the stacked integrated circuit 97 has been illustrated in FIG. 37. According to embodiments, three or more lower chips and three or more upper chips may be stacked on the stacked integrated circuit 97.

The present disclosure has been described so far based on the embodiments. A person having ordinary knowledge in the art to which the present disclosure pertains will understand that the present disclosure may be implemented in a modified form without departing from the intrinsic characteristics of the present disclosure. Accordingly, the disclosed embodiments should be considered from a descriptive viewpoint, not a limitative viewpoint. The scope of the present disclosure are disclosed in the claims, not the aforementioned description, and all differences within an equivalent range thereof should be construed as being included in the present disclosure.

What is claimed is:

1. A chip comprising:
    an even through via, through which an even address is received, and an even redundancy through via, through which an even redundancy address is received; and
    an odd through via, through which an odd address is received, and an odd redundancy through via, through which an odd redundancy address is received;
    an even address selection circuit configured to generate a selection even address and a selection even redundancy address based on a chip information signal, the even address, the even redundancy address, the odd address, and the odd redundancy address; and
    an even internal address generation circuit configured to generate an internal even address based on an even repair signal, the selection even address, and the selection even redundancy address;
    an odd address selection circuit configured to generate a selection odd address and a selection odd redundancy address based on the chip information signal, the even address, the even redundancy address, the odd address, and the odd redundancy address;
    wherein the even through via, the even redundancy through via, the even address selection circuit and the even internal address generation circuit are disposed in an even area; and
    wherein the odd through via, the odd redundancy through via, and the odd address selection circuit are disposed in an odd area.

2. The chip of claim 1, wherein the even address selection circuit is configured to:
    receive the chip information signal at a first logic level when the chip is a lower chip, and
    receive the chip information signal at a second logic level when the chip is an upper chip.

3. The chip of claim 2, wherein the even address selection circuit is configured to:
    generate the selection even address and the selection even redundancy address from the even address and the even redundancy address when the level of the chip information signal is at the first logic level, and
    generate the selection even address and the selection even redundancy address from the odd address and the odd redundancy address when the chip information signal is at the second logic level.

4. A chip comprising:
    an even through via, through which an even address is received, and an even redundancy through via, through which an even redundancy address is received; and an odd through via, through which an odd address is received, and an odd redundancy through via, through which an odd redundancy address is received;

an even address selection circuit configured to generate a selection even address and a selection even redundancy address based on a chip information signal, the even address, the even redundancy address, the odd address, and the odd redundancy address; and an even internal address generation circuit configured to generate an internal even address based on an even repair signal, the selection even address, and the selection even redundancy address;

wherein, when a fail occurs in the even through via, the even internal address generation circuit is configured to receive the even repair signal that is activated;

wherein the even through via, the even redundancy through via, the even address selection circuit and the even internal address generation circuit are disposed in an even area; and wherein the odd through via and the odd redundancy through via are disposed in an odd area.

5. The chip of claim 4, wherein the even internal address generation circuit is configured to:

generate the internal even address from the selection even address when the even repair signal is not activated, and generate the internal even address by shifting the selection even redundancy address when the even repair signal is activated.

6. The chip of claim 1, wherein the even through via comprises a first even through via and a second even through via, wherein the even repair signal comprises a first even repair signal and a second even repair signal, wherein the even internal address generation circuit is configured to:

receive the first even repair signal that is activated when a fail occurs in the first even through via, and receive the second even repair signal that is activated when a fail occurs in the second even through via.

7. The chip of claim 6, wherein the selection even address comprises a first selection even address and a second selection even address, wherein the internal even address comprises a first internal even address and a second internal even address, and wherein, when the first even repair signal and the second even repair signal are not activated, the even internal address generation circuit is configured to generate the first internal even address from the first selection even address and to generate the second internal even address from the second selection even address.

8. The chip of claim 7, wherein, when the first even repair signal is activated, the even internal address generation circuit is configured to generate the first internal even address by shifting the second selection even address and to generate the second internal even address by shifting the selection even redundancy address.

9. The chip of claim 7, wherein, when the second even repair signal is activated, the even internal address generation circuit is configured to generate the first internal even address from the first selection even address and to generate the second internal even address by shifting the selection even redundancy address.

10. The chip of claim 1, wherein the odd address selection circuit is configured to:

generate the selection odd address and the selection odd redundancy address from the odd address and the odd redundancy address when a level of the chip information signal is at a first logic level, and generate the selection odd address and the selection odd redundancy address from the even address and the even redundancy address when a level of the chip information signal is at a second logic level.

11. The chip of claim 1, further comprising an odd internal address generation circuit configured to generate an internal odd address based on an odd repair signal, the selection odd address, and the selection odd redundancy address.

12. The chip of claim 11, wherein the odd internal address generation circuit is configured to receive the odd repair signal that is activated when a fail occurs in the odd through via.

13. The chip of claim 12, wherein the odd internal address generation circuit is configured to:

generate the internal odd address from the selection odd address when the odd repair signal is not activated, and generate the internal odd address by shifting the selection odd redundancy address when the odd repair signal is activated.

14. A stacked integrated circuit comprising:

a lower chip comprising a lower even area and a lower odd area; and an upper chip comprising an upper odd area and an upper even area, wherein the upper chip is stacked on the lower chip, a lower even address selection circuit configured to generate a lower selection even address and a lower selection even redundancy address from an even address and an even redundancy address; and a lower even internal address generation circuit configured to generate a lower internal even address based on a lower even repair signal, the lower selection even address, and the lower selection even redundancy address;

a lower odd address selection circuit configured to generate a lower selection odd address and a lower selection odd redundancy address based on a chip information signal, the even address, the even redundancy address, an odd address, and an odd redundancy address, wherein the lower even address selection circuit and the lower even internal address generation circuit are disposed in the lower even area.

15. The stacked integrated circuit of claim 14, wherein the upper odd area is disposed on the lower even area, and wherein the upper even area is disposed on the lower odd area.

16. The stacked integrated circuit of claim 14, further comprising:

a lower odd address selection circuit configured to generate a lower selection odd address and a lower selection odd redundancy address from an odd address and an odd redundancy address; and a lower odd internal address generation circuit configured to generate a lower internal odd address based on a lower odd repair signal, the lower selection odd address, and the lower selection odd redundancy address;

wherein the lower odd address selection circuit and the lower odd internal address generation circuit are disposed in the lower odd area.

17. The stacked integrated circuit of claim 14, further comprising:
- an upper odd address selection circuit configured to generate an upper selection odd address and an upper selection odd redundancy address from the even address and the even redundancy address; and
- an upper odd internal address generation circuit configured to generate an upper internal odd address based on an upper odd repair signal, the upper selection odd address, and the upper selection odd redundancy address;
- wherein the upper odd address selection circuit and the upper odd internal address generation circuit are disposed in the upper odd area.

18. The stacked integrated circuit of claim 14, further comprising:
- an upper even address selection circuit configured to generate an upper selection even address and an upper selection even redundancy address from the odd address and the odd redundancy address; and
- an upper even internal address generation circuit configured to generate an upper internal even address based on an upper even repair signal, the upper selection even address, and the upper selection even redundancy address;
- wherein the upper even address selection circuit and the upper even internal address generation circuit are disposed in the upper even area.

19. The stacked integrated circuit of claim 14, further comprising a base chip configured to apply the even address, the even redundancy address, the odd address, and the odd redundancy address to a back pad of the lower chip.

* * * * *